(12) United States Patent
Harada et al.

(10) Patent No.: US 7,694,155 B2
(45) Date of Patent: *Apr. 6, 2010

(54) DIGITAL WORK PROTECTION SYSTEM, RECORD/PLAYBACK DEVICE, RECORDING MEDIUM DEVICE, AND MODEL CHANGE DEVICE

(75) Inventors: Shunji Harada, Osaka (JP); Masaya Miyazaki, Ikeda (JP); Shinichi Matsui, Kobe (JP); Shinji Inoue, Neyagawa (JP); Natsume Matsuzaki, Mino (JP); Naohiko Noguchi, Yokohama (JP)

(73) Assignee: Panasonic Corporation, Osaka (JP)

( * ) Notice: Subject to any disclaimer, the term of this patent is extended or adjusted under 35 U.S.C. 154(b) by 634 days.

This patent is subject to a terminal disclaimer.

(21) Appl. No.: 11/635,583

(22) Filed: Dec. 8, 2006

(65) Prior Publication Data

US 2007/0083772 A1  Apr. 12, 2007

Related U.S. Application Data

(62) Division of application No. 10/180,456, filed on Jun. 27, 2002.

(30) Foreign Application Priority Data

Jul. 9, 2001  (JP) .............................. 2001-208532

(51) Int. Cl.
*G06F 12/14* (2006.01)
*G06F 17/30* (2006.01)
*H04N 7/16* (2006.01)
*G06F 11/30* (2006.01)
*G06F 7/04* (2006.01)

(52) U.S. Cl. ..................... 713/193; 713/189; 713/194; 726/26

(58) Field of Classification Search .................. 726/26; 713/193

See application file for complete search history.

(56) References Cited

U.S. PATENT DOCUMENTS 5,953,419 A * 9/1999 Lohstroh et al. ............ 713/165
6,009,116 A * 12/1999 Bednarek et al. ............ 375/130
6,097,814 A * 8/2000 Mochizuki .................... 380/44
6,460,137 B1 * 10/2002 Akiyama et al. ............ 713/160
6,606,744 B1 * 8/2003 Mikurak ..................... 717/174

(Continued)

FOREIGN PATENT DOCUMENTS

CN  1253882  4/2006

(Continued)

OTHER PUBLICATIONS

Hartung, Frank. Ramme, Friedhelm. "Digital Rights Management and Watermarking of Multimedia Content for M-Commerce Applications". IEEE Communications Magazine. Pub date: Nov. 2000. Relevant pp. 78-84. Found on the World Wide Web at: http://ieeexplore.ieee.org/stamp/stamp.jsp?tp=&arnumber=883493&isnumber=19115.*

(Continued)

*Primary Examiner*—William R Korzuch
*Assistant Examiner*—Jeremiah Avery
(74) *Attorney, Agent, or Firm*—Wenderoth, Lind & Ponack, L.L.P.

(57) ABSTRACT

A system includes of a main device and a recording medium device. The main device includes a reception unit that receives a digital work from an external distribution server, an internal storage area for storing the digital work, a playback unit that plays back the digital work, and a unique information storage area for storing information that is unique to the main device. The main device also includes an encryption unit that encrypts the digital work using the unique information, a decryption unit that decrypts, using the unique information, the encrypted digital work having been read from the recording medium device, a write unit that writes the encrypted digital work into the recording medium device which is portable, and a read unit that reads the encrypted digital work from the recording medium device.

6 Claims, 35 Drawing Sheets

U.S. PATENT DOCUMENTS

| | | | |
|---|---|---|---|
| 6,640,145 B2 * | 10/2003 | Hoffberg et al. | 700/83 |
| 6,694,023 B1 | 2/2004 | Kim | |
| 6,792,539 B1 | 9/2004 | Oishi et al. | |
| 6,850,252 B1 * | 2/2005 | Hoffberg | 715/716 |
| 6,859,535 B1 * | 2/2005 | Tatebayashi et al. | 380/201 |
| 6,944,600 B2 * | 9/2005 | Stefik et al. | 705/57 |
| 7,020,780 B1 * | 3/2006 | Mochizuki | 713/193 |
| 7,225,339 B2 * | 5/2007 | Asano et al. | 713/193 |
| 7,239,709 B1 | 7/2007 | Yamada et al. | |
| 7,278,016 B1 | 10/2007 | Detrick et al. | |
| 2002/0150251 A1 * | 10/2002 | Asano et al. | 380/277 |
| 2003/0005309 A1 * | 1/2003 | Ripley et al. | 713/185 |

FOREIGN PATENT DOCUMENTS

| | | |
|---|---|---|
| CN | 1312876 | 4/2007 |
| EP | 0 561 685 | 9/1993 |
| EP | 0 994 475 | 4/2000 |
| EP | 1 018 733 | 7/2000 |
| EP | 1 047 062 | 10/2000 |
| EP | 1 050 887 | 11/2000 |
| EP | 1 054 398 | 11/2000 |
| EP | 1 061 514 | 12/2000 |
| EP | 1 221 690 | 7/2002 |
| EP | 1 422 709 | 5/2004 |
| JP | 2000-122539 | 4/2000 |
| JP | 2000-187935 | 7/2000 |
| JP | 2000-308129 | 11/2000 |
| JP | 2001-028572 | 1/2001 |
| JP | 2001-333182 | 11/2001 |
| KR | 2000-62892 | 10/2000 |
| KR | 2001-5654 | 1/2001 |
| TW | 408290 | 10/2000 |
| WO | 01 16932 | 3/2001 |
| WO | 01/93000 | 12/2001 |
| WO | 02/11488 | 2/2002 |
| WO | 02/46941 | 6/2002 |

OTHER PUBLICATIONS

U.S. Patent Office Action mailed Jan. 2, 2009 for U.S. Appl. No. 10/180,456.

Intel Corp. et al.: "Content Protection for Recordable Media Specification : SD Memory Card Book, Revision 0.95" Internet Article, 'Online! 28 May 2001 (2001-05-28), pp. i-75.

Yamanaka K et al.: "Trends in Digital Copy Protection Technologies" NTT Review, Telecommunications Association, Tokyo, JP, vol. 11, No. 1, Jan. 1999 (1999-01), pp. 108-115.

* cited by examiner

Right Information Table 610

| User ID | Content ID | Usage Right Information |
|---------|------------|-------------------------|
| A0001   | C0001      | AF1425…                 |
| B0002   | C0002      | CE5D369…                |
| ⋮       | ⋮          | ⋮                       |

FIG. 33

Content Information Table 620

| Content ID | Content | Type of Unique Information |
|---|---|---|
| C0001 | Music Information | Medium Unique |
| C0002 | Music Information | Device Unique |
| ⋮ | ⋮ | ⋮ |

DIGITAL WORK PROTECTION SYSTEM, RECORD/PLAYBACK DEVICE, RECORDING MEDIUM DEVICE, AND MODEL CHANGE DEVICE

This application is a divisional application of Ser. No. 10/180,456, filed Jun. 27, 2002.

This application is based on an application No. 2001-208532 filed in Japan, the content of which is hereby incorporated by reference.

BACKGROUND OF THE INVENTION (1) Field of the Invention

The present invention relates to a technique to distribute, receive, record, and play back digital works over a network.

(2) Description of the Related Art

Thanks to recent technological advances, digital works, such as digitized documents, music, images, and programs, have been distributed over a network typified by the Internet, which allows users to easily retrieve various digital works via a network, and record the retrieved digital works onto a separate recording medium to play back.

However, the above advantage that users are allowed to conveniently replicate digital works is inevitably attended with a problem in that the copyrights of digital works may be infringed easily.

SUMMARY OF THE INVENTION

To address the above problem, an object of the present invention is to provide a digital work protection system, a record/playback device, a recording medium device, a model change device, a record/playback method, a record/playback program, and a recording medium storing a record/playback program, each of which records a digital work stored in the internal memory of a record/playback device into a portable recording medium device in a manner to prohibit playback of the recorded digital work with any device other than the record/playback device employed at the time of the recording.

To achieve the above object, in one aspect of the present invention, a digital work protection system for recording and playing back digital work, comprises a portable recording medium device including a storage area and being attached to a record/playback device and the record/playback device. The record/playback device includes: an internal storage unit operable to store a content that is a digital work; a unique information storage unit operable to prestore device unique information that is unique to the record/playback device; an encryption unit operable to encrypt the stored content based on the prestored device unique information to generate encrypted information; a write unit operable to write the generated encrypted information into the storage area of the recording medium device; a read unit operable to read the encrypted information from the storage area of the recording medium device; a decryption unit operable to decrypt the read encrypted information based on the prestored device unique information stored in the unique information storage unit to generate a decrypted content; and a playback unit operable to play back the generated decrypted content.

With this construction, the record/playback device encrypts the content based on the device unique information that is unique to the record/playback device to generate the encrypted information, and records the generated encrypted information on to the recording medium device. In order to play back the content, the record/playback device decrypts the encrypted information based on the device unique information stored in record/playback device. Thus, there is an effect that the encrypted information stored in the recording medium device is neither decrypted nor played back by any device other than the record/playback device having the unique information stored therein.

Here, it is preferable that the encryption unit encrypts the content using the device unique information as a key to generate the encrypted information, and the decryption unit decrypts the read encrypted information using the device unique information as a key.

With this construction, the content is encrypted using the device unique information as a key to generate the encrypted information, and the read encrypted information is decrypted using the device unique information as a key. Thus, the encrypted information stored in the recording medium device is not decrypted or played back by any device that does not have the device unique information.

Here, it is preferable that the record/playback device further includes a condition storage unit operable to store usage condition information showing a permissive condition for use of the content; and a condition judgment unit operable to judge whether use of the content is permitted according to the usage condition information.

With this construction, the record/playback device prestores the usage condition information showing a permissive condition for use of the content, and judges according to the usage condition information whether use of the content is permitted. The decrypted content is played back only when the content is judged to be permitted. Thus, the content is protected from being used when the conditions shown by the usage condition information is not met.

Here, it is preferable that both the unique information storage unit and the condition storage unit are read-protected as well as write-protected against any external device unless the device is specifically permitted to read or write the unique information and the usage condition information.

With this construction, the unique information storage unit and the condition storage unit are write-protected and read-protected against any external device. Thus, the device unique information and the usage condition information are protected from being leaked out.

Here, it is preferable that the encryption unit generates a title key that is unique to the content, encrypts the generated title key using the device unique information as a key to generate an encrypted title key, encrypts the content using the generated title key as a key to generate an encrypted content, and generates the encrypted information that is composed of the encrypted title key and the encrypted content, the write unit writes the encrypted information that is composed of the encrypted title key and the encrypted content, the read unit reads the encrypted information that is composed of the encrypted title key and the encrypted content, the decryption unit decrypts the encrypted title key included in the read encrypted information using the device unique information as a key to generate a decrypted title key, and decrypts the encrypted content included in the read encrypted information using the decrypted title key as a key to generate the decrypted content, and the recording medium device includes the storage area for storing the encrypted information that is composed of the encrypted title key and the encrypted content.

With this construction, the record/playback device encrypts the generated title key using the device unique information as a key thereby to generate the encrypted title key, and encrypts the content using the generated title key as a key thereby to generate the encrypted content. Also, the record/playback device decrypts the encrypted title key using the device unique information as a key to generate the decrypted title key, and decrypts the read encrypted content using the generated decrypted title key as a key to generate the decrypted content. Thus, the encrypted title key stored in the recording medium device is not decrypted by any device other than the record/playback device having the device unique information stored therein. Consequently, the encrypted content is decrypted only by the record/playback device.

Here, it is preferable that the record/playback device further includes a first authentication unit operable to perform mutual authentication with a second authentication unit included in the recording medium device before the write unit writes the encrypted information into the storage area or before the read unit reads the encrypted information from the storage area, the recording medium device further includes the second authentication unit operable to perform mutual authentication with the first encryption unit included in the record and playback unit, and the storage area includes a first storage area and a second storage area, the second storage area being writable and readable only when the mutual authentication is established by the first authentication unit, the write unit writes the encrypted content into the first storage area, and only when the mutual authentication is established by the first authentication unit, writes the encrypted title key into the second storage area, and the read unit reads the encrypted content from the first storage area, and only when the mutual authentication is established by the first authentication unit, reads the encrypted title key from the second storage area.

With this construction, the record/playback device and the recording medium device mutually authenticate each other. Only when the mutual authentication is established, the record/playback device writes the encrypted title key into the recording medium device, or reads the encrypted title key from the recording medium device. Thus, it is prevented that the content is read from or written by any illegitimate devices.

Here, it is preferable the record/playback device further includes: a condition storage unit operable to store usage condition information showing a permissive condition for use of the content; and a condition judgment unit operable to judge whether use of the content is permitted according to the usage condition information.

With this construction, the usage condition is stored into the recording medium device, and the judgment as to whether use of the content is permitted is made according to the usage condition.

Here, it is preferable that the write unit reads the usage condition from the condition storage unit and writes the read usage condition information into the second storage area only when the mutual authentication is established by the first authentication unit, the read unit reads the usage condition from the second storage area and writes the read usage condition into the usage condition storage unit only when the mutual authentication is established by the first authentication unit, and the condition judgment unit judges whether use of the content is permitted according to the usage condition information stored in the condition storage unit.

With this construction, the record/playback device and the recording medium device mutually authenticate each other. Only when the mutual authentication is established, the record/playback device writes the usage condition into the recording medium device or reads the usage condition from the recording medium device. Further, the record/playback device judges whether use of the content is permitted according to the read usage condition information. Thus, the usage condition information is recorded into the recording medium device together with the content.

Here, it is preferable the usage condition information stored in the condition storage unit shows a permitted playback number of times, a permitted playback period, a permitted total playback time, a permitted number of times for copying the content, or a permitted number of times for moving the content, and the condition judgment unit (i) judges to playback the content only when the number of times of actual playback of the content by the playback unit is equal to or less than the permitted playback number of times, a date and time at which the content is to be played back by the playback unit is within the permitted playback period, and a total time of actual playback is equal to or less than the permitted total playback time, (ii) judges to copy the content to the recording medium device only when the permitted number of times for copying the content is equal to 1 or greater, and (iii) judges to move the content to the recording medium device only when the permitted number of times for moving the content is equal to 1 or greater.

With this construction, the usage condition shows a permitted playback number of times, a permitted playback period, or a permitted total playback time, a permitted number of times for copying the content, or a permitted number of times for moving the content. Thus, usage of the content is limited in a variety of ways.

Here, it is preferable that the record/playback device further includes an authentication judgment unit operable to judge whether the recording medium device includes the second authentication unit, and the encryption unit further encrypts the content using the device unique information as a key to generate the encrypted information when the recording medium device is judged not to include the second authentication unit, the write unit further writes the generated encrypted information into the storage area of the recording medium device when the recording medium device is judged not to include the second authentication unit, the read unit further reads the encrypted information from the storage area of the recording medium device when the recording medium device is judged not to include the second authentication unit, and the decryption unit further decrypts the read encrypted information using the device unique information as a key when the recording medium device is judged not to include the second authentication unit.

With this construction, the encryption is done in a different manner depending on whether the recording medium device includes an authentication unit, which makes it possible that the digital work protection system is used in a variety of ways.

Here, it is preferable the recording medium device further prestores medium unique information that is unique to the recording medium device, the internal storage unit stores a unique information type in association with the content, the unique information type showing whether the content is to be encrypted based on the device unique information or the medium unique information, the record/playback device further includes a unique information judgment unit operable to judge, according to the unique information type stored in the internal storage unit, whether the content is to be encrypted based on the device unique information or the medium unique information, the encryption unit (i) encrypts the content based on the device unique information to generate the encrypted information when the unique information judgment unit judges the content to be encrypted based on the device unique information, and (ii) reads the medium unique information from the recording medium device to encrypt the content based on the read medium unique information to generate the encrypted information when the unique information judgment unit judges the content to be encrypted based on the medium unique information, the decryption unit (i) decrypts the read encrypted information based on the device unique information to generate the decrypted content when the unique information judgment unit judges the content to be encrypted based on the device unique information, and (ii) reads the medium unique information from the recording medium device to decrypt the read encrypted information with the use of the read medium unique information to generate the decrypted content when the unique information judgment unit judges the content to be encrypted based on the device unique information.

With this construction, different unique information is used in the encryption depending on the unique information type, which makes it possible that the digital work protection system is used in a variety of ways.

Alternatively, in another aspect of the present invention, provided is a model change device used for replacing a first record/playback device with a second record/playback device due to change in a contract between a user and a service provider, the first record/playback device being usable under the contract. The first record playback device includes: a first internal storage unit operable to store a content that is a digital work; a first unique information storage unit operable to prestore device unique information that is unique to the first record/playback device; a first encryption unit operable to encrypt the content stored in the first internal storage unit based on the device unique information stored in the first unique information storage unit to generate encrypted information; a first write unit operable to write the generated encrypted information into a storage area of a recording medium device, a first read unit operable to read the encrypted information from the storage area of the recording medium device; a first decryption unit operable to decrypt the read encrypted information based on the device unique information stored in the first unique information storage unit to generate a decrypted content; and a first playback unit operable to play back the generated decrypted content. The recording medium device includes the storage area for storing the encrypted information. The second record/playback device includes: a second internal storage unit that includes an internal storage area for storing a content that is a digital work; a second unique information storage unit that includes an internal storage area for storing device unique information; a second encryption unit operable to encrypt the content stored in the second internal storage unit based on the device unique information stored in the second unique information storage unit to generate encrypted information; a second write unit operable to write the generated encrypted information into the storage area of the memory device, a second read unit operable to read the encrypted information from the storage area of the memory device; a second decryption unit operable to decrypt the read encrypted information based on the device unique information stored in the second unique information storage unit to generate a decrypted content; and a second playback unit operable to play back the generated decrypted content. The model change device includes: a third read unit operable to read the device unique information stored in the first unique information storage unit, and delete the device unique information from the first unique information storage unit; and a third write unit operable to write the read device unique information into the second unique information storage unit.

With this construction, the model change device reads the device unique information stored in the first unique information storage unit of the first record/playback device, deletes the device unique information from the first unique information storage unit, and writes the read device unique information into the second unique information storage unit of the second record/playback device. Thus, even after the model change, the content stored into the recording medium device by the first record/playback device is allowed to be used by the second record/playback device. In addition, after the model change, the first record/playback device is no longer allowed to use the content.

Alternatively, in another aspect of the present invention, provided is a model change device used for canceling a record/playback device that has been usable under a contract between a user and a service provider. The record/playback device includes: an internal storage unit operable to store a content that is a digital work; a unique information storage unit operable to prestore (i) device unique information that is unique to the record/playback device and (ii) contract information regarding the contract, the device unique information being independent of the contract information; an encryption unit operable to encrypt the content stored in the internal storage unit based on the device unique information stored in the unique information storage unit to generate encrypted information; a write unit operable to write the generated encrypted information into a storage area of a recording medium device; a read unit operable to read the encrypted information from the storage area of the recording medium device; a decryption unit operable to decrypt the read encrypted information based on the device unique information stored in the unique information storage unit to generate a decrypted content; and a playback unit operable to play back the generated decrypted content. The recording medium device includes the storage area for storing the encrypted information. The model change device includes: a read unit operable to read the contract information from the unique information storage unit; and a cancellation unit operable to perform processing to cancel the contract with reference to the read contract information.

With this construction, the record/playback device prestores the device unique information that is independent of the contract information. The model change device reads the contract information stored in the unique information storage unit and performs processing to cancel the contract with reference to the read contract information. Thus, even after the cancellation of the contract under which the record/playback device is usable, the content stored in the recording medium device is still allowed to be played back by the record/playback device.

Alternatively, in another aspect of the present invention, provided is a model change device used for changing a first contract under which a record/playback device is usable to a second contract. The first contract is made between a user and a first service provider and the second contract is made between the user and a second service provider. The record/playback device includes: an internal storage unit operable to store a content that is a digital work; a unique information storage unit operable to store (i) device unique information that is unique to the record/playback device and (ii) first contract information regarding the first contract, the device unique information being independent of the contract information; an encryption unit operable to encrypt the content stored in the internal storage unit based on the device unique information stored in the unique information storage unit to generate encrypted information; a write unit operable to write the generated encrypted information into a storage area of a recording medium device; a read unit operable to read the encrypted information from the storage area of the recording medium device; a decryption unit operable to decrypt the read encrypted information based on the device unique information stored in the unique information storage unit to generate a decrypted content; and a playback unit operable to play back the generated decrypted content. The recording medium device includes the storage area for storing the encrypted information. The model change device includes: a read unit operable to read the first contract information from the unique information storage unit; a contract cancellation and change unit operable to perform processing to cancel the first contract with reference to the read first contract information, and perform processing to make the second contract to generate second contract information regarding the second contract; and a write unit operable to write the generated second contract information into the unique information storage unit, and delete the first contract information from the unique information storage unit.

With this construction, the record/playback device prestores the device unique information that is independent of the first contract information. The model change device reads the first contract information from the record/playback device, performs processing to cancel the first contract with reference to the first contract information, performs processing to make the second contract and to generate the second contract information regarding the second contract, writes the generated second contract information into the unique information storage unit of the record/playback device, and deletes the first contract information from the unique information storage unit. Thus, even after the service provider of the record/playback device is changed to another service provider, the content stored in the recording medium device is still played back.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 33 shows the data construction of a content information table 620 that is stored in the content storage unit 201 of a content distribution server device 200k;

DESCRIPTION OF THE PREFERRED EMBODIMENT

1. Preferred Embodiment 1

First, description is given to a digital work distribution system 100 consistent with preferred embodiment 1 of the present invention.

The digital work distribution system 100 aims to provide a digital work protection system, a main device, and a recording medium device, each of which records a digital work (for example, a ringer melody or a standby screen) into a portable recording medium device using a main device, such as a mobile phone, in a manner to prohibit playback of the digital work by any device other than the main device used upon the recording.

1.1 Construction of Digital Work Distribution System 100

Figure 1:
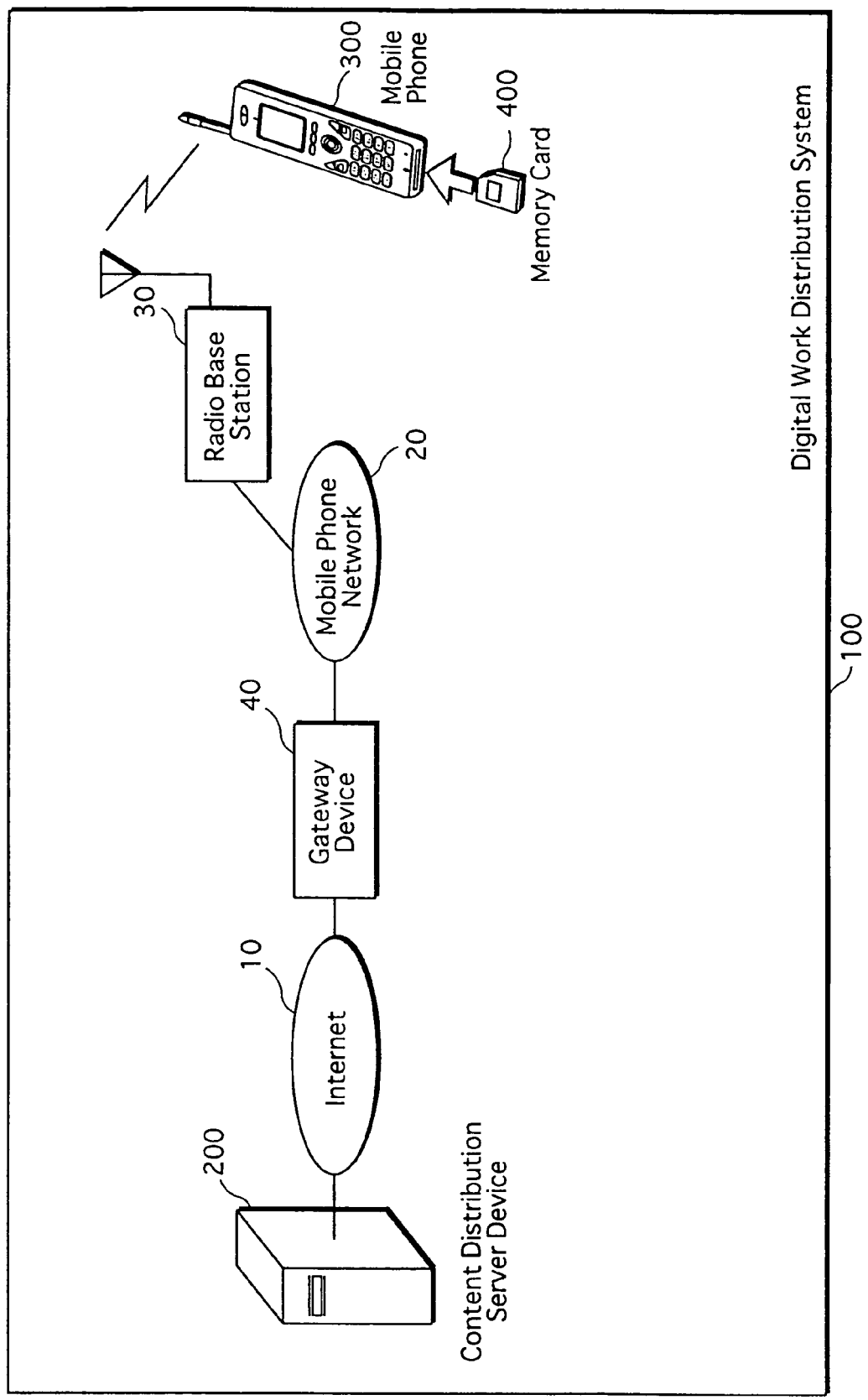
FIG. 1 is a block diagram showing the entire construction of a digital work distribution system 100.

As shown in the block diagram in FIG. 1, the digital work distribution system 100 is composed of a content distribution server device 200, the Internet 10, a gateway device 40, a mobile phone network 20, a radio base station 30, a mobile phone 300, and a memory card 400.

The content distribution server device 200 is connected to the radio base station 30 via the Internet 10 and the mobile phone network 20. The radio base station 30 transmits information to or from the mobile phone 300 via radio waves. The gateway device 40 connects the Internet 10 and the mobile phone network 20, and performs conversion of the communications protocol between the Internet 10 and the mobile phone network 20.

In response to a user operation received from the mobile phone 300, the content distribution server device 200 distributes a digital work, i.e., a piece of music as one example, to the mobile phone 300 via the Internet 10, the mobile phone network 20, and the radio base station 30. The mobile phone 300 then receives the content, encrypts the received content, and records the encrypted content into the memory card 400. Further, in response to a user operation, the mobile phone 300 reads the encrypted content stored in the memory card 400, decrypts the content, and then plays back the decrypted content.

1.2 Construction of Content Distribution Server Device 200

Figure 2:
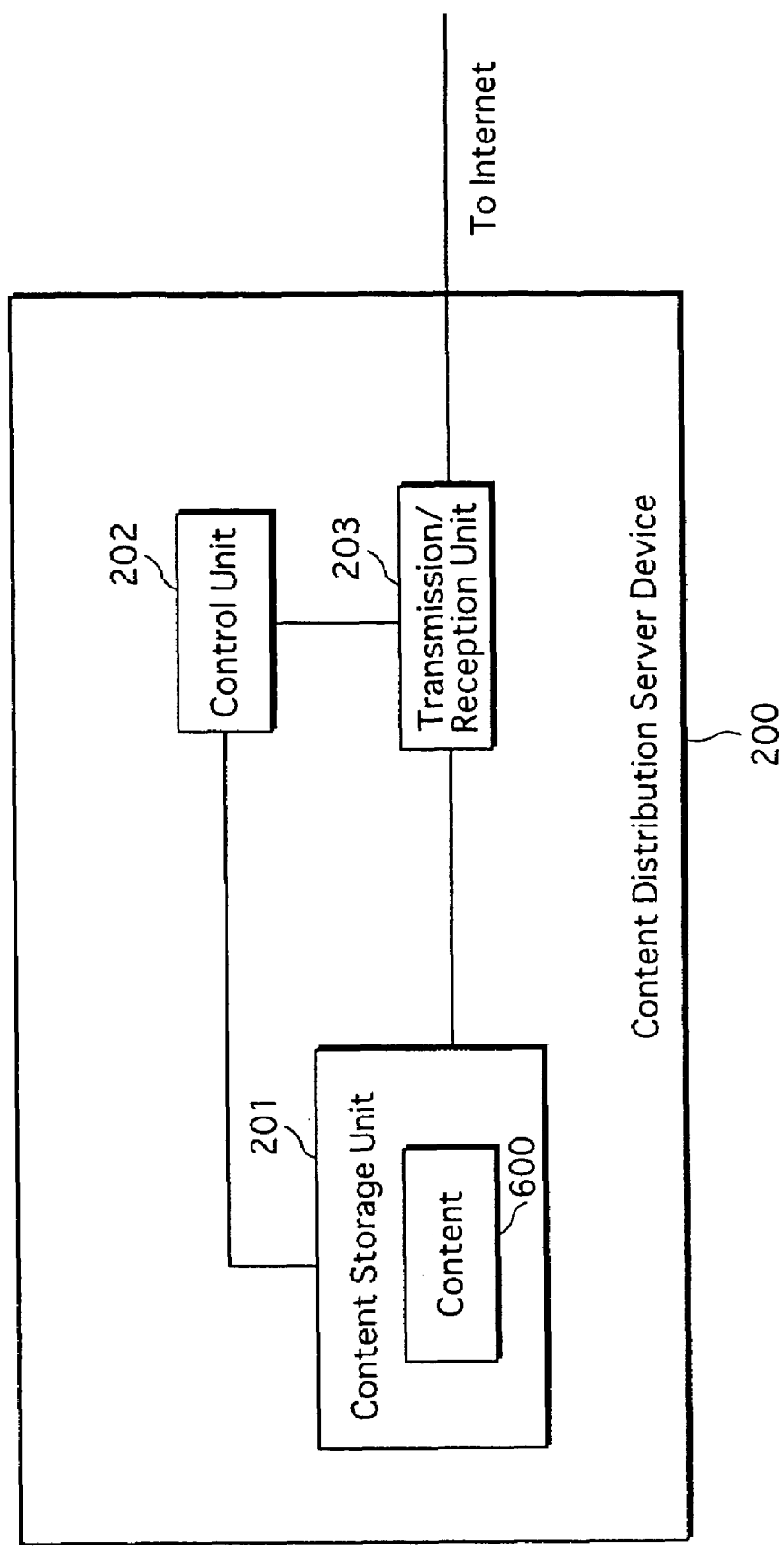
FIG. 2 is a block diagram showing the construction of a content distribution server device 200.

As shown in the block diagram in FIG. 2, the content distribution server device 200 is composed of a content storage unit 201, a control unit 202, and a transmission/reception unit 203.

To be more specific, the content distribution server device 200 is a computer system composed of a microprocessor, ROM, RAM, a hard disc unit, a display unit, a keyboard, a mouse, and other components. The RAM or the hard disc unit stores a computer program, and the content distribution server device 200 performs its function by the microprocessor executing the computer program.

The content storage unit 201 prestores a content 600, which in this example is a ringer melody. Here, the term ringer melody used herein refers to a piece of music that is played back for signaling the mobile phone user of an incoming call. Note that the content may be, for example, a standby screen for mobile phone, karaoke data, and a game program written in Java.

The control unit 202 receives a content ID and payment information from the mobile phone 300 via the radio base station 30, the mobile phone network 20, the Internet 10, and the transmission/reception unit 203. Here, the transmission of the content ID and the payment information are performed in a secure manner through the use of a secure, authentication communications protocol, such as SSL (Secure Socket Layer) protocol. The content ID is an identifier identifying the content that the user selects to purchase, and the payment information is information indicating payment made for purchasing the content. Upon receipt of the content ID and the payment information, the control unit 202 performs processing for receiving the payment based on the payment information.

Next, the control unit 202 reads a content that corresponds to the received content ID from the content storage unit 201, and transmits the read content to the mobile phone 300 via the transmission/reception unit 203, the Internet 10, the mobile phone network 20, and the radio base station 30. Here, the content is transmitted from the content distribution sever device 200 to the mobile phone 300 in a secure manner through the use of a secure content distribution system, such as EMMS (Electronic Music Management System).

The transmission/reception unit 203 performs transmission and reception of information with external devices connected thereto via the Internet 10.

1.3 Construction of Memory Card 400

Figure 3:
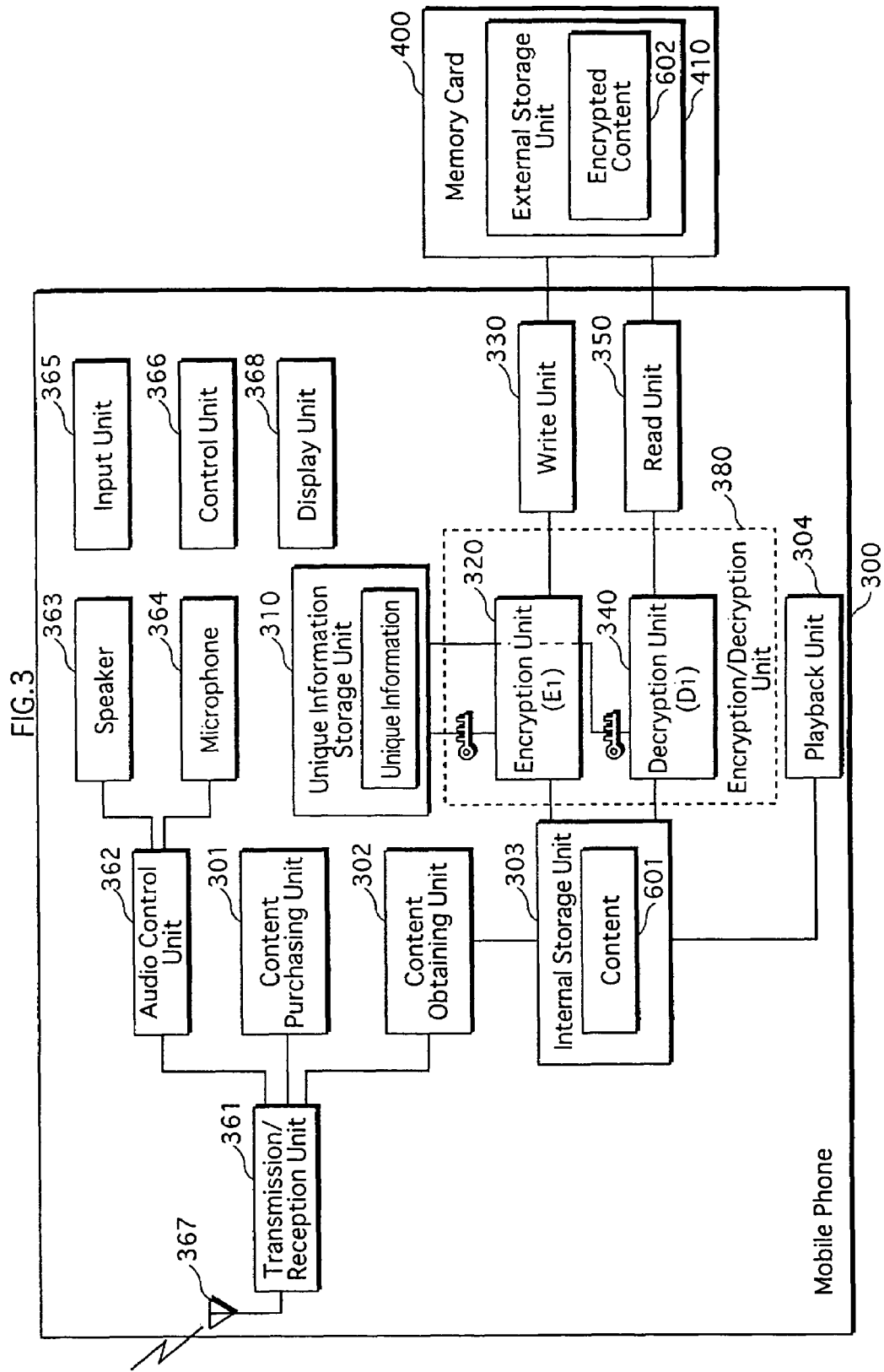
FIG. 3 is a block diagram showing the constructions of a mobile phone 300 and a memory card 400.

As shown in FIG. 3, the memory card 400 includes an external storage unit 410 that has storage areas for storing various types of information.

The memory card 400 is attached by the user to the mobile phone 300, so that various types of information are written into and read from the external storage unit 410 by the mobile phone 300.

1.4 Construction of Mobile Phone 300

As shown in FIG. 3, the mobile phone 300 is composed of an antenna 367, a transmission/reception unit 361, an audio control unit 362, a speaker 363, a microphone 364, an input unit 365, a control unit 366, a display unit 368, a content purchasing unit 301, a content obtaining unit 302, an internal storage unit 303, a playback unit 304, a unique information storage unit 310, a write unit 330, a read unit 350, and an encryption/decryption unit 380. The encryption/decryption unit 380 is composed of an encryption unit 320 and a decryption unit 340.

To be more specific, the mobile phone 300 is composed of a microprocessor, ROM, RAM, a liquid crystal display unit, a ten-key, and other components. The RAM stores a computer program, and the mobile phone 300 performs its function partly by the microprocessor operating in accordance with the computer program.

(1) Antenna 367, Transmission/Reception Unit 361, Audio Control Unit 362, Speaker 363, Microphone 364, Input unit 365, Control Unit 366, and Display Unit 368

The antenna 367 transmits and receives radio waves.

The transmission/reception unit 361 performs transmission and reception of various types of information between the audio control unit 362 and another mobile phone via the mobile phone network 20, the radio base station 30, and the antenna 367. In addition, the transmission/reception unit 361 performs transmission and reception of various types of information between the content distribution server device 200 and content purchasing unit 301 or between the content distribution server device 200 and the content obtaining unit 302 via the Internet 10, the mobile phone network 20, the radio base station 30, and the antenna 367.

The audio control unit 362 converts audio information that is received from another mobile phone into electrical analog signals, and outputs the resulting signals to the speaker 363. In addition, the audio control unit 362 converts electrical analog signals that the microphone 364 receives into audio information, and outputs the resulting audio information to another mobile phone.

The speaker 363 performs conversion of the electrical analog signals into audio data, followed by audio output, whereas the microphone 364 performs conversion of the audio input into electrical analog signals, followed by output of the resulting signals to the audio control unit 362.

The input unit 365 is provided with a ten-key and other keys, and receives various inputs from the user.

The control unit 366 controls the operations of each unit constituting the mobile phone 300.

The display unit 368 is composed of a liquid crystal display unit, and displays various types of information.

(2) Unique Information Storage Unit 310

The unique information storage unit 310 is composed of a semiconductor memory that is protected from being externally read or written with any devices other than a specifically permitted device such as a model change device, which will be described later. The unique information storage unit 310 prestores unique information.

Here, the unique information refers to information that is unique to the mobile phone 300 and that is composed of the telephone number allotted to the mobile phone, a randomly generated number allotted to the mobile phone, or the like.

(3) Internal Storage Unit 303

The internal storage unit 303 is composed of a semiconductor memory that is neither readable nor writable externally, and has storage areas for storing contents received from the content distribution server device 200.

(4) Content Purchasing Unit 301

The content purchasing unit 301 receives from the input unit 365 a content ID identifying the content that the user selects to purchase, generates payment information indicating the necessary payment made for purchasing the content, and transmits the content ID together with the payment information to the content distribution server device 200 via the transmission/reception unit 361, the antenna 367, the radio base station 30, the mobile phone network 20, and the Internet 10.

Here, transmission of the content ID and the payment information between the mobile phone 300 and the content distribution server device 200 is performed in a secure manner through the use of, for example, the SSL protocol.

(5) Content Obtaining Unit 302

The content obtaining unit 302 receives a content from the content distribution server device 200 via the Internet 10, the mobile phone network 20, the radio base station 30, the antenna 367, and the transmission/reception unit 361, and writes the received content into the internal storage unit 303 as a content 601.

Here, transmission of the content from the content distribution server device 200 to the mobile phone 300 is performed in a secure manner through the use of, for example, the EMMS system.

(6) Playback Unit 304

In response to a playback instruction inputted by the user via the input unit 365, the playback unit 304 reads the content 601 from the internal storage unit 303, and plays back the read content to output.

Here, in the case where the read content is a piece of music, the playback unit 304 converts the content into electrical analog signals, and outputs the resulting signals to the speaker 363.

Alternatively, in the case where the read content is a standby screen for mobile phones, the playback unit 304 converts the read content into pixel information, and outputs the resulting pixel information to the display unit 368.

As discussed above, the playback unit 304 performs different processing depending on the type of content.

(7) Encryption Unit 320

In response to a write instruction inputted by the user via the input unit 365, the encryption unit 320 reads the content 601 from the internal storage unit 303, and the unique information from the unique information storage unit 310.

Next, the encryption unit 320 applies encryption algorithm E1 to the read content using the read unique information as a key to generate an encrypted content, and outputs the encrypted content to the write unit 330.

Here, as one example, encryption algorithm E1 is an algorithm based on DES (Data Encryption Standard).

Note that each block shown in FIG. 3 is connected with another block with a connecting line, but some of the connecting lines are omitted in the figure. Here, each connecting line shows a path through which signals and information are transmitted. Further, among a plurality of connecting lines that are in direct connection with the block representing the encryption unit 320, each connecting line marked with a key symbol represents a path through which information that serves as a key is transmitted. The same description applies to the block of the decryption unit 340, and also to the corresponding blocks in other figures.

(8) Write Unit 330

The write unit 330 receives the encrypted content from the encryption unit 320, and writes the encrypted content as an encrypted content 602 into the external storage unit 410 which is included in the memory card 400.

(9) Read Unit 350

In response to a read instruction inputted by the user via the input unit 365, the read unit 350 reads the encrypted content 602 from the external storage unit 410 of the memory card 400, and outputs the encrypted content to the decryption unit 340.

(10) Decryption Unit 340

The decryption unit 340 receives the encrypted content from the read unit 350, and reads the unique information from the unique information storage unit 310.

Next, the decryption unit 340 applies decryption algorithm D1 to the received encrypted content using the read unique information as a key, thereby to generate the content, and writes the generated content into the internal storage unit 303.

Here, decryption algorithm D1 is an algorithm for performing inversion of encryption algorithm E1. One example of decryption algorithm D1 is an algorithm based on DES.

1.5 Operations of Digital Work Distribution System 100

Figure 4:
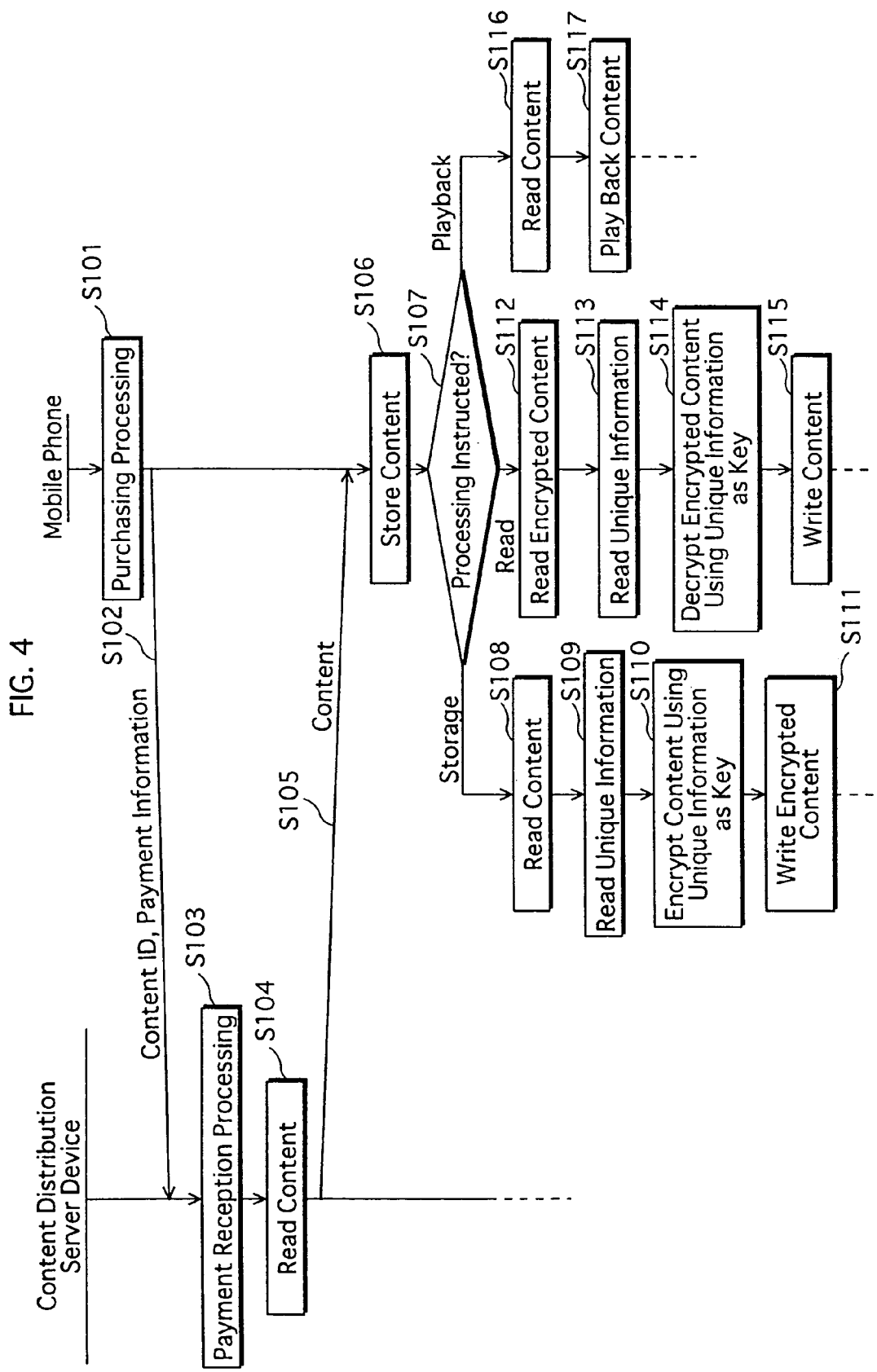
FIG. 4 is a flowchart showing the operations of the digital work distribution system 100.

Now, description is given to the operations of the digital work distribution system 100 with reference to the flowchart shown in FIG. 4.

Upon receipt of a content ID via the input unit 365, the content purchasing unit 301 of the mobile phone 300 generates payment information (step S101), and transmits the content ID and the payment information to the content distribution server device 200 in a secure manner through the use of, for example, SSL protocol (step S102).

The control unit 202 of the content distribution server device 200 receives the content ID and the payment information from the mobile phone 300 (step S102), then performs processing for receiving the payment based on the transmitted payment information (step S103). Thereafter, the control unit 202 reads from the content storage unit 201 the content identified by the received content ID (step S104), then transmits the read content to the mobile phone 300 in a secure manner through the use of, for example, SSL protocol (step S105).

The content obtaining unit 302 of the mobile phone 300 receives the content from the content distribution server device 200 (step S105), and writes the received content into the internal storage unit 303 as the content 601 (step S106).

Upon receipt of a content write instruction of via the input unit 365 (step S107), the encryption unit 320 reads the content 601 from the internal storage unit 303 (step S108), and the unique information from the unique information storage unit 310 (step S109). Next, the encryption unit 320 applies encryption algorithm E1 using the read unique information as a key, thereby to generate an encrypted content (step S110), and the write unit 330 writes the encrypted content into the external storage unit 410 of the memory card 400 as the encrypted content 602 (step S111).

Alternatively, upon receipt of a content read instruction via the input unit 365 (step S107), the read unit 350 reads the encrypted content 602 from the external storage unit 410 of the memory card 400 (step S112), and the decryption unit 340 reads the unique information from the unique information storage unit 310 (step S113). Next, the decryption unit 340 applies decryption algorithm D1 to the received encrypted content using the read unique information as a key, thereby to generate the content (step S114), and writes the generated content into the internal storage unit 303 (step S115).

Alternatively, upon receipt of a playback instruction via the input unit 365 (step S107), the playback unit 304 reads the content 601 from the internal storage unit 303 (step S116), and plays back the read content (step S117).

1.6 Operating Procedure Performed by User of Mobile Phone 300

Hereinafter, description is given to the operating procedure that the user of the mobile phone 300 performs.

(1) First, with the use of the content purchasing unit 301 of the mobile phone 300, the user selects and purchases a content from among the contents stored in the content storage unit 201 of the content distribution server device 200. Then, with the use of the content obtaining unit 302, the user obtains the content that he has purchased. The content is then stored into the internal storage unit 303 of the mobile phone 300.

(2) Next, in the case where the purchased content is, for example, a ringer melody, the user sets the mobile phone 300 such that the playback unit 304 plays back the ringer melody upon receipt of an incoming call.

(3) Further, the user may store the content 601 that he purchased earlier and that is stored in the internal storage unit 303 into the memory card 400 in the following procedure.

(3.1) The user attaches the memory card 400 to the mobile phone 300, and instructs the mobile phone 300 to store the purchased content into the memory card.

(3.2) In response, the content 601 stored in the internal storage unit 303 of the mobile phone 300 is encrypted by the encryption unit 320 using the unique information stored in the unique information storage unit 310, and consequently an encrypted content is generated. Then, the encrypted content is stored by the write unit 330 as the encrypted content 602 into the external storage unit 410 included in the memory card 400.

(4) Still further, the user may fetch the encrypted content 602 from the external storage unit 410 included within the memory card 400, and store the fetched content into the internal storage unit 303 of the mobile phone 300 in the following procedure.

(4.1) The user attaches the memory card 400 into the mobile phone 300, and instructs the mobile phone 300 to fetch the encrypted content from the memory card 400.

(4.2) In response, the encrypted content 602 stored in the external storage unit 410 included in the memory card 400 is read by the read unit 350 of the mobile phone 300. Then, the read encrypted content is decrypted by the decryption unit 340 using the unique information stored in the unique information storage unit 310, and consequently, the content is generated. The generated content is then stored in the internal storage unit 303 of the mobile phone 300.

1.7 Modification 1

The above description is given to the procedure for storing a content that has been purchased into the memory card 400, and for fetching the stored content from the memory card 400. Yet, whether the content is purchased, i.e., whether obtaining the content requires payment of a certain fee, is not an essential matter to the present invention. That is, for example, the above procedure is applicable not only to the content that the user has purchased, but also to a content, such as a free sample, that has been distributed to the user free of charge.

1.8 Modification 2

Here, description is given to a mobile phone 300b and a memory card 400b which are modifications of the mobile phone 300 and the memory card 400, respectively.

The mobile phone 300b and the memory card 400b have constructions similar to the mobile phone 300 and the memory card 400, respectively. Thus, description below is given mainly to the differences with the mobile phone 300 and with the memory card 400.

(1) Construction of Memory Card 400b

Figure 5:
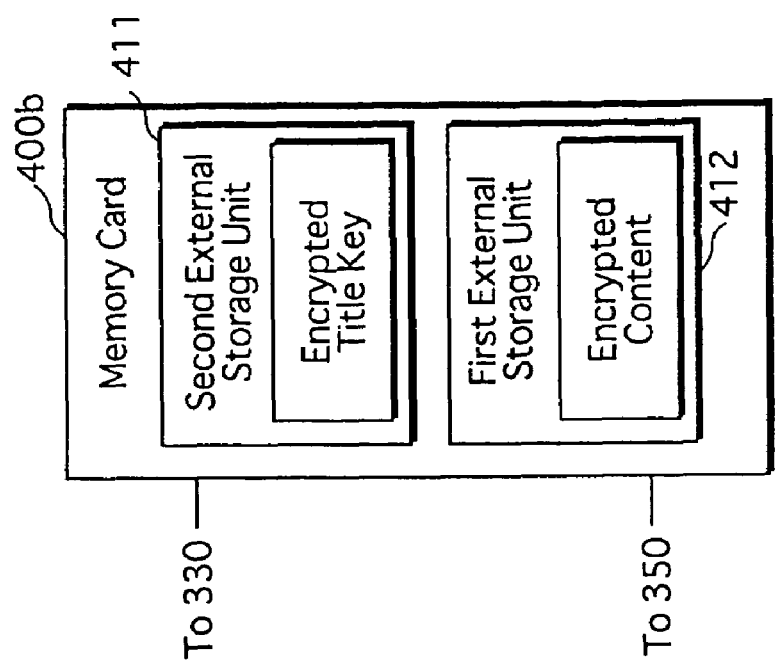
FIG. 5 is a block diagram showing the construction of a memory card 400b.

As shown in FIG. 5, the memory card 400b includes a first external storage unit 412 and a second external storage unit 411.

The second external storage unit 411 has a storage area for storing an encrypted title key, which will be descried later, while the first external storage unit 412 has a storage area for storing an encrypted content.

(2) Construction of Mobile Phone 300b

Figure 6:
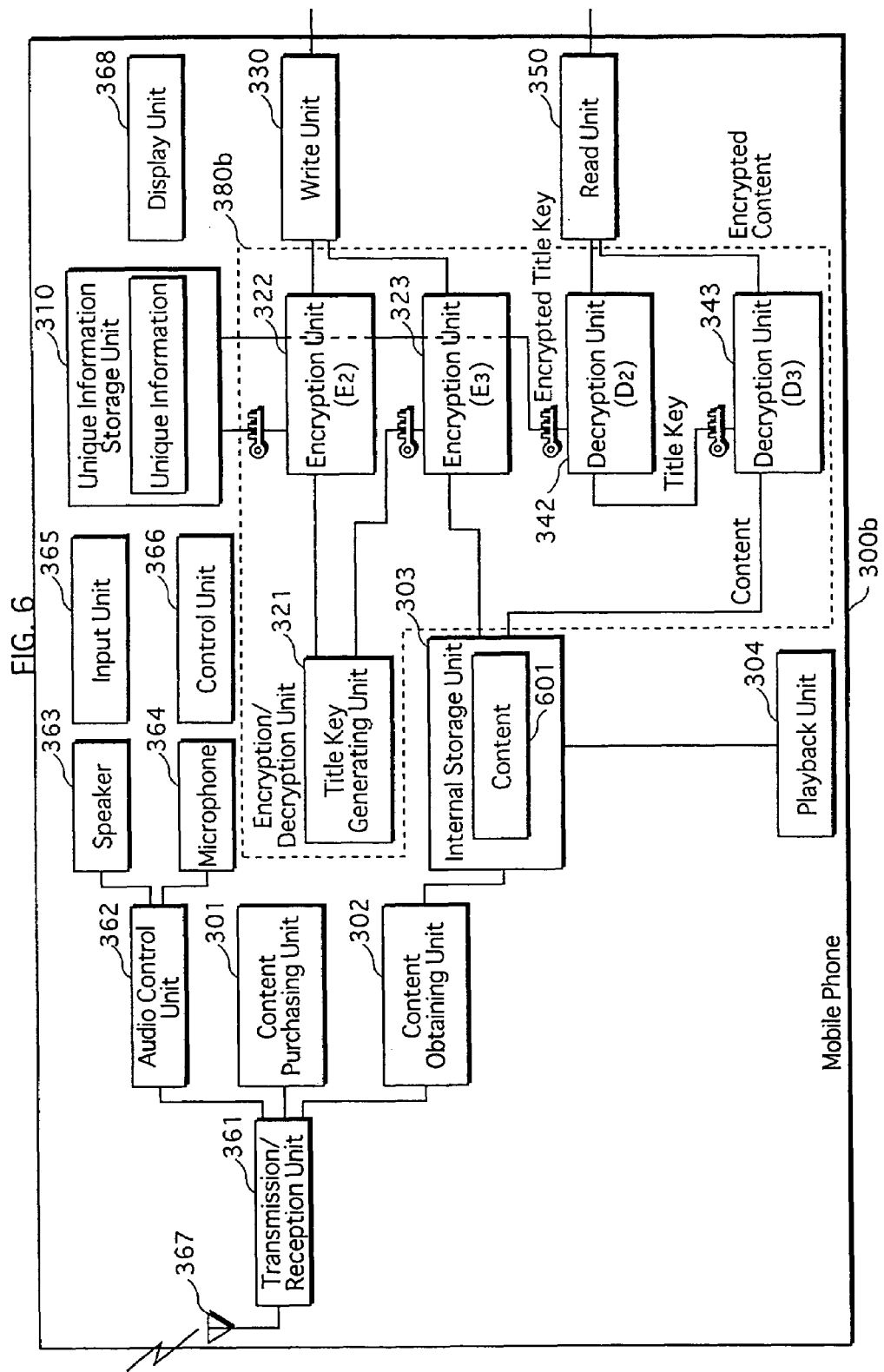
FIG. 6 is a block diagram showing the construction of a mobile phone 300b.

As shown in FIG. 6, the mobile phone 300b includes encryption/decryption unit 380b instead of the encryption/decryption unit 380 that the mobile phone 300 includes. The mobile phone 300b differs from the mobile phone 300 only with this respect. Components constituting the mobile phone 300b that are identical to those constituting the mobile phone 300 are denoted by the same reference numbers.

The encryption/decryption unit 380b includes a title key generating unit 321, an encryption unit 322, an encryption unit 323, a decryption unit 342, and decryption unit 343.

(Title Key Generating Unit 321)

The title key generating unit 321 generates a random number every time the content 601 stored in the internal storage unit 303 is encrypted, and outputs to the encryption units 322 and 323 the generated random number as a title key that is unique to each content.

(Encryption Unit 322)

The encryption unit 322 reads the unique information from the unique information storage unit 310, and receives the title key from the title key generating unit 321. Next, the encryption unit 322 applies encryption algorithm E2 to the received title key using the read unique information as a key, thereby to generate an encrypted title key, and outputs the encrypted title key to the write unit 330.

Here, encryption algorithm E2, for example, is based on DES.

(Encryption Unit 323)

The encryption unit 323 receives the title key from the title key generating unit 321, and reads the content 601 from the internal storage unit 303. Next, the encryption unit 323 applies encryption algorithm E3 to the read content using the received title key as a key, thereby to generate an encrypted content, and outputs the generated encrypted content to the write unit 330.

(Write Unit 330)

The write unit 330 receives the encrypted title key from the encryption unit 322, and writes the received encrypted title key into the second external storage unit 411 of the memory card 400b. Further, the write unit 330 receives the encrypted content from the encryption unit 323, and writes the received encrypted content into the first external storage unit 412 in the memory card 400b.

(Read Unit 350)

The read unit 350 reads the encrypted content from the first external storage unit 412 and the encrypted title key and from the second external storage unit 411, both units of which are included in the memory card 400b. The read unit 350 then outputs the read encrypted title key and the read encrypted content to the decryption unit 342 and the decryption unit 343, respectively.

(Decryption Unit 342)

The decryption unit 342 receives the encrypted title key from the read unit 350, reads the unique information from the unique information storage unit 310, applies decryption algorithm D2 to the received encrypted title key using the read unique information as a key, thereby to generate the title key, and outputs the generated title key to the decryption unit 343.

Here, decryption algorithm D2 is an algorithm for performing inversion of encryption algorithm E2. One example of decryption algorithm D2 is an algorithm based on DES.

(Decryption Unit 343)

The decryption unit 343 receives the encrypted content from the read unit 350, and the title key from the decryption unit 342. The decryption unit 343 then applies decryption algorithm D3 to the received encrypted content using the received title key as a key, thereby to generate the content, and writes the generated content into the internal storage unit 303 as the content 601.

Here, decryption algorithm D3 is an algorithm for performing inversion of the encryption algorithm E3. One example of decryption algorithm D3 is an algorithm based on DES.

(3) Operations of Mobile Phone 300b

Now, description is given to the operations of the mobile phone 300b.

Note that overall operations performed by the digital work distribution system are shown in the flowchart in FIG. 4 provided that the steps S108-S111 and the steps S112-S115 are replaced with steps S131-S137 and the steps S141-S146 described blow, respectively.

(Operations for Storing Encrypted Content)

Figure 7:
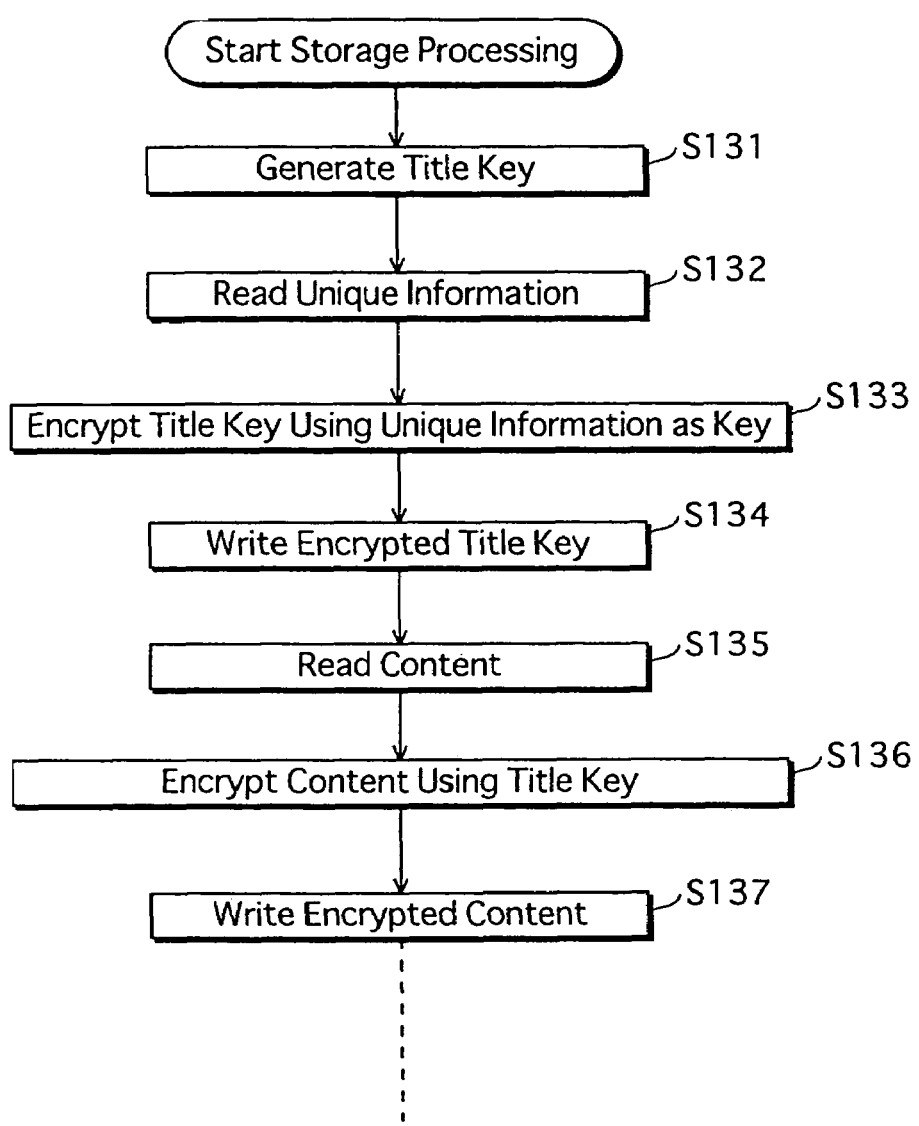
FIG. 7 is a flowchart showing the operations performed by the mobile phone 300b to generate an encrypted content and to write the encrypted content into the memory card 400b.

With reference to the flowchart shown in FIG. 7, description is given to the operations performed by the mobile phone 300b to generate the encrypted content as well as to write the encrypted content into the memory card 400b.

The title key generating unit 321 generates a title key (step S131). Next, the encryption unit 322 reads the unique information from the unique information storage unit 310 (step S132), and then applies encryption algorithm E2 to the received title key using the read unique information as a key, thereby generate an encrypted the title key (step S133). Successively, the write unit 330 receives the encrypted title key from the encryption unit 322, and writes the received encrypted title key into the second external storage unit 411 included in the memory card 400b (step S134). The encryption unit 323 then reads the content 601 from the internal storage unit 303 (step S135), and applies encryption algorithm E3 to the read content using the received title key as a key, thereby to generate the encrypted content (step S136). Thereafter, the write unit 330 writes the encrypted content into the first external storage unit 412 included in the memory card 400b (step S137).

(Operations for Decrypting Content)

Figure 8:
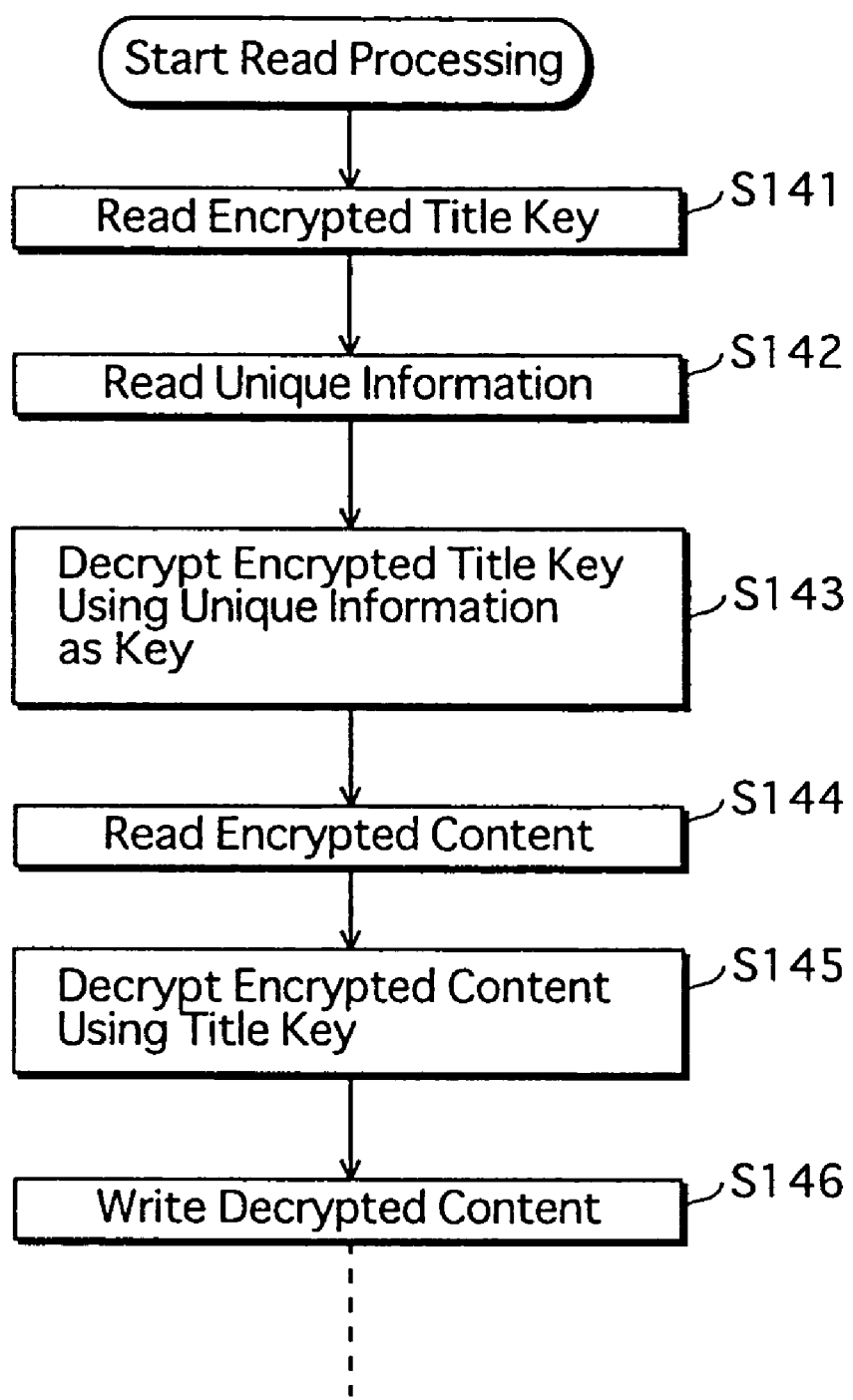
FIG. 8 is a flowchart showing the operations performed by the mobile phone 300b to read the encrypted content from the memory card 400b and to generate the content.

With reference to the flowchart shown in FIG. 8, description is given to the operations of the mobile phone 300b performed to read the encrypted content from the memory card 400b and to generate the content.

The read unit 350 reads the encrypted title key from the second external storage unit 411 included in the memory card 400b (step S141). Next, the decryption unit 342 reads the unique information from the unique information storage unit 310 (step S142), and applies decryption algorithm D2 to the read encrypted title key using the read unique information as a key, thereby to generate the title key (step S143). Next, the read unit 350 reads the encrypted content from the first external storage unit 412 included in the memory card 400b (step S144). Subsequently, the decryption unit 343 applies decryption algorithm D3 to the received encrypted content using the title key as a key, thereby to generate the content (step S145), and writes the generated content into the internal storage unit 303 as the content 601 (step S146).

1.9 Modification 3

(1) As described above, the encryption unit 320 and the decryption unit 340, in one example, employ a DES algorithm encryption algorithm.

In this case, the unique information stored in the unique information storage unit 310 may be a unique key having 56 bits.

Alternatively, the telephone number allotted to the mobile phone may be used as the unique information. In this case, the telephone number is subjected to a secret conversion function to output 56-bit unique information, which servers as the unique information.

Here, DES encryption may be employed as the secret conversion function in the following manner. That is, the telephone number is subjected to a DES encryption algorithm using a secret, fixed value having 56 bits to output a value having 64 bits. The last 56 bits of the value are used as the unique information.

(2) Further, the unique information storage unit 310 and the internal storage unit 303 are protected from being read or written from any external device other than a specially permitted device, such as a later-described model change device. To be more specific, each of the unique information storage unit 310 and the internal storage unit 303 are composed of tamper-resistant hardware, tamper-resistant software, or a combination of the two.

(3) Further, the unique information storage unit 310 may be constructed within a card that is attachable to and detachable from the mobile phone. Examples of such a card include a SIM (Subscriber Identity Module) card for use with mobile phones.

(4) Still further, at the time of encrypting the content using the DES encryption algorithm, the content is divided into data blocks each having 64 bits, and then each data block is encrypted using the 56-bit unique key to generate a 64-bit encrypted data block. The thus generated encrypted data blocks are then concatenated together, and the concatenated encrypted data blocks are outputted as the encrypted content (ECB (Electronic Codebook) mode). Alternatively, the encryption may be done using CBC (Cipher Feedback Chaining) mode. Details of the ECB mode and the CBC mode are found, for example, in "Introduction to Cryptographic Theory (Ango-Riron Nyumon)" (Eiji OKAMOTO, published by Kyoritsu Shuppan CO., LTD.), and thus their description is omitted.

1.10 Overview

Generally, the internal storage unit 303 of the mobile phone 300 is limited in its memory capacity. Conventionally, this limitation results in the following problem. In a case where the internal storage unit 303 is full with digital works, the user is required to delete some of the digital works stored in the internal storage unit 303 to secure a free memory space before purchasing another digital work, or he simply has to give up purchasing another digital work.

However, according to embodiment 1, the user is allowed to store some of the digital works stored in the internal storage unit of the mobile phone into the memory card attached the mobile phone when he decides not to use the digital works any time soon. In this manner, a free memory space is secured in the internal storage unit of the mobile phone without losing the rights to playback those digital works he has purchased. As a consequence, the user is allowed to purchase some more digital works.

Here, some of the copyright holders of digital works may not permit the following usage pattern. That is, for example, when an encrypted content is stored into a memory card using a certain mobile phone, the copyright holder of the content desires that the content be prohibited to be decrypted or played back by any other mobile phones even if the memory card is attached thereto.

Here, embodiment 1 meets this end in that an encrypted content that a user has stored in a memory card using a certain mobile phone is neither decrypted nor played back with any other mobile phones than that particular one even if the memory card is attached thereto.

In other words, the rights of copyright holders are protected as the digital content stored into a memory card being attached to a mobile phone is not decrypted or played back by any mobile phones other than that particular mobile phone used at the time of storing the content. This advantageous feature will be described in detail with reference to FIG. 9.

Figure 9:
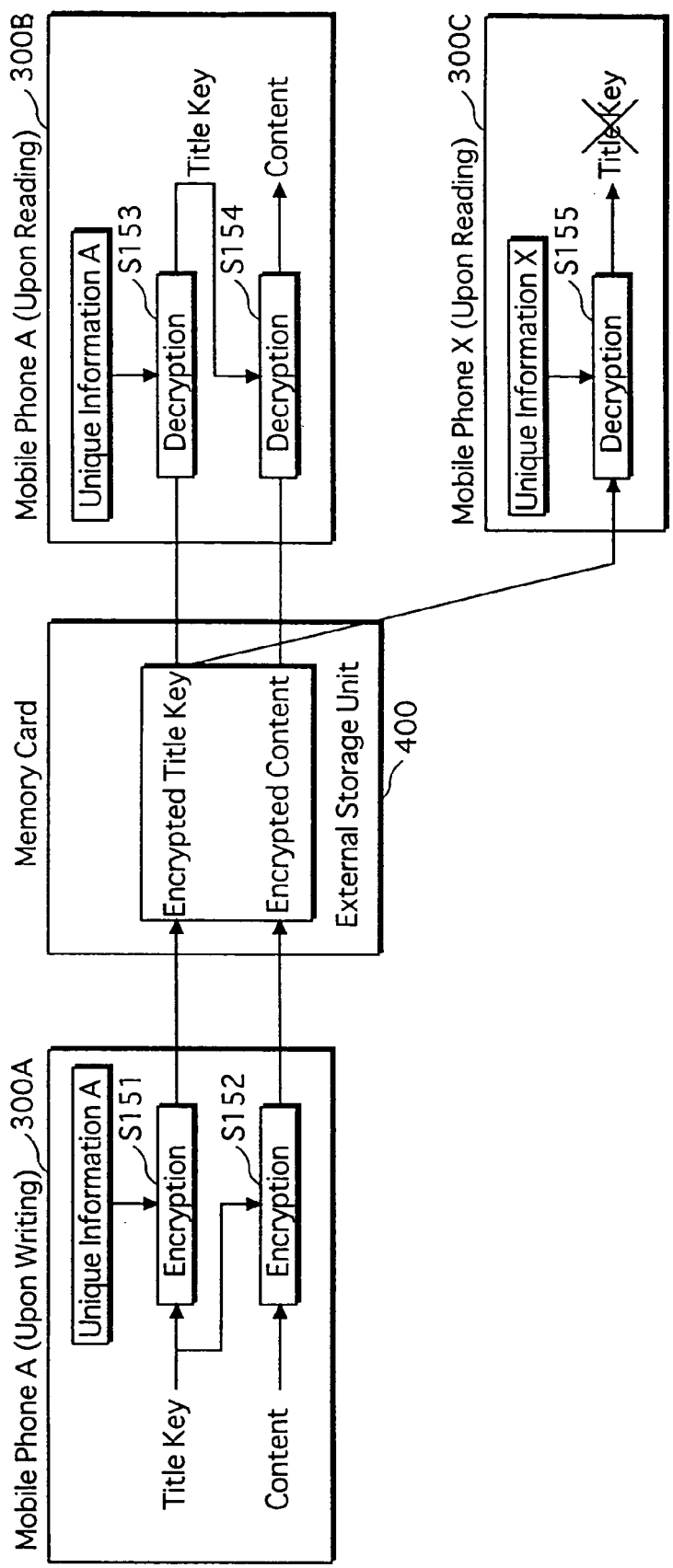
FIG. 9 shows the operations to play back the content performed by a mobile phone A and by a mobile phone X.

As shown in FIG. 9, a mobile phone A stores unique information A, while a mobile phone X stores unique information X.

Upon writing a content into a memory card, the mobile phone A encrypts a title key using the unique information A, and stores the encrypted title key into the external storage unit included in the memory card (step S151). Next, the mobile phone A encrypts the content using the title key, and stores the encrypted content into the external storage unit of the memory card (step S152).

Upon reading the encrypted content from the memory card, the mobile phone A reads the encrypted title key from the external storage unit included in the memory card, and decrypts the encrypted title key using the unique information A (step S153). Next, the mobile phone A reads the encrypted content from the external storage unit, and decrypts the encrypted content using the decrypted title key (step S154).

Here, the unique information used to encrypt the title key and the unique information used to decrypt the encrypted title key are both the same unique information A, so that the encrypted title key is correctly decrypted. Consequently, the title key used to encrypt the content and the title key used to decrypt the encrypted content are the same, so that the content is correctly decrypted.

On the other hand, when the mobile phone X attempts to play back the content, the mobile phone X reads the encrypted title key from the external storage unit included in the memory card, and decrypts the title key using the unique information X (step S155).

Here, the unique information A that is used to encrypt the title key differs from the unique information X used to decrypt the title key. Consequently, the title key is not correctly decrypted, so that the encrypted content is not correctly decrypted, either.

Therefore, the mobile phone X fails to play back the encrypted content.

2. Preferred Embodiment 2

Hereinafter, description is given to a digital work distribution system 100c consistent with preferred embodiment 2 of the present invention.

The digital work distribution system 100c aims to provide a digital work protection system, a main device, and a recording medium device, each of which allows playback of a digital work by the main device only under the conditions permitted according to usage condition data when the content is provided with usage condition data such as the permitted number of playback times for the digital work, or the permitted period. That is, with these devices, this embodiment aims to permit playback of digital works by the main device based on the usage condition information showing permissive conditions for usage of the digital work.

In the digital work distribution system 100c, when a content is provided with usage condition data, such as a limitation on the permitted number of playback times, the permitted playback period, or the permitted total amount of time playback, the mobile phone of the system is allowed to play back the content only within the limitations imposed by the usage condition data.

The digital work distribution system 100c has a construction similar to that of the digital work distribution system 100. Here, description is given mainly to the differences with the digital work distribution system 100.

The digital work distribution system 100c includes a content distribution server device 200c and a mobile phone 300c instead of the content distribution server device 200 and the mobile phone 300, respectively.

2.1 Construction of Content Distribution Server Device 200c

Basically, the content distribution server device 200c has a construction similar to that of the content distribution server device 200 included in the digital work distribution system 100. Thus, description hereinafter is given mainly to the differences with the content distribution server device 200.

(Content Storage Unit 201)

In addition to the content, the content storage unit 201 included in the content distribution server device 200c further prestores a usage condition in correspondence with the content.

The usage condition, for example, is a permitted number of playback times. The permitted number of playback times imposes a limitation on the total number of times that the user is permitted to play back the stored content that corresponds to the usage condition. When, for example, the permitted number of playback times is set at "10", the user is permitted to play back the content for ten times at the maximum.

Note that the usage condition may alternatively be a permitted playback period. The permitted playback period imposes a limitation on the period during which the user is permitted to play back the stored content that corresponds to the usage condition. The permitted playback period is composed of data showing the permission starting day and permission expiration day. The user is permitted to play back the content only during the period starting on the permission starting day and expiring on the permission expiration day. During this period, the user is permitted to playback the content an unlimited number of times.

Alternatively, the usage condition may be a permitted total amount of playback time. The permitted total amount of playback time imposes a limitation on a total cumulative amount of time that the user is permitted to play back the stored content that corresponds to the usage condition. When, for example, the permitted total amount of playback time is set at "10 hours", the user is permitted to play back the content as long as the total amount of playback time is within 10 hours. When the total amount of playback time exceeds 10 hours, playback of the content is prohibited.

Further, the usage condition may include all of the limitations, namely the permitted number of playback times, the permitted playback period, and the permitted total amount of playback time, or it may include any two limitations selected from the above three limitations.

(Control Unit 202)

The control unit 202 reads from the content storage unit 201 the content that is identified by the content ID along with the usage condition that is stored in correspondence to that content. The control unit 202 then transmits the read content and usage condition to the mobile phone 300 via the transmission/reception unit 203, the Internet 10, the mobile phone network 20, and the radio base station 30. Here, the transmission is performed in a secure manner through the use of, for example, the EMMS system.

2.2 Construction of Mobile Phone 300c

Figure 10:
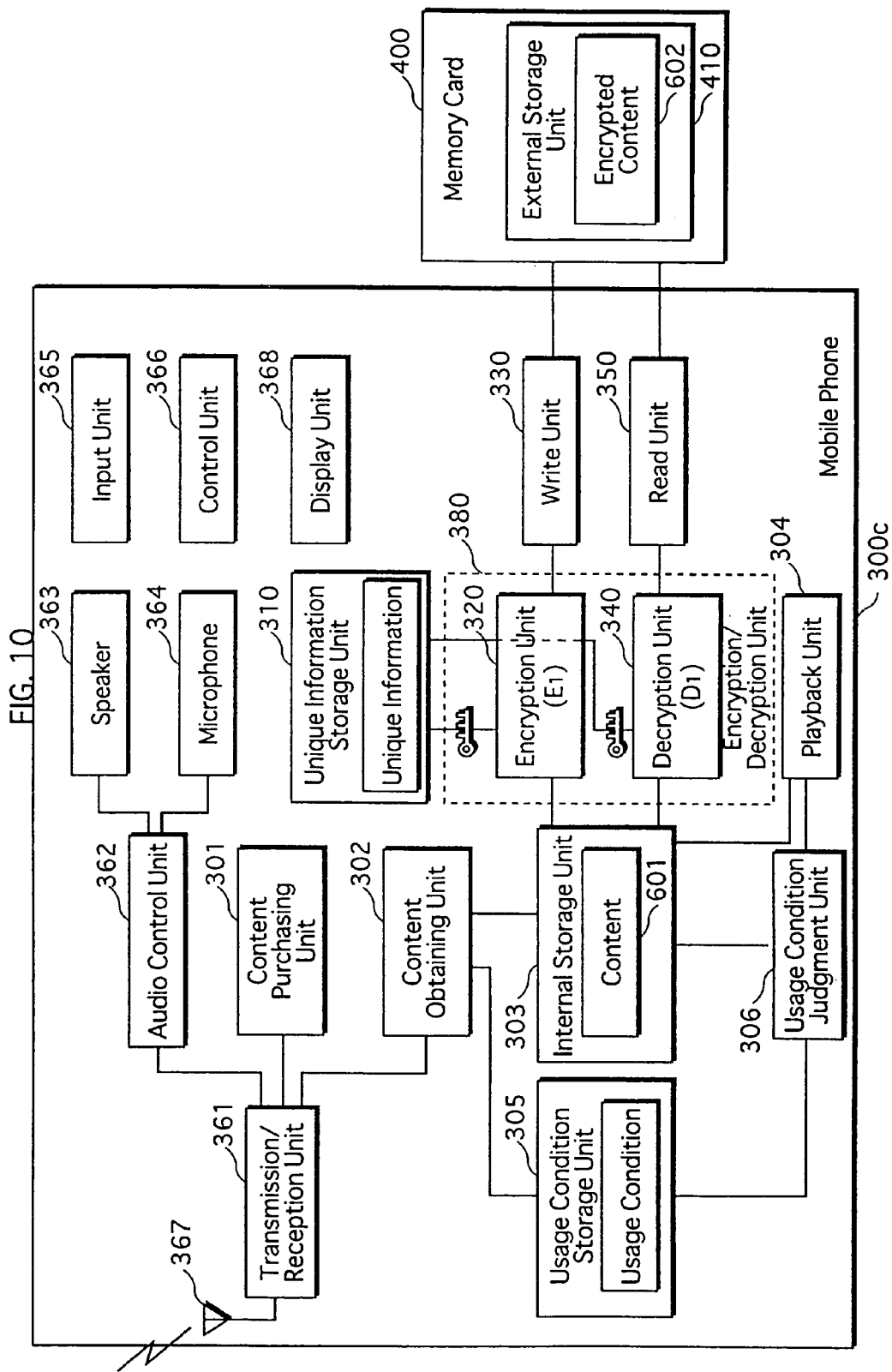
FIG. 10 is a block diagram showing the constructions of a mobile phone 300c and the memory card 400.

As shown in FIG. 10, the mobile phone 300c includes a usage condition storage unit 305 and a usage condition judgment unit 306 in addition to the components constituting the mobile phone 300.

(Content Obtaining Unit 302)

The content obtaining unit 302 receives the content and usage condition from the content distribution server device 200c via the Internet 10, the mobile phone network 20, the radio base station 30, the antenna 367, and transmission/reception unit 361. The content obtaining unit 302 then writes the received content into the internal storage unit 303 as the content 601, and the received usage condition into the usage condition storage unit 305. In this case, the usage condition is the permitted number of playback times.

(Usage Condition Storage Unit 305)

The usage condition storage unit 305 has a storage area for storing the usage condition.

(Usage Condition Judgment Unit 306)

The usage condition judgment unit 306 reads the usage condition, i.e., the permitted number of playback times, from the usage condition storage unit 305 to judge whether the read permitted number of playback times exceeds 0.

When judging that the read permitted number of playback times exceeds 0, the usage condition judgment unit 306 subtracts "1" from the read permitted number of playback times, and overwrites the usage condition stored in the usage condition storage unit 305 with the value resulting from the subtraction. Next, the usage condition judgment unit 306 outputs permission information indicative of permission to play back the content stored in the internal storage unit 303.

Alternatively, when judging that the read permitted number of playback times is equal to or less than 0, the usage condition judgment unit 306 does not output the permission information, and consequently the playback unit 304 does not play back the content.

(Playback Unit 304)

The playback unit 304 receives from the usage condition judgment unit 306 the permission information indicative of permission to play back the content.

Upon receipt of the permission information, the playback unit 304 reads the content stored in the internal storage unit 303, and plays back the read content to output.

2.3 Operations of Mobile Phone 300c

Figure 11:
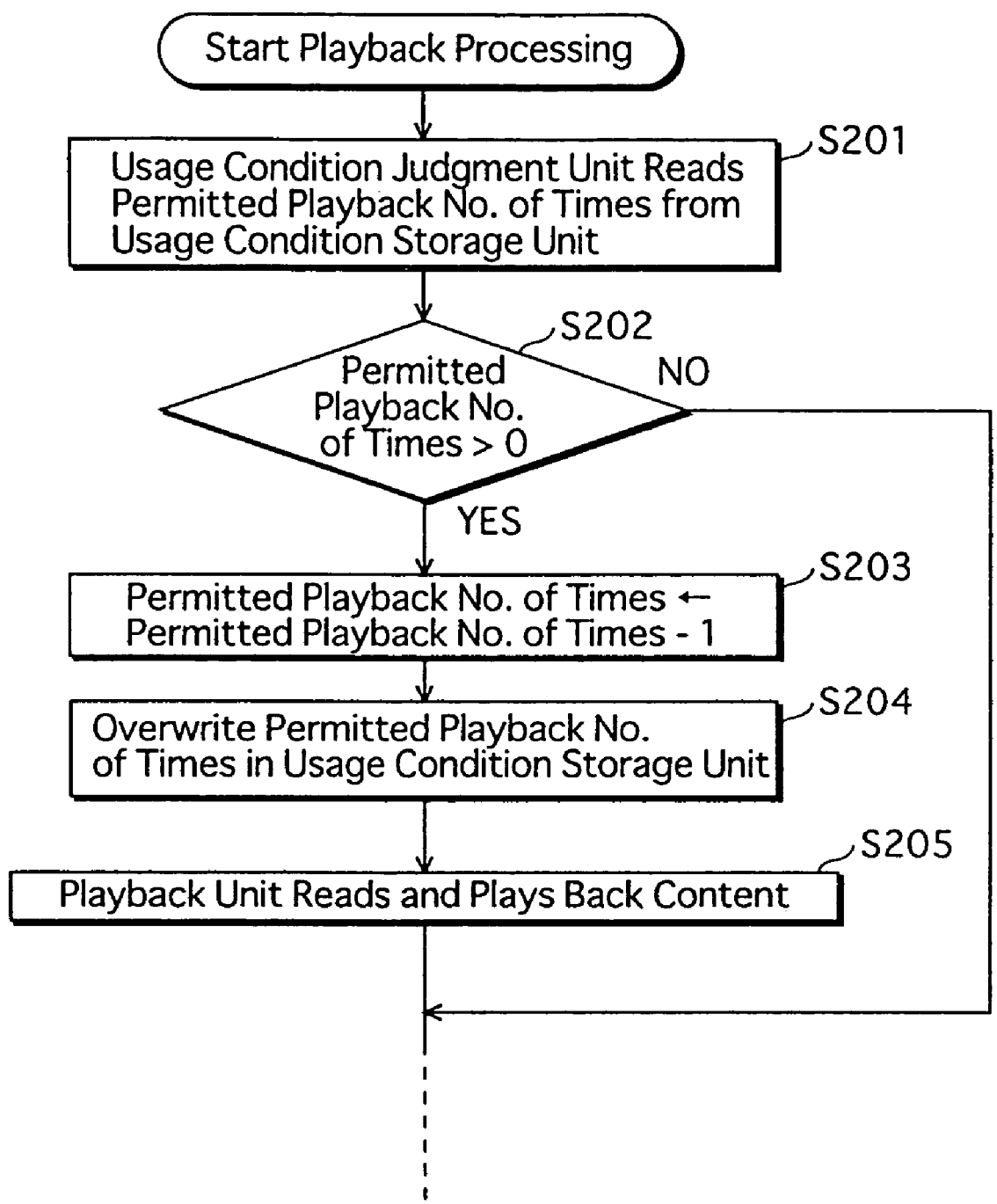
FIG. 11 is a flowchart showing the operations of the mobile phone 300c.

Now, description is given to the operations of the mobile phone 300c with reference to the flowchart shown in FIG. 11.

Note that overall operations of the digital work distribution system are shown in the flowchart in FIG. 4 provided that the steps S116 and S117 are replaced with steps S201-S205 described below.

The usage condition judgment unit 306 reads the usage condition, i.e., the permitted number of playback times (step S201), and judges whether the read permitted number of playback times exceeds 0 (step S202). When judging that the permitted number of playback times exceeds 0 (step S202, YES), the usage condition judgment unit 306 subtracts "1" from the permitted number of playback times (step S203), and overwrites the usage condition that is stored in the usage condition storage unit with the value resulting from the subtraction (step S204). Next, the usage condition judgment unit 306 outputs to the playback unit 304 the permission information indicative of permission to play back the content stored in the internal storage unit 303. In response, the playback unit 304 receives the permission information from the usage condition judgment unit 306, reads the content stored in the internal storage unit 303, and plays back the read content to output (step S205).

Alternatively, when judging that the read permitted number of playback times is equal to or less than 0 (step S202, NO), the usage condition judgment unit 306 does not output the permission information, and consequently the playback unit 304 does not play back the content. Here, such a setting to delete the content at this stage is also applicable.

2.4 Operations of Mobile phone 300c

Figure 12:
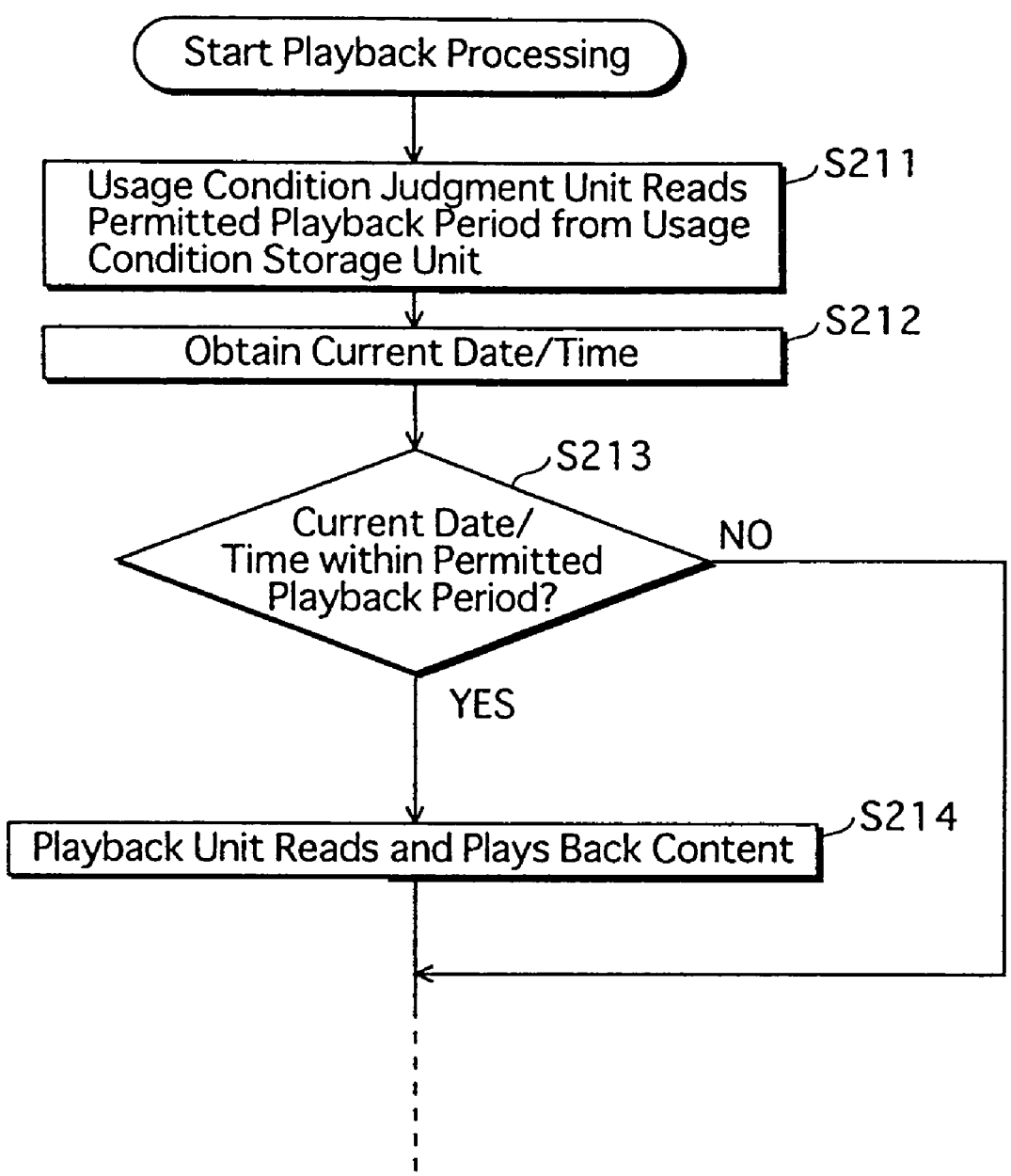
FIG. 12 is a flowchart showing the operations of the mobile phone 300c when the usage condition is a permitted playback period.

Now, with reference to the flowchart shown in FIG. 12, description is given to the operations of the mobile phone 300c in the case where the usage condition is the permitted playback period.

Note that the overall operations of the digital work distribution system are shown in the flowchart in FIG. 4 provided that the steps S116 and S117 are replaced with steps S211-S214 described below.

The usage condition judgment unit 306 reads the usage condition, i.e., the permitted playback period, from the usage condition storage unit 305 (step S211), obtains the current date/time (step S212), and judges whether the obtained current date/time falls within the permitted playback period (step S213). When judging that the current time/date is within the permitted playback period (step S213, YES), the usage condition judgment unit 306 outputs to the playback unit 304 the permission information indicative of permission to play back the content stored in the internal storage unit 303. In response, the playback unit 304 receives the permission information from the usage condition judgment unit 306, reads the content stored in the internal storage unit 303, and plays back the read content to output (step S214).

Alternatively, when judging that the current date/time falls out of the permitted playback period (step S213, NO), the usage condition judgment unit 306 does not output the permission information, and consequently the playback unit 304 does not play back the content. Here, such setting may be applicable that the content is deleted if the current date/time is after the permitted playback period.

2.5 Operations of Mobile Phone 300c

Figure 13:
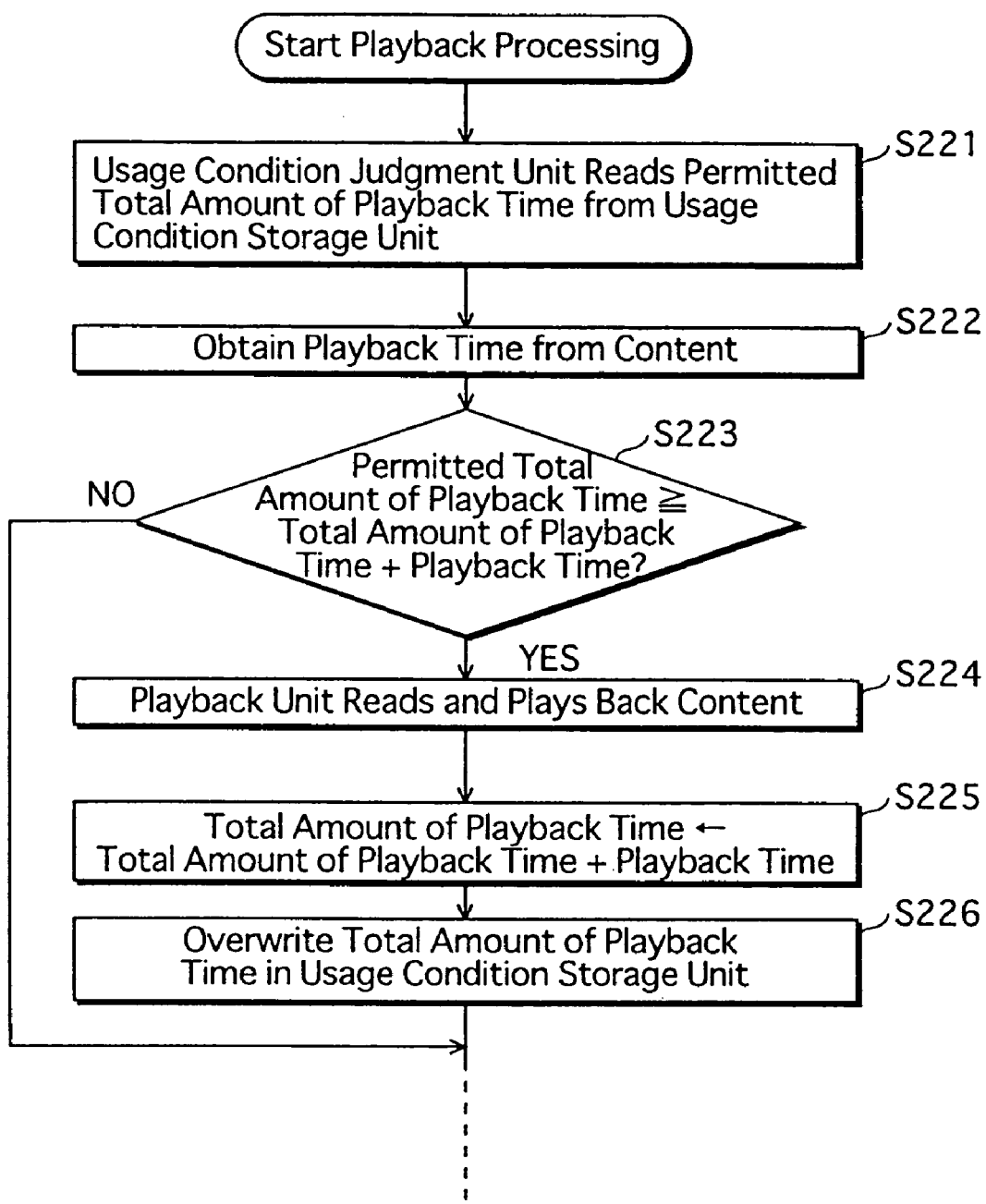
FIG. 13 is a flowchart showing the operations of the mobile phone 300c when the usage condition is the permitted total amount of playback time.

Next, with reference to the flowchart shown in FIG. 13, description is given to the operations of the mobile phone 300c in the case where the usage condition is the permitted total amount of playback time.

Note that overall operations of the digital work distribution system are shown in the flowchart in FIG. 4 provided that the steps S116 and S117 are replaced with steps S221-S226 described below.

Here, the content storage unit 201 further has a storage area for storing a total amount of actual playback time. The total amount of actual playback time is a cumulative amount of time that the content has been actually played back. Further, the content includes playback time information showing the time taken to play back the entire content.

The usage condition judgment unit 306 reads the usage condition, i.e., the permitted total amount of playback time, along with the total amount of actual playback time from the usage condition storage unit 305 (step S221), obtains from the content the playback time information showing the time taken to play back the content (step S222), and calculates the sum of the read total amount of actual playback time and the time shown by the obtained playback information to compare the thus calculated sum with the permitted total amount of playback time (step S223). When judging that the permitted total amount of playback time is equal to or greater than the calculated sum (step S223, YES), the usage condition judgment unit 306 outputs to the playback unit 304 the permission information indicative of permission to play back the content stored in the internal storage unit 303. In response, the playback unit 304 receives the permission information from the usage condition judgment unit 306, reads the content stored in the internal storage unit 303, and plays back the read content to output (step S224). Then, the usage condition judgment unit 306 calculates the total amount of actual playback time by performing the following expression: Total Amount of Actual Playback Time=(Total Amount of Actual Playback Time)+(Playback Time Information) (step S225), and overwrites the total amount of actual playback time stored in the usage condition storage unit 305 with the newly calculated total amount of actual playback time (step S226).

Alternatively, when judging that the permitted total amount of playback time is smaller than the calculated sum (step S223, NO), the usage condition judgment unit 306 does not output the permission information, and consequently, the playback unit 304 does not play back the content. Here, such setting may be applicable that the content is deleted if the permitted total amount of playback time is smaller than the total amount of actual playback time. Further, such setting may be also applicable that playback of the content is permitted even when the permitted total amount of playback time is not enough to play back the entire content.

2.6 Overview

As described above, the content storage unit 201 included in the content distribution server device 200c stores the content and the corresponding usage condition in association with each other, and the content distribution server device 200c transmits the content and the corresponding usage condition to the mobile phone 300c. When the user purchases the content that is provided with the usage condition, the internal storage unit 303 included in the mobile phone 300c stores the purchased content, and the usage condition storage unit 305 stores the transmitted usage condition.

When the user intends to play back the content that he has purchased earlier, the usage condition judgment unit 306 judges whether to permit playback of the content based on the corresponding usage condition stored in the usage condition storage unit 305. When judging to permit playback of the content, the usage condition judgment unit 306 instructs the playback unit 304 to play back the content.

Further, the usage condition may be the number of times permitted for the content to be copied or moved. Here, "to copy" the content refers to duplicate the content stored in the internal storage unit and to write the duplication of content into a recording medium. Here, note that only the first generation "copying" of content is permitted, i.e., copying from duplication of content is prohibited. In addition, "to move" the content refers to write the content stored in the internal storage unit into a recording medium and to delete the content stored in the internal storage unit. When the usage condition is the number of times permitted for the content to be copied or moved, the content is permitted to be copied or moved for the permitted number of times.

The procedure to encrypt the purchased content to store into the memory card 400 and the procedure to read the encrypted content from the memory card 400 to the mobile phone 300c are the same as those described in embodiment 1, and thus description thereof is omitted. Here, it should be noted that the usage condition data is not written into the memory card, but held in the usage condition storage unit 305 included in the mobile phone 300c.

Note that the usage condition storage unit 305 is protected from being externally read or written with any devices other than a specifically permitted device which will be described later. To be more specific, the usage condition storage unit 305 is composed of tamper-resistant hardware, tamper-resistant software, or a combination of the two.

Further, the usage condition storage unit 305 may be included in a card, such as SIM card for use with mobile phones that is attachable to and detachable from the mobile phone.

With the above construction, when a content is provided with a usage condition, the content is permitted to be played back only when the usage condition is met.

Generally speaking, the internal storage unit 303 of the mobile phone 300 is limited in its memory capacity. Conventionally, this limitation results in the following problem. In the case the internal storage unit is full with digital works, some of the digital works stored in the internal storage unit need to be deleted to secure a free memory space before purchasing another digital work, or otherwise, the user has to give up purchasing another digital work.

According to embodiment 2, however, similarly to embodiment 1, the user is allowed to store some of the digital works stored in the internal storage unit 303 of the mobile phone 300c into the memory card 400 attached to the mobile phone 300c when he decides not to use the digital works any time soon. In this manner, a free memory space is secured in the internal storage unit 303 without losing the rights to play back the purchased digital works, so that some more digital works may be purchased.

Further, with the above construction, when a content is encrypted by a certain mobile phone and stored in a memory card attached thereto, the encrypted content is not possibly decrypted or played back by any mobile phone other than that particular mobile phone. That is to say, embodiment 2 achieves an effect of meeting copyholders' demand that a content stored into a memory card using a certain mobile phone be prohibited from being decrypted or played back using any other mobile phone although the memory card is attached thereto.

3. Preferred Embodiment 3

Now, description is given to a digital work distribution system 100*d* consistent with preferred embodiment 3 of the present invention.

Similarly to the digital work distribution system 100*c*, when usage condition for is provided, the digital work distribution system 100*d* permits the mobile phone to play back the content only under the conditions satisfying the usage condition.

The digital work distribution system 100*d* has a construction similar to that of the digital work distribution system 100*c*. Thus, description is given mainly to the differences with the digital work distribution system 100*c*.

The digital work distribution system 100*d* includes a content distribution server device 200*d*, mobile phone 300*d*, and a memory card 400*d* instead of the content distribution server device 200*c*, the mobile phone 300*c*, and the memory card 400, respectively. Note that the content distribution server device 200*d* is the same as the content distribution server device 200*c*.

3.1 Memory Card 400*d*

Figure 14:
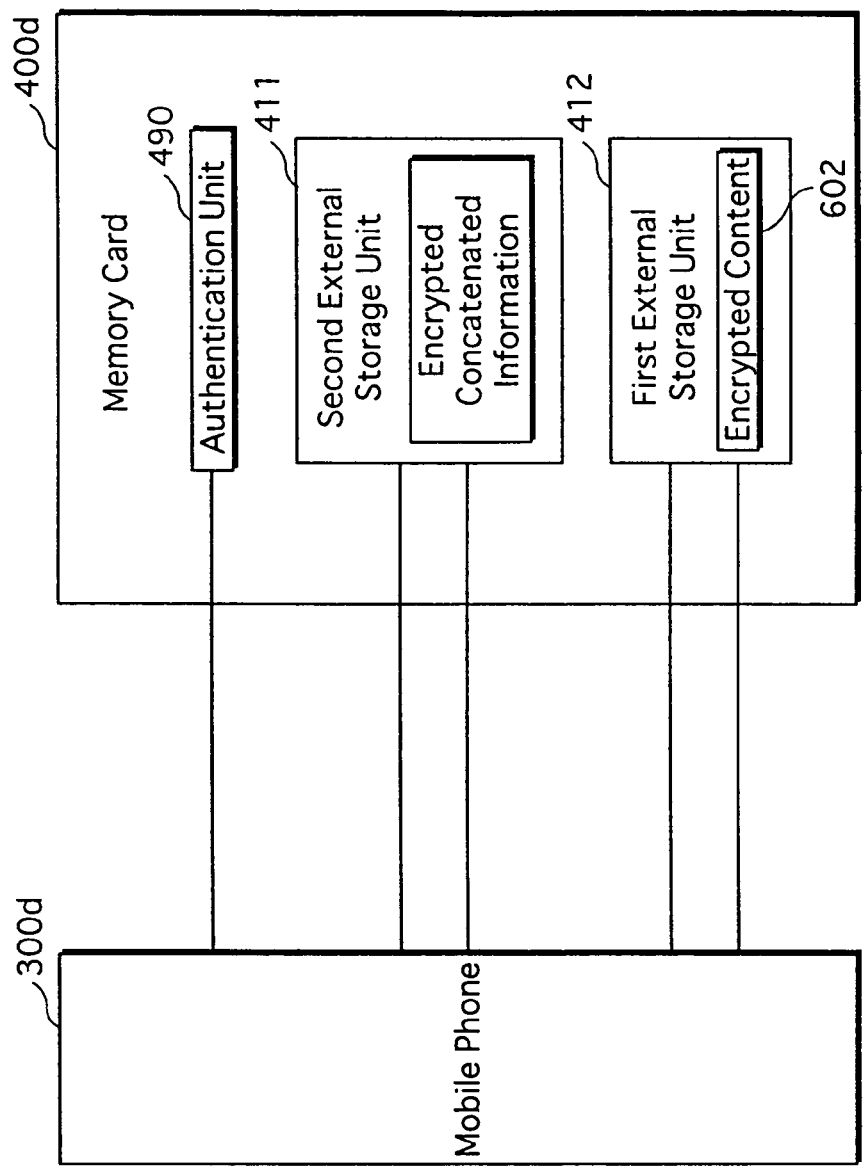
FIG. 14 is a block diagram showing the construction of a memory card 400d.

As shown in FIG. 14, the memory card 400*d* is composed of a first external storage unit 412, a second external storage unit 411, and an authentication unit 490.

The authentication unit 490 performs challenge-response type, mutual authentication with an authentication unit 390 (described later) included in the mobile phone 300*d*. To be more specific, the authentication unit 490 waits for the authentication unit 390 to authenticate the authentication unit 490, and then authenticates the authentication unit 390. Only when both the authentication processes are successful, the mutual authentication is regarded to be successful. Since the challenge-response type authentication is a known technique, description thereof is omitted.

The first external storage unit 412 has a storage area for storing an encrypted content.

The second external storage unit 411 is a storage unit that is read or written from another end, i.e., the mobile phone 300*d* only after authentication by the authentication unit 490 has been successfully performed. The second external storage unit 411 has a storage area for storing encrypted concatenated information which will be described later.

3.2 Construction of Mobile Phone 300*d*

The mobile phone 300*d* has a construction similar to that of the mobile phone 300*c*.

Figure 15:
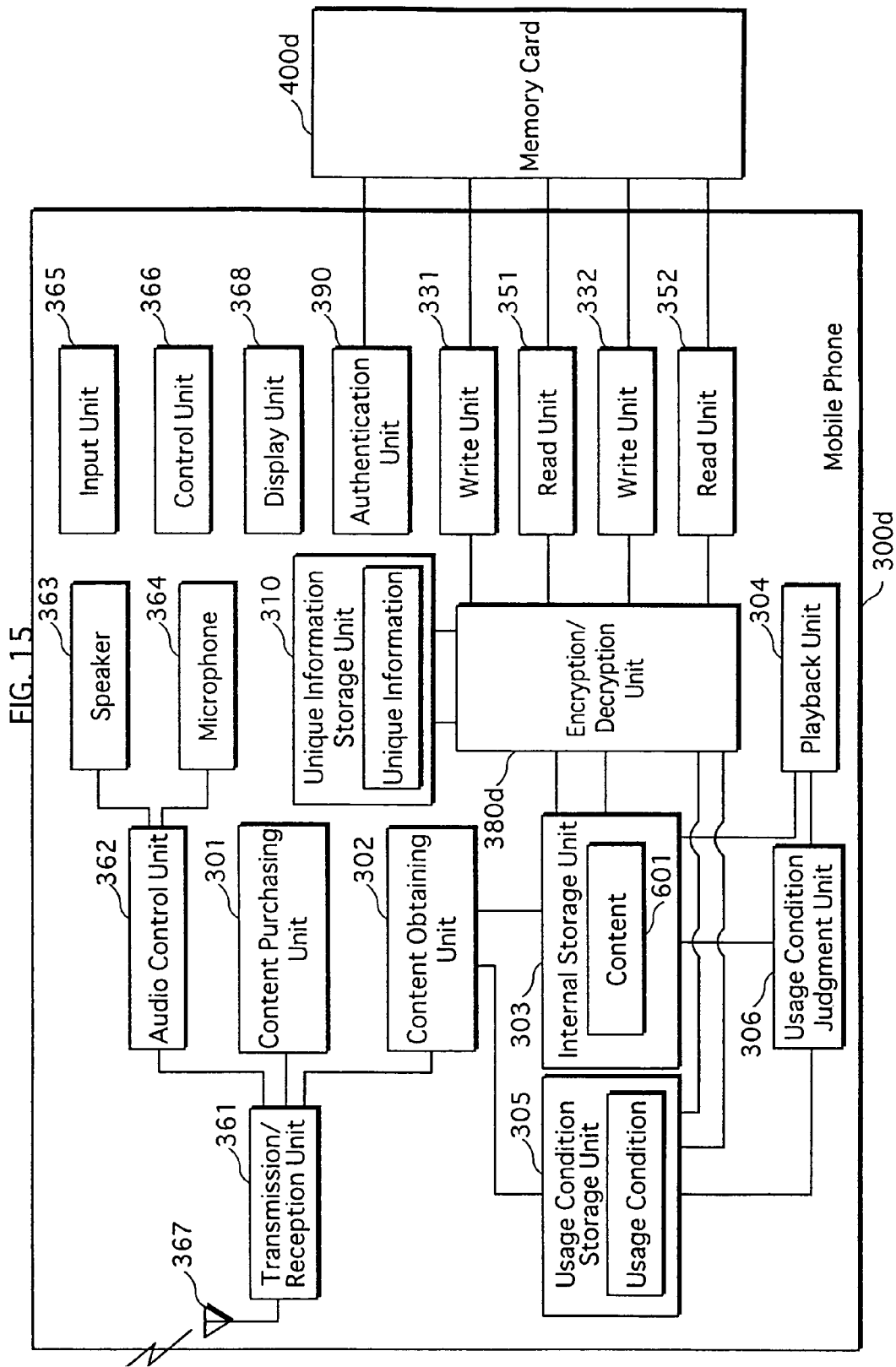
FIG. 15 is a block diagram showing the construction of a mobile phone 300d.
Figure 16:
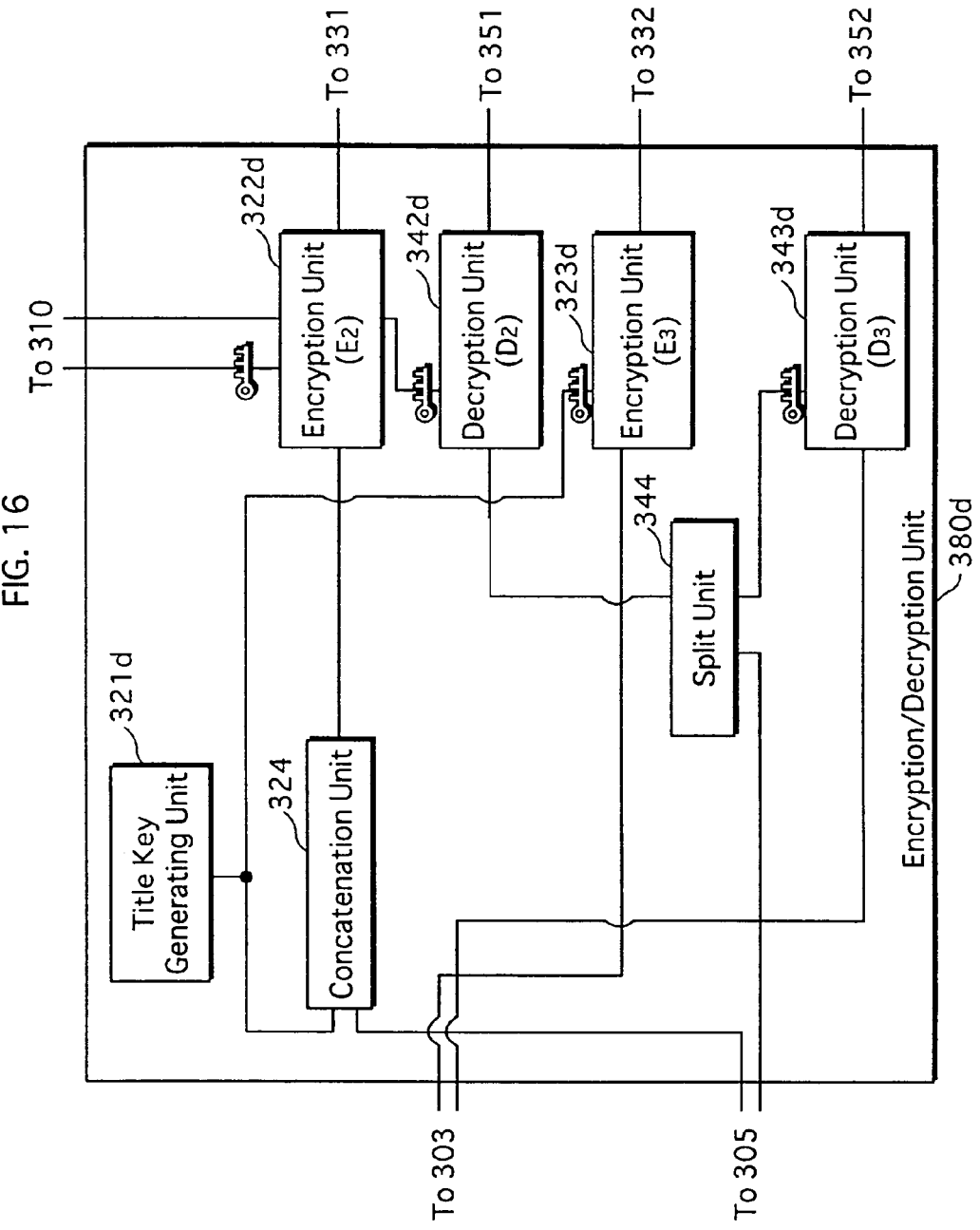
FIG. 16 is a block diagram showing the construction of an encryption/decryption unit 380d.

As shown in FIGS. 15 and 16, the mobile phone 300*d* includes an encryption/decryption unit 380*d* instead of the encryption/decryption unit 380 that is included in the mobile phone 300*c*, and also includes write units 331 and 332 as well as read units 351 and 352 instead of the write unit 330 and the read unit 350 that are included in the mobile phone 300*c*. The mobile phone 300*d* further includes the authentication unit 390. The other components are the same as those constituting the mobile phone 300*c*.

Here, description is given mainly to differences with the mobile phone 300*c*.

(1) Authentication Unit 390

The authentication unit 390 receives an authentication instruction from the control unit 366.

Upon receipt of the authentication instruction, the authentication unit 390 performs challenge-response type, mutual authentication with the authentication unit 490 included in the memory card 400*d*. To be more specific, first, the authentication unit 390 authenticates the authentication unit 490. Next, the authentication unit 390 waits for the authentication unit 490 to authenticate the authentication unit 390. Only when both the authentication processes are successful, the mutual authentication is regarded to be successful.

When the mutual authentication has been successfully performed, the authentication unit 390 outputs information indicative of the success of the mutual authentication.

(2) Encryption/Decryption Unit 380*d*

As shown in FIG. 16, the encryption/decryption unit 380*d* is composed of a title key generating unit 321*d*, an encryption unit 322*d*, an encryption unit 323*d*, a concatenation unit 324, a decryption unit 342*d*, a decryption unit 343*d*, and a split unit 344.

(Title Key Generating Unit 321*d*)

The title key generating unit 321*d* receives a storage instruction from the control unit 366.

Upon receipt of the storage instruction from the control unit 366, the title key generating unit 321*d* generates a title key in a similar manner to that of the title key generating unit 321 induced in the encryption/decryption unit 380*b*, and outputs the generated title key to the concatenation unit 324 and the encryption unit 323*d*.

(Encryption Unit 322*d*)

The encryption unit 322*d* reads the unique information from the unique information storage unit 310, and receives the concatenated information from the concatenation unit 324. Next, the encryption unit 322*d* applies encryption algorithm E2 to the received concatenated information using the read unique key information as a key, thereby to generate encrypted concatenated information, and outputs the encrypted concatenated information to the write unit 331.

(Encryption Unit 323*d*)

The encryption unit 323*d* receives the title key from the title key generating unit 321*d*, and reads the content 601 from the internal storage unit 303. Next, the encryption unit 323*d* applies encryption algorithm E3 to the read content using the received title key as a key, thereby to generate an encrypted content, and outputs the encrypted content to the write unit 332.

(Concatenation Unit 324)

The concatenation unit 324 receives the title key from the title key generating unit 321*d*, and reads the usage condition from the usage condition storage unit 305. Next, the concatenation unit 324 concatenates the received title key with the read usage condition in the stated order to generate concatenated information, and outputs the generated concatenated information to the encryption unit 322*d*.

(Decryption Unit 342*d*)

The decryption unit 342*d* receives the encrypted concatenated information from the read unit 351, and reads the unique information from the unique information storage unit 310. Next, the decryption unit 342*d* applies decryption algorithm D2 to the received, encrypted concatenated information using the read unique information as a key, thereby to generate the concatenated information, and outputs the generated concatenated information to the split unit 344.

(Decryption Unit 343*d*)

The decryption unit 343*d* receives the encrypted content from the read unit 352, and the title key from the split unit 344. The decryption unit 343*d* then applies decryption algorithm D3 to the received encrypted content using the received title key as a key, thereby to generate the content, and writes the generate content into the internal storage unit 303.

(Split Unit 344)

The split unit 344 receives the concatenated information from the decryption unit 342d, and splits the received concatenated information to generate the title key and the usage condition. The split unit 344 then outputs the generated title key to the decryption unit 343d, and writes the generated usage information into the usage condition storage unit 305.

(3) Write Unit 331

The write unit 331 receives the encrypted concatenated information from the encryption unit 322d, and writes the received, encrypted concatenated information into the second external storage unit 411 included in the memory card 400d.

(4) Write Unit 332

The write unit 332 receives the encrypted content from the encryption unit 323d, and writes the received encrypted content into the first external storage unit 412.

(5) Read Unit 351

The read unit 351 receives a read instruction from the control unit 366.

Upon receipt of the read instruction, the control unit 366 reads the encrypted concatenated information from the second external storage unit 411 included in the memory card 400d, and outputs the read encrypted concatenated information to the decryption unit 342d.

(6) Read Unit 352

The read unit 352 reads the encrypted content 602 from the first external storage unit 412 included in the memory card 400d, and outputs the read encrypted content to the decryption unit 343d.

(7) Control Unit 366

The control unit 366 receives a content write instruction and a content read instruction from the input unit 365. Upon receipt of the write instruction or the read instruction, the control unit 366 outputs an authentication instruction to the authentication unit 390.

Further, the control unit 366 receives from the authentication unit 390 information indicative of whether the authentication has succeeded or failed.

In the case of receiving the content write instruction from the input unit 365 as well as the information indicative of successful authentication from the authentication unit 390, the control unit 366 outputs a storage instruction to the title key generating unit 321d of the encryption/decryption unit 380d.

In the case of receiving the read instruction from the input unit 365 and the information indicative of successful authentication from the authentication unit 390, the control unit 366 outputs a read instruction to the read unit 351.

In the case of receiving the write instruction or the read instruction along with the information indicative of unsuccessful authentication, the control unit 366 discards the received write instruction or read instruction, and consequently no write operation or read operation is performed.

3.3 Operations of Digital Work Distribution System 100d

Hereinafter, description is given to the operations of the digital work distribution system 100d.

(1) Overall Operations of Digital Work Distribution System 100d

Figure 17:
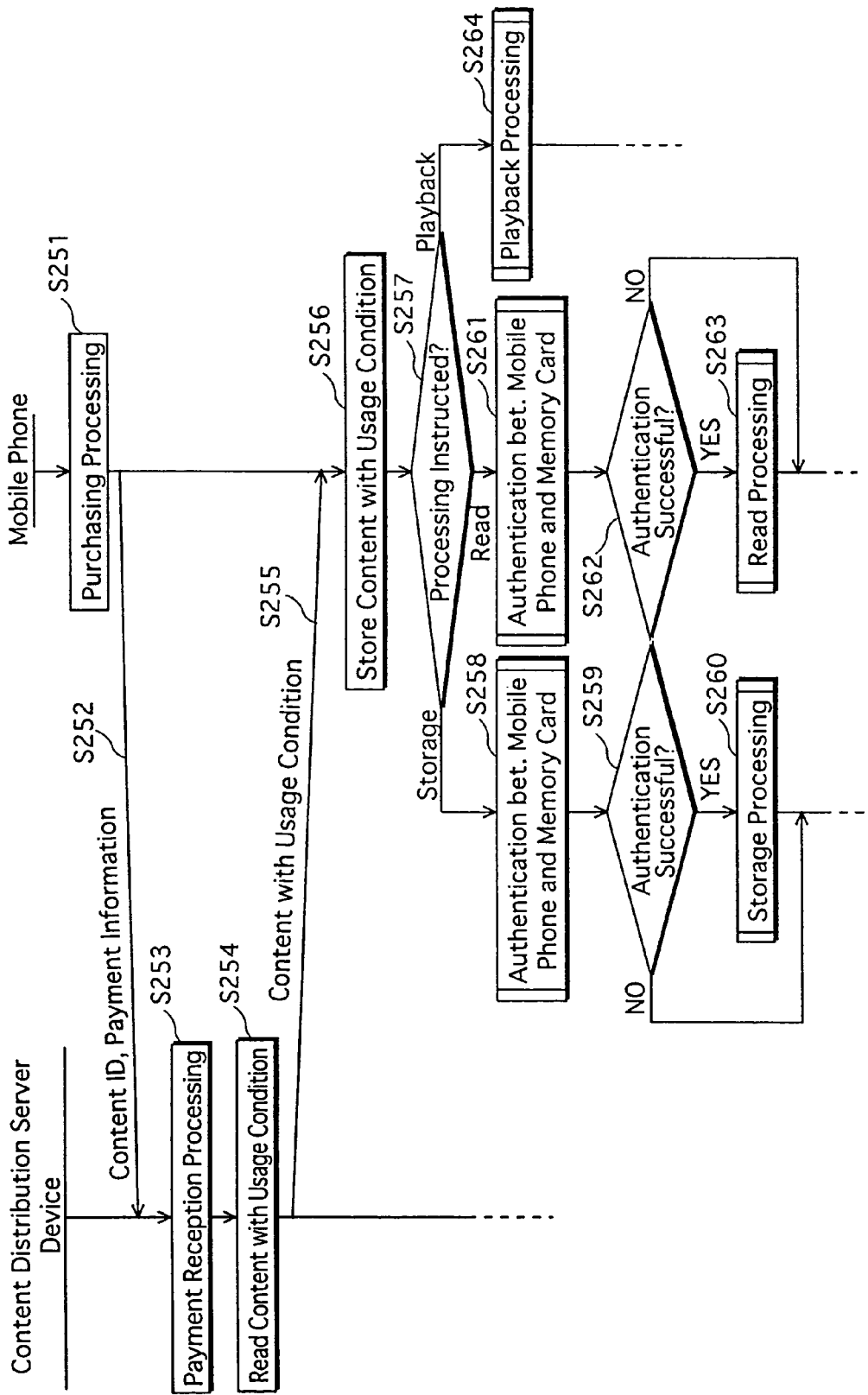
FIG. 17 is a flowchart showing the entire operations of a digital work distribution system 100d.

First, description is given to the overall operations of the digital work distribution system 100d with reference to the flowchart shown in FIG. 17.

The content purchasing unit 301 of the mobile phone 300d receives the content ID from the input unit 365 to generate the payment information (step S251), and transmits the content ID and the payment information to the content distribution server device 200d (step S252).

The control unit 202 of the content distribution server device 200d receives the content ID and the payment information from the mobile phone 300d (step S252), performs the processing to receive the payment based on the received payment information (step S253), reads from the content storage unit 201 the content identified by the received content ID (step S254), and transmits the read content to the mobile phone 300d (step S255).

The content obtaining unit 302 of the mobile phone 300d receives the content transmitted from the content distribution server device 200d (step S255), and writes the received content into the internal storage unit 303 as the content 601 (step S256).

In the case of receiving a content write instruction from the input unit 365, the control unit 366 outputs an authentication instruction to the authentication unit 390 (step S257). Upon receipt of the authentication instruction, the authentication unit 390 performs mutual authentication with the authentication unit 490 of the memory card 400d (step S258). When the authentication is successfully performed, i.e., when receiving information indicative of successful authentication from the authentication unit 390, the control unit 366 outputs a storage instruction to the encryption/decryption unit 380d (step S259, YES), and the encryption/decryption unit 380d performs processing to store the content (step S260). Alternatively, when the authentication is unsuccessful, i.e., when receiving the information indicative of unsuccessful authentication from the authentication unit 390 (step S259, NO), the control unit 366 discards the content write instruction that has been received. As a consequence, no storage processing is performed.

Alternatively, in the case of receiving a content read instruction from the input unit 365, the control unit 366 inputs an authentication instruction to the authentication unit 390 (step S257). Upon receipt of the authentication instruction from the control unit 366, the authentication unit 390 performs mutual authentication with the authentication unit 490 included in the memory card 400d (step S261). When the authentication is successfully performed, i.e., when receiving the information indicative of successful authentication from the authentication unit 390 (step S262, YES), the control unit 366 outputs a read instruction to the read unit 351, and in response, the read unit 351 performs read processing (step S263). Alternatively, when the authentication is unsuccessful, i.e., when receiving the information indicative of unsuccessful authentication from the authentication unit 390 (step S262, NO), the control unit 366 discards the read instruction that has been received. As a consequence, no read processing is performed.

Alternatively, in the case of receiving a content playback instruction from the input unit 365 (step S257), the control unit 366 instructs to perform playback processing (step S264).

Figure 18:
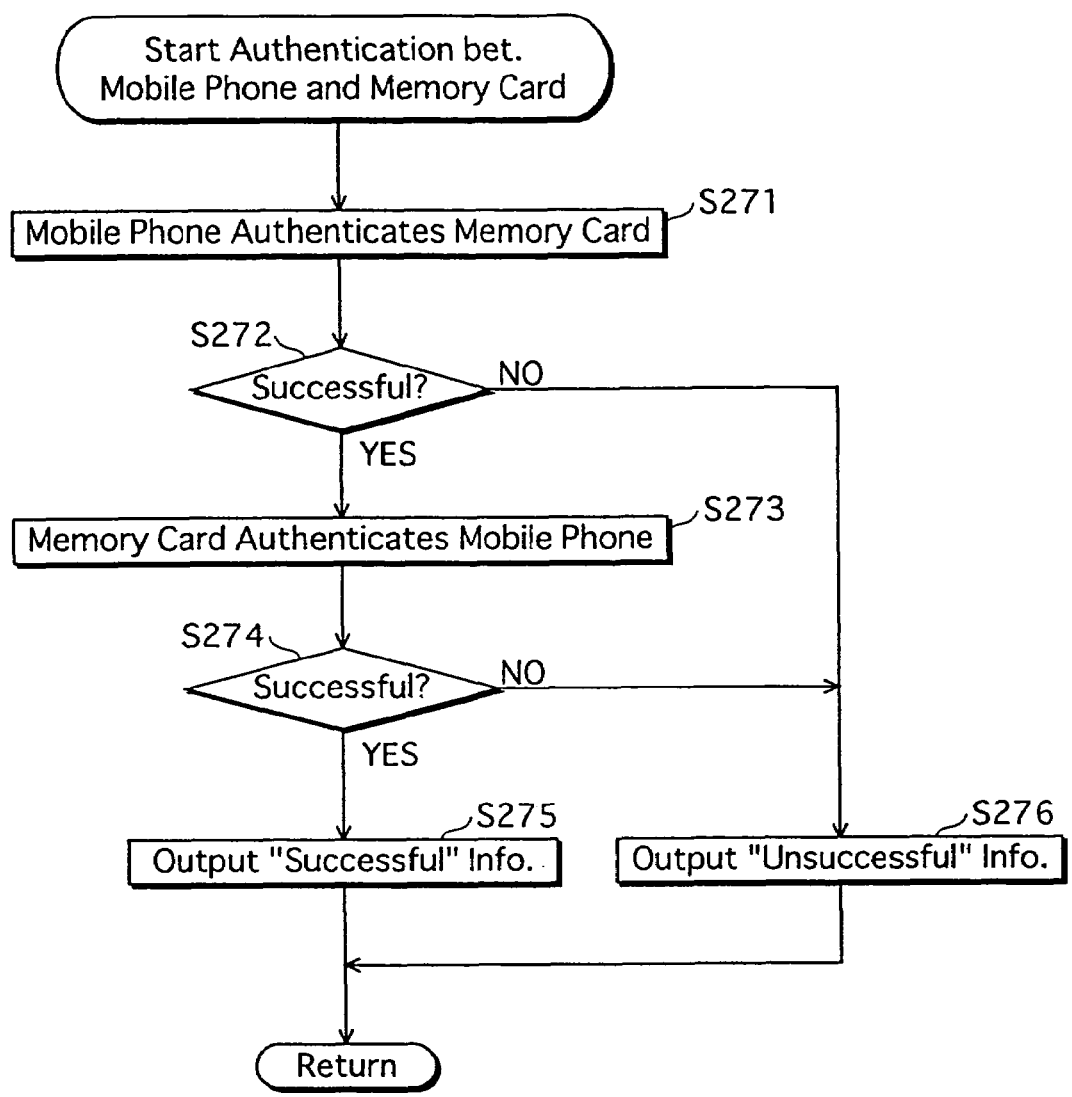
FIG. 18 is a flowchart showing the operations performed for mutual authentication between the mobile phone 300d and the memory card 400d.

(2) Operations for Mutual Authentication between Mobile Phone 300d and Memory Card 400d Now, description is given to the operations performed for mutual authentication between the mobile phone 300d and the memory card 400d with reference to the flowchart shown in FIG. 18.

Note that the operations for mutual authentication described herein are the details of the operations performed in the steps S258 and S261 shown in the flowchart in FIG. 17.

The authentication unit 390 of the mobile phone 300d authenticates the authentication unit 490 of the memory card 400d (step S271). When the authentication in this step is successfully performed (step S272, YES), then the authentication unit 490 authenticates the authentication unit 390 (step S273). When the authentication in this step is successfully performed (step S274, YES), the authentication unit 490 outputs to the control unit 366 information indicative of successful authentication (step S275).

When the authentication in the step S271 is unsuccessful (step S272, NO), or when the authentication in the step S273 is unsuccessful (step S274, NO), the authentication unit 490 outputs to the control unit 366 information indicative of unsuccessful authentication (step S276).

(3) Operations for Storage Processing

Figure 19:
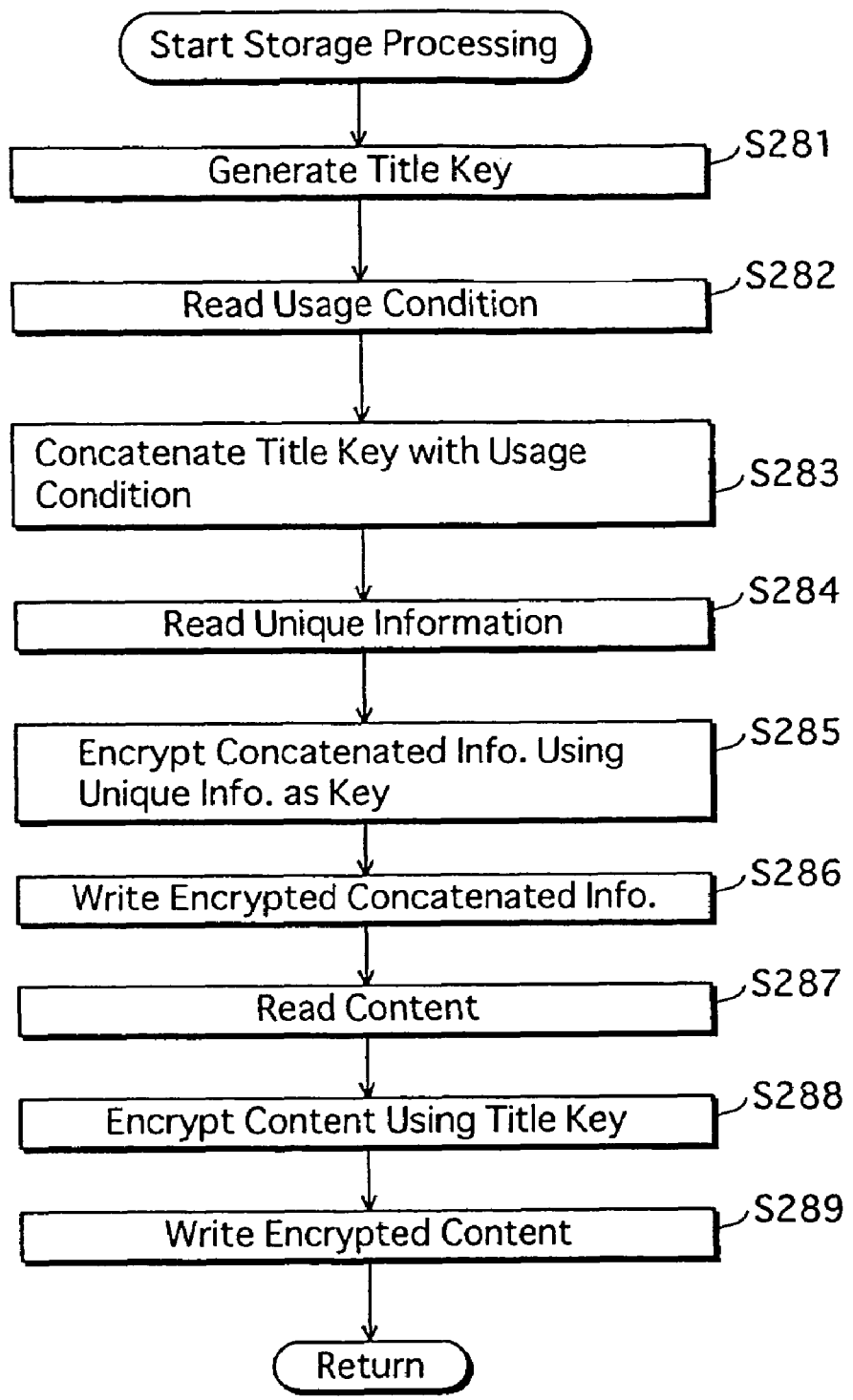
FIG. 19 is a flowchart showing the operations performed by the mobile phone 300d for storage processing.

Next, with reference to the flowchart shown in FIG. 19, description is given to the operations performed by the mobile phone 300d for the storage processing.

Upon receipt of the storage instruction from the control unit 366, the title key generating unit 321d of the encryption/decryption unit 380d generates a title key, and outputs the generated title key to the concatenation unit 324 and encryption unit 323d (step S281).

Next, the concatenation unit 324 receives the title key from the title key generating unit 321d, and reads the usage condition from the usage condition storage unit 305 (step S282). Next, the concatenation unit 324 concatenates the received title key and the read usage condition in the stated order to generate concatenated information, and outputs the generated concatenated information to the encryption unit 322d (step S283).

Next, the encryption unit 322d reads unique information from the unique information storage unit 310, and receives the concatenated information from the concatenation unit 324 (step S284). Next, the encryption unit 322d applies encryption algorithm E2 to the received concatenated information using the read unique information as a key, thereby to generate encrypted concatenated information, and outputs the encrypted concatenated information to the write unit 331 (step S285). In response, the write unit 331 receives the encrypted concatenated information from the encryption unit 322d, and writes the received, encrypted concatenated information into the second external storage unit 411 included in the memory card 400d (step S286).

Next, the encryption unit 323d receives the title key from the title key generating unit 321d, and reads the content 601 from the internal storage unit 303 (step S287). Further, the encryption unit 323d applies encryption algorithm E3 to the read content using the received title key as a key, thereby to generate an encrypted content, and outputs the generated encrypted content to the write unit 332 (step S288). In response, the write unit 332 receives the encrypted content from the encryption unit 323d, and writes the received encrypted content to the first external storage unit 412 (step S289).

(4) Operations for Read Processing

Figure 20:
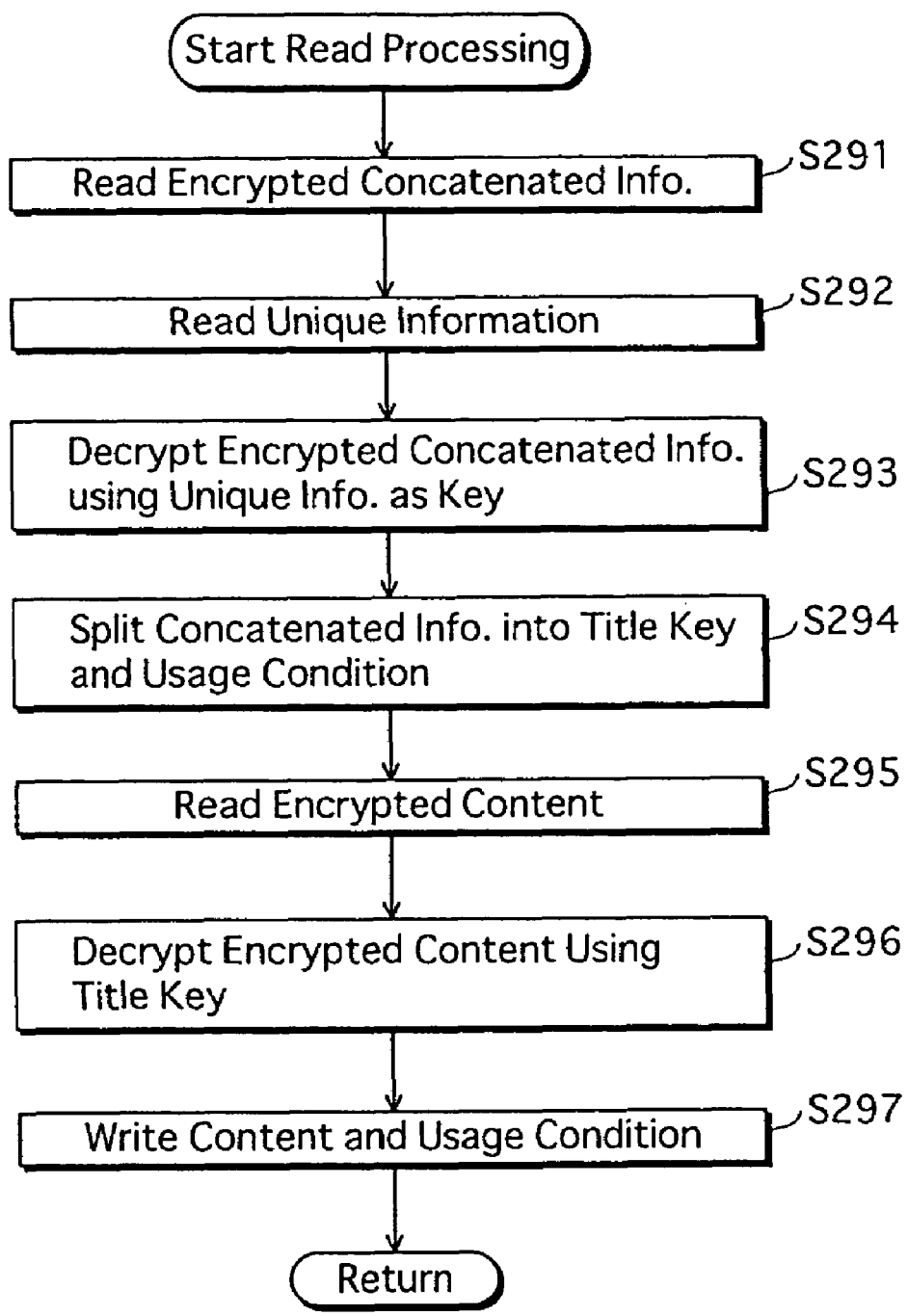
FIG. 20 is a flowchart showing the operations performed by the mobile phone 300d for read processing.

Now, description is given to the operations performed by the mobile phone 300d for read processing with reference to FIG. 20.

Upon receipt of the read instruction from the control unit 366, the read unit 351 reads the encrypted concatenated information from the second external storage unit 411 included in the memory card 400d, and outputs the read encrypted concatenated information to the decryption unit 342d (step S291). In response, the decryption unit 342d receives the encrypted concatenated information from the read unit 351, reads the unique information from the unique information storage unit 310 (step S292), applies decryption algorithm D2 to the received, encrypted concatenated information using the read unique information as a key, thereby to generate the concatenated information, and then outputs the generated concatenated information to the split unit 344 (step S293).

Subsequently, the split unit 344 receives the concatenated information from the decryption unit 342d, and splits the received concatenated information so as to generate the title key and the usage condition. The split unit 344 then outputs the generated title key to the decryption unit 343d, and writes the regenerated usage condition into the usage condition storage unit 305 (step S294).

Next, the read unit 352 reads the encrypted content 602 from the first external storage unit 412 included in the memory card 400d, and outputs the read encrypted content to the decryption unit 343d (step S295). Next, the decryption unit 343d receives the encrypted content and the title key from the read unit 352 and the split unit 344, respectively, applies decryption algorithm D3 to the received encrypted content using the received title key as a key, thereby to generate the content (step S296), and writes the generated content into the internal storage unit 303 (step S297).

3.4 Overview

To write the content into the memory card 400d, the mobile phone 300d generates the title key, reads the usage condition, and concatenates the title key with the usage condition to generate the concatenated information. Next, the mobile phone 300d encrypts the concatenated information using the unique information, and writes the encrypted concatenated information into the second external storage unit 411 included in the memory card 400d. Next, the mobile phone 300d reads the content from the internal storage unit 303, encrypts the read content using the title key, and writes the encrypted content into the first external storage unit 412 included in the memory card 400d.

To read the content from the memory card 400d, the mobile phone 300d reads the encrypted concatenated information from the second external storage unit 411 included in the memory card 400d, and decrypts the read encrypted concatenated information using the unique information to generate the concatenated information. The mobile phone 300d then splits the generated concatenated information to generate the title key and the usage condition, and writes the generated usage condition into the usage condition storage unit 305. Next, the mobile phone 300d reads the encrypted content from the first external storage unit 412 included in the memory card 400d, and decrypts the encrypted content using the title key as a key to generate the content, and writes the generated content into the internal storage unit 303.

To play back the content, the mobile phone 300d plays back the content stored in the internal storage unit 303 in compliance with the usage condition stored in the usage condition storage unit 305.

3.5 Operating Procedure Performed by User of Mobile Phone 300d

Hereinafter, description is given to the operating procedure that the user of the mobile phone 300d performs.

(1) First, with the use of the content purchasing unit 301 of the mobile phone 300d, the user selects and purchases a content from among contents each of which is provided with a usage condition and is stored in the content storage unit 201 of the content distribution server device 200d. Then, with the use of the content obtaining unit 302, the user receives the content that he has purchased. The content and the usage condition are then stored respectively into the internal storage unit 303 and the usage condition storage unit 305 both of which are included in the mobile phone 300*d*.

(2) Next, in the case where the purchased content, for example, is karaoke data and the usage condition attached thereto permits the playback of the content up to ten times, the usage condition judgment unit 306 permits the playback unit 304 to play back the karaoke data up to ten times.

(3) Further, in the following procedure, the user may store into the memory card 400*d* the content 601 and the usage condition that are respectively stored in the internal storage unit 303 and the usage condition storage unit 305 both of which are included in the mobile phone 300*d*.

(3.1) The user attaches the memory card 400*d* to the mobile phone 300*d*, and selects an operation to store the purchased content which is provided with the usage condition into the memory card.

(3.2) In response, a title key that is unique to each content is generated by the title key generating unit 321*d*. The generated title key is then concatenated with the usage condition by the concatenation unit 324 to generate concatenated information. The concatenated information is encrypted by the encryption unit 322*d* using the unique information stored in the unique information storage unit 310. Provided that the mutual authentication is successfully performed between the authentication unit 390 of the mobile phone 300*d* and the authentication unit 490 of the memory card 400*d*, the encrypted concatenated information is stored by the write unit 331 into the second external storage unit 411 included in the memory card 400*d*. Next, the content stored in the internal storage unit 303 is encrypted by the encryption unit 323*d* using the title key, and the encrypted content is stored in the first external storage unit 412 included in the memory card 400*d*.

(4) Still further, the user may extract the usage condition and the content from the encrypted concatenated information and the encrypted content 602 that are stored in the memory card 400*d*, and store the extracted content and usage condition into the internal storage unit 303 of the mobile phone 300*d* in the following procedure.

(4.1) The user attaches the memory card 400*d* to the mobile phone 300*d*, and selects an operation to fetch from the memory card 400*d* the encrypted content which is provided with the usage condition.

(4.2) In response, the mutual authentication is performed between the authentication unit 390 of the mobile phone 300*d* and the authentication unit 490 of the memory card 400*d*. Provided that the mutual authentication is successful, the encrypted concatenated information stored in the second external storage unit 411 is read by the read unit 351. The read encrypted concatenated information is then decrypted by the decryption unit 342*d* using the unique information stored in the unique information storage unit 310. The decrypted concatenated information is then split so as to generate the title key and the usage condition. The usage condition is stored into the usage condition storage unit 305. Further, the encrypted content stored in the first external storage unit 412 included in the memory card 400*d* is read by the read unit 352. The read content is then decrypted by the decryption unit 343*d* using the title key to generate a decrypted content, and the decrypted content is stored in the internal storage unit 303.

3.6 Other (1) In the above embodiment of the present invention, the description is given to the procedure for storing into the memory card the purchased content which is provided with the usage condition. Yet, whether the content has been purchased is not an essential matter to the present invention. That is, for example, the above procedure is applicable to a content which is provided as a free sample with a certain usage condition.

(2) DES encryption is one example of the encryption system employed in the encryption units 322*d* and 323*d* and the decryption units 342*d* and 343*d*.

In the case of employing DES encryption, the unique information stored in the unique information storage unit 310 may be a unique key having 56 bits. Alternatively, the telephone number allotted to the mobile phone may be used as the unique information. In the latter case, it is preferable to employ a secret conversion function that returns a 56-bit unique key in response to input of the telephone number. Here, one example of such a conversion function is to use DES encryption in the following manner. That is, the telephone number is subjected to DES encryption using a secret unique value having 56 bits to output a value having 64 bits. The last 56 bits of the outputted value are used as the unique information.

(3) Further, the unique information storage unit 310, the internal storage unit 303, and the usage condition storage unit 305 are protected from being read or written from any external device other than a specially permitted device, such as a later-described model change device. To be more specific, each of the unique information storage unit 310, the internal storage unit 303, and the usage condition storage unit 305 is composed of tamper-resistant hardware, tamper-resistant software, or a combination of the two.

(4) Still further, the unique information storage unit 310 and the usage condition storage unit 305 may be constructed within a card such as SIM that is attachable to and detachable from the mobile phone.

(5) Still further, at the time of encrypting the content using the DES encryption, the content is divided into data blocks each having 64 bits, and then each data block is encrypted using the 56-bit unique key to generate a 64-bit encrypted data block. The thus generated encrypted data blocks are then concatenated together, and the concatenated encrypted data blocks are outputted as the encrypted content.

(6) With the above construction, a content which is provided with a usage condition is played back only under the conditions conforming to the usage condition.

Further, generally speaking, the internal storage unit 303 of the mobile phone 300*d* is limited in its memory capacity. Conventionally, this limitation results in the following problem. In the case the internal storage unit is full with digital works, the user is required to delete some of the digital works stored in the internal storage unit to secure a free memory space before purchasing another digital work, or otherwise he simply has to give up purchasing another digital work.

However, according to embodiment 3, similarly to the embodiments 1 and 2, the user is allowed to store some of the digital works stored in the internal storage unit 303 of the mobile phone 300*d* into the memory card 400*d* attached the mobile phone 300*d* when he decides not to use the digital works any time soon. In this manner, a free memory space is secured in the internal storage unit 303 of the mobile phone 300*d* without losing the rights to play back those digital works he has purchased. As a consequence, the user is allowed to purchase some more digital works to store into the internal storage unit 303.

(7) With the above construction, when a content is encrypted and stored in a memory card attached to a certain mobile phone, the encrypted content is not possibly decrypted or played back by any mobile phone other than that particular mobile phone. That is to say, embodiment 3 achieves an effect of meeting copyholders' demand that a content stored into a memory card using a certain mobile phone be prohibited from being decrypted or played back using any other mobile phone although the memory card is attached thereto.

4. Preferred Embodiment 4

Now, description is given to another preferred embodiment 4.

4.1 Model Change System 600*e*

Here, description is given to a model change system 600*e*.

The model change system 600*e* aims to provide a model change device used to change a record/playback device, such as a mobile phone, that is usable under a contract made between a user and a service provider to a new record/playback device due to a change of the contract. Upon the model change with this model change device, digital works stored in the originally used record/playback device are available for the new record/playback device with no processing performed on the digital works.

For example, upon release of new mobile phones having additional features, a user may want to change a mobile phone that he currently uses to a new one. In such a case, the user is allowed to use the new mobile phone with the same telephone number that is originally allotted to the current one. This is done by re-allotting the telephone number that is originally allotted to the current mobile phone to the new mobile phone. Such re-allotting of a certain telephone number that is allotted to a certain mobile phone to another mobile phone is referred to as model change of mobile phones.

After the model change as described above, the contents that have been purchased and stored in the mobile phone of the embodiment 1, 2, or 3 are not usable with the new mobile phone. Description as to why such contents will not be played back has been already given above.

It is disadvantageous to the user if the contents that the user has purchased and stored in the memory card become non-usable due to the model change. The model change system 600*e* aims to address this problem.

(Construction of Model Change System 600*e*)

Figure 21:
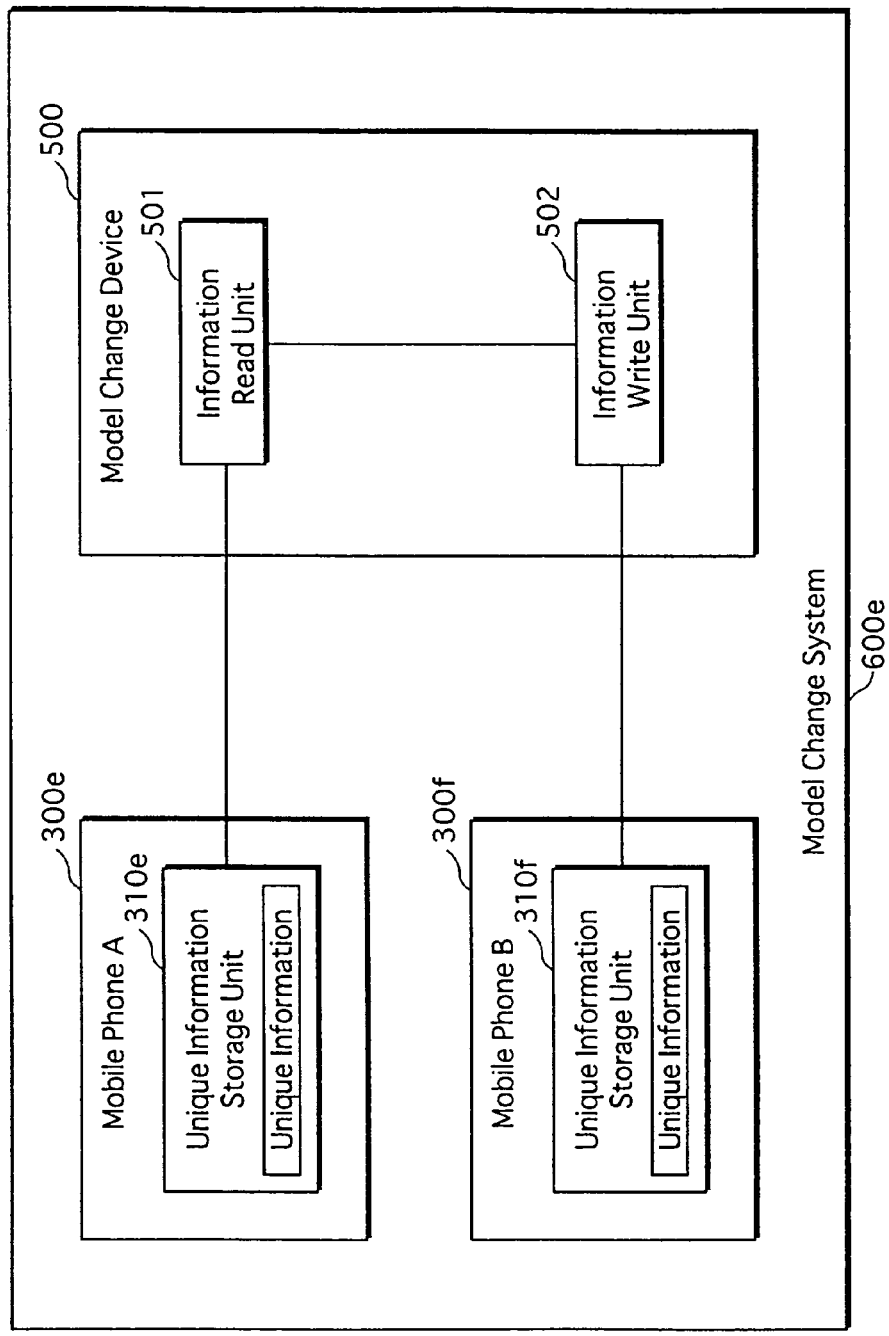
FIG. 21 is a block diagram showing the construction of a model change system 600e.

As shown in FIG. 21, the model change system 600*e* is composed of a mobile phone A 300*e*, a model change device 500, and a mobile phone B 300*f*. The mobile phone A 300*e* and the mobile phone B 300*f* are separately connected to the model change device 500.

The mobile phone A 300*e* has a construction similar to that of any of the mobile phones described in the above embodiments 1, 2 and 3, except for a unique information storage unit 310*e*. Note that the other components are not illustrated in the figure for simplicity's sake. The unique information storage unit 310*e* prestores unique information.

Further, the mobile phone B 300*f* has a construction similar to that of any of the mobile phones described in the above embodiments 1, 2 and 3, except for a unique information storage unit 310*f*. Note that the other components are not illustrated in the figure for simplicity's sake. The unique information storage unit 310*f* has a storage area for storing the unique information.

The model change device 500 is composed of an information read unit 501 and an information write unit 502.

The information read unit 501 reads the unique information stored in the unique information storage unit 310*e* that is included in the mobile phone A 300*e*, and successively deletes the unique information from the unique information storage unit 310*e*. The information read unit 501 then outputs the read information to the information write unit 502.

The information write unit 502 receives the unique information from the information read unit 501, and writes the received unique information into the unique information storage unit 310*f* that is included in the mobile phone B 300*f*. Here, the unique information is information that is unique to the mobile phone A 300*e*. Examples of the unique information include the telephone number allotted to the mobile phone A 300*e*, and a random number that is randomly generated and allotted to the mobile phone A 300*e*.

(Operations of Model Change System 600*e*)

Figure 22:
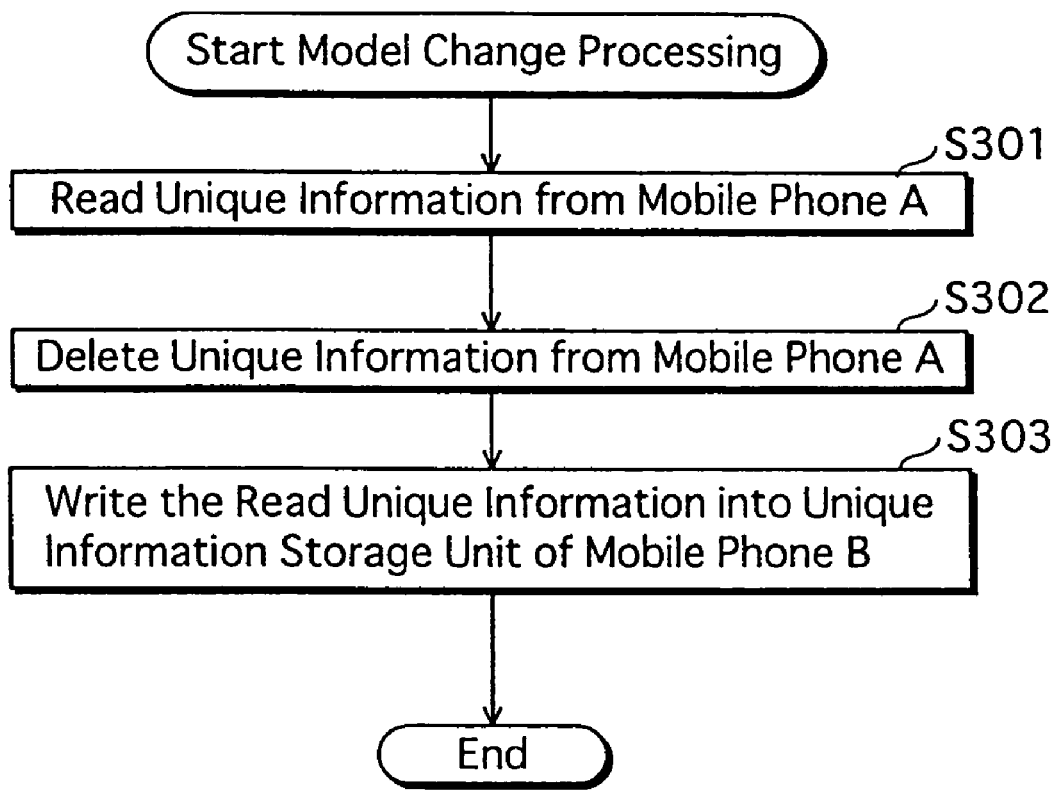
FIG. 22 is a flowchart showing the operations of the model change system 600e.

Now, description is given to the operations of the model change system 600*e* with reference to the flowchart shown in FIG. 22.

The information read unit 501 reads the unique information from the unique information storage unit 310*e* (step S301), and successively deletes the unique information from the unique information storage unit 301*e* (step S302). Next, the information write unit 502 writes the unique information that is received from the information read unit 501 into the unique information storage unit 310*f* (step S303).

(Overview)

With the above construction, the mobile phone B is allowed to read and play back the contents that have been purchased and stored into the memory card using the mobile phone A without performing any processing on the contents.

4.2 Model Change System 600*g*

Here, description is given to a model change system 600*g*.

Figure 23:
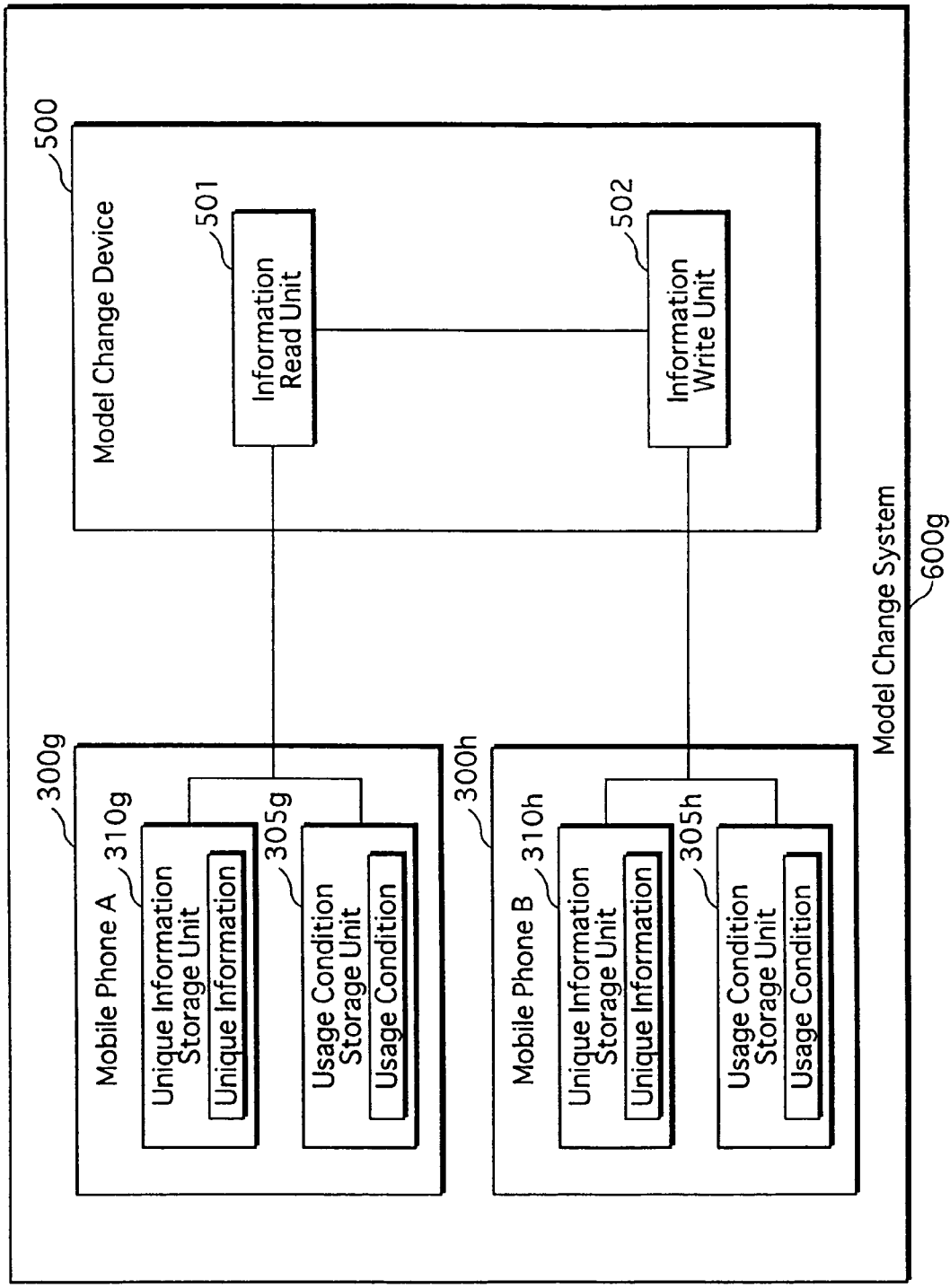
FIG. 23 is a block diagram showing the construction of a model change system 600g.

As shown in FIG. 23, the model change system 600*g* is composed of a mobile phone A 300*g*, the model change device 500, and a mobile phone B 300*h*. The mobile phone A 300*g* and the mobile phone B 300*h* are separately connected to the model change system 500.

The mobile phone A 300*g* has a construction similar to that of any of the mobile phones described in the embodiment 2 and 3, except for a unique information storage unit 310*g* and a usage condition storage unit 305*g*. Note that the other components are not illustrated in the figure for simplicity's sake. The unique information storage unit 310*g* prestores unique information, and the usage condition storage unit 305*g* prestores the usage condition.

The mobile phone B 300*h* has a construction similar to that of the mobile phone described in the embodiment 2 or 3, except for a unique information storage unit 310*h* and a usage condition storage unit 305*h*. Note that the other components are not illustrated in the figure for simplicity's sake. The unique information storage unit 310*h* has a storage area for storing the unique information, and the usage condition storage unit 305*h* has a storage area for storing the usage condition.

The model change system 500 is composed of an information read unit 501 and an information write unit 502.

The information read unit 501 reads the unique information from the unique information storage unit 310*g* that is included in the mobile phone A 300*g*, and reads the usage condition from the usage condition storage unit 305*g*. Subsequently, the information read unit 501 deletes the unique information and the usage condition from the unique information storage unit 310*e* and the usage condition storage unit 305g, respectively. Next, the information read unit 501 outputs the read unique information and usage condition to the information write unit 502.

In response, the information write unit 502 receives the unique information and usage condition from the information read unit 501. Next, the information write unit 502 writes the received unique information and usage condition respectively into the unique information storage unit 310h and the usage condition storage unit 305h both of which are included in the mobile phone B 300h.

With the above construction, the mobile phone B is allowed to read and play back the contents that have been purchased and stored into the memory card by the mobile phone A without processing the contents at all.

4.3 Modification

Normally, in order for model change or cancellation of contract, mobile phone users need to bring his mobile phone to a mobile phone service provider typified by "DoCoMo shop" where processing for model change or cancellation of contract is performed. Here, "cancellation of contract" refers to cancellation of the contract that has been made between a mobile phone user and a mobile phone service provider. After cancellation of a contract, the telephone number allotted to a mobile phone under the contract is no longer usable.

Hereinafter, description is given to a model change system which eliminates user's trouble to make a trip to a service provider shop at the time of canceling his contract.

At the time of model change or cancellation of a contract, requirements such as the following must be fulfilled.

(Requirement A)

Upon model change of mobile phone, it is required that a new mobile phone (a newly purchased mobile phone) replacing a current one will be allowed to play back the contents stored in the memory card. In return, it is required that the mobile phone to be replaced (the mobile phone currently in use) will be no longer allowed to play back the contents stored in the memory card.

(Requirement B)

Even after the contract for a mobile phone is cancelled, it is required that the contents stored in the memory card be still played back by the mobile phone. That is to say, after the cancellation of the contract, the mobile phone no longer works as a telephone, but still works as a playback device for playback of the contents that have been purchased earlier.

(Requirement C)

Even when a service provider of mobile phones (carrier) is changed to another one, it is required that the content stored in the memory card still be played back by the mobile phone that is usable under operations by the new carrier. For example, even after the mobile phone service provider is changed from "DoCoMo" to "au", the mobile phone still needs to be allowed to play back the contents stored in the memory card.

(1) Model Change System 600m

A model change system 600m aims to meet "Requirement A" above. To this end, the model change system 600m stores the unique information stored in the mobile phone that is currently in use to a new mobile phone via a communications network, and successively deletes the unique information from the current mobile phone via a communications network.

Figure 24:
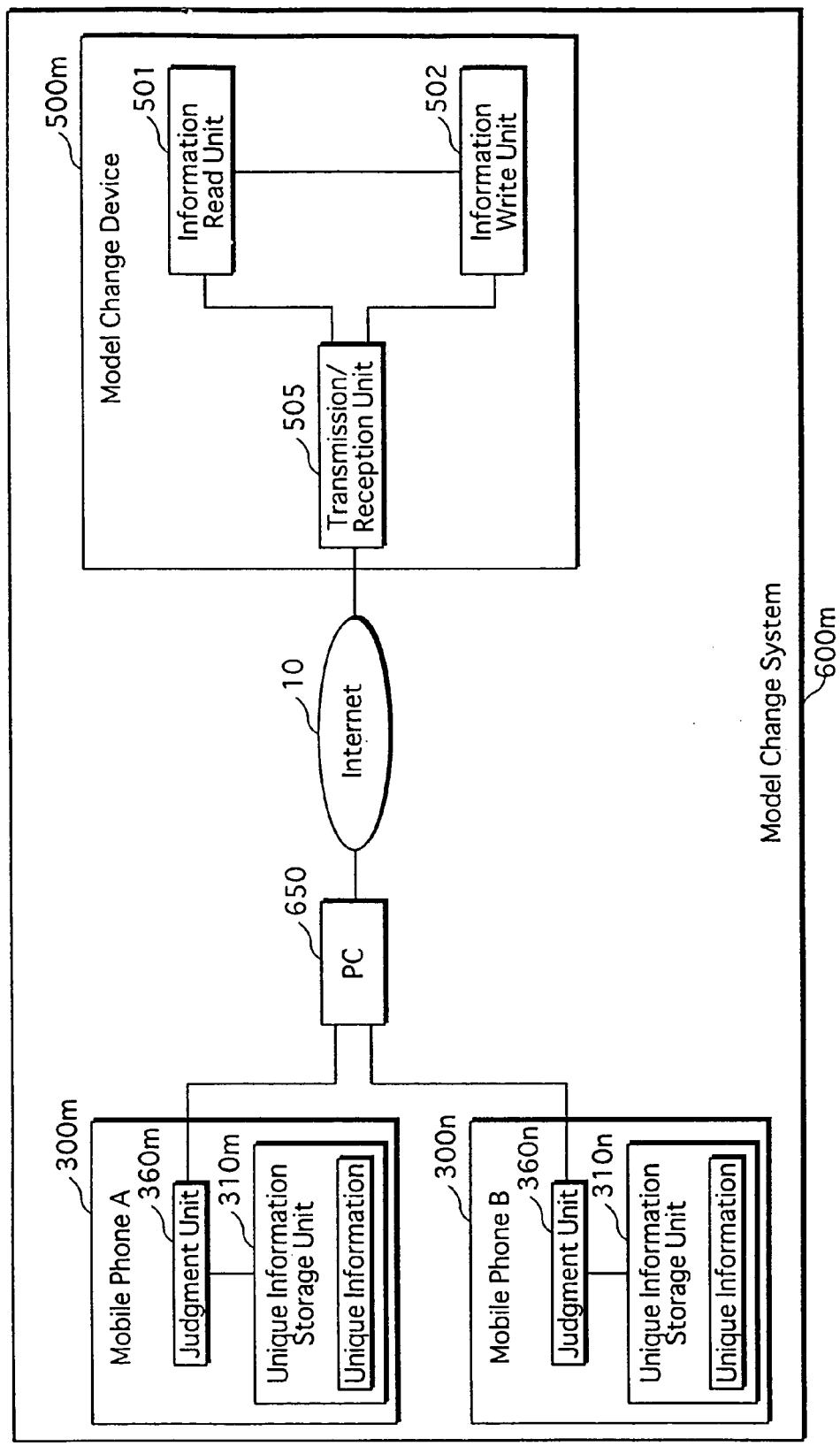
FIG. 24 is a block diagram showing the construction of a model change system 600m.

As shown in FIG. 24, the model change system 600m is composed of a mobile phone A 300m, a mobile phone B 300n, a personal computer (PC) 650, and a model change device 500m. The PC 650 and the model change device 500m are connected with each other via the Internet 10. The mobile phone A 300m is a mobile phone that is currently in use and to be replaced, and the mobile phone B 300n is a new mobile phone replacing the current one.

(Mobile Phone A 300m)

The mobile phone A 300m has a construction similar to that of any of the mobile phones described in the embodiment 1, 2, and 3, except for a unique information storage unit 310m. Additionally, the mobile phone A 300m includes a judgment unit 360m. Note that the other components are not illustrated in the figure for simplicity's sake.

The unique information storage unit 310m prestores unique information.

The judgment unit 360m, when the mobile phone A 300m is connected to the model change device 500m via the PC 650 and the Internet 10, receives from the model change device 500m first model change information which will be described later. The judgment unit 360m then judges whether the received first model change information is valid information based on signature information included in the first model change information. Since the technique of judging authenticity of the first model change information is known as a digital signature technique, the detailed description thereof is omitted. When judging that the information is valid, the judgment unit 360m, following a read instruction included in the first model change information, reads the unique information from the unique information storage unit 310m, and transmits the read unique information to the model change device 500m via the PC 650 and the Internet 10. In addition, when judging that the information is valid, the judgment unit 360m, following a delete instruction included in the first model change information, deletes the unique information from the unique information storage unit 310m. Alternatively, when judging that the information is invalid, the judgment unit 360m simply discards the received first model change information, and performs no operation.

(Mobile Phone B 300n)

The mobile phone B 300n has a construction similar to that of any of the mobile phones described in embodiment 1, 2, and 3, except for a unique information storage unit 310n. Additionally, the mobile phone B 300n includes a judgment unit 360n. Note that the other components are not illustrated in the figure for simplicity's sake.

The unique information storage unit 310n has a storage area for storing the unique information.

The judgment unit 360n, when the mobile phone B 300n is connected to the model change device 500m via the PC 650 and the Internet 10, receives from the model change device 500m second model change information, which will be described later, and judges whether the received second model change information is valid information based on signature data included in the second model change information. When judging that the information is valid, the judgment unit 360n, following a write instruction included in the second model change information, extracts the unique information from the second model change information, and writes the extracted unique information into the unique information storage unit 310n. Alternatively, when judging that the information is invalid, the judgment unit 360n simply discards the received second model change information, and performs no operation.

(PC 650)

To be more specific, the PC 650 is a computer system composed of, for example, a microprocessor, ROM, RAM, a hard disk unit, a display unit, a keyboard, a mouse, a LAN connecting unit, and a connecting unit for a mobile phone. The RAM or the hard disk unit used in the computer system stores a computer program. The PC 650 performs its function by the microprocessor operating in accordance with the computer program.

Upon receipt of a user operation for model change, the PC 650 transmits a model change instruction to the model change device 500*m* via the Internet 10.

Successively, the PC 650 performs transmission of information between the mobile phone A 300*m* and the model change device 500*m* via the Internet 10. The PC 650 then performs transmission of information between the mobile phone B 300*n* and the model change device 500*m* via the Internet 10.

(Model Change Device 500*m*)

The model change device 500*m* has a construction similar to that of the model change device 500, and additionally includes a transmission/reception unit 505.

The transmission/reception unit 505 receives the model change instruction from the PC 650 via the Internet 10. Upon receipt of the model change instruction, the transmission/reception unit 505 generates first model change information. Here, the first model change information includes signature data indicating the self-authenticity, a read instruction instructing to read the unique information, and a delete instruction instructing to delete the unique information. Next, the transmission/reception unit 505 transmits the generated first model change information to the mobile phone A 300*m*.

Further, the transmission/reception unit 505 receives the unique information from the mobile phone A 300*m*.

Next, the transmission/reception unit 505 generates second model change information. Here, the second model change information includes signature data indicating the self-authenticity, a read instruction instructing to read the received unique information, and a write instruction instructing to write the unique information. Next, the transmission/reception unit 505 transmits the generated second model change information to the mobile phone B 300*n*.

(Operations of Model Change System 600*m*)

Figure 25:
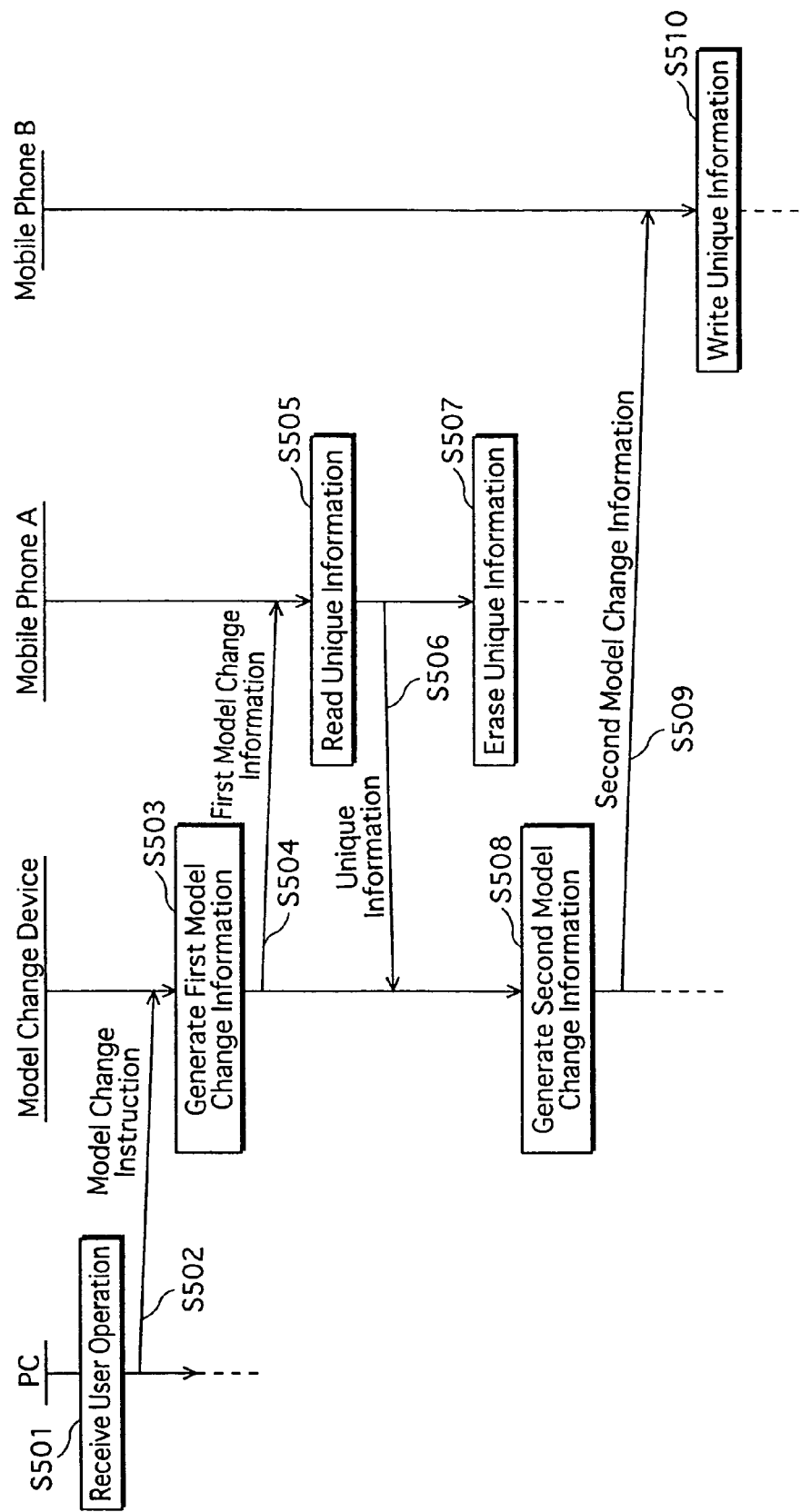
FIG. 25 is a flowchart showing the operations of the model change system 600m.

Now, description is given to the operations of model change system 600*m* with reference to the flowchart shown in FIG. 25.

At this stage, the user connects both the mobile phone A 300*m* and the mobile phone B 300*n* to the PC 650.

Upon receipt of a user operation for model change (step S501), the PC 650 transmits a model change instruction to the model change device 500*m* via the Internet 10 (step S502).

In response, the transmission/reception unit 505 included in the model change device 500*m* receives the model change instruction from the PC 650 via the Internet 10 (step S502), generates the first model change information (step S503), and transmits the generated first model change information to the mobile phone A 300*m* (step S504).

Upon receipt of the first model change information (step S504), the judgment unit 360*m* included in the mobile phone A 300*m* reads the unique information from the unique information storage unit 310*m* (step S505), and transmits the read unique information to the model change device 500*m* via the PC 650 and the Internet 10 (step S506). The judgment unit 360*m* then deletes the unique information from the unique information storage unit 310*m* (step S507).

Upon receipt of the unique information from the mobile phone A 300*m* (step S506), the transmission/reception unit 505 of the model change device 500*m* generates the second model change information (step S508), and transmits the generated second model change information to the mobile phone B 300*n* (step S509).

Upon receipt of the second model change information from the model change device 500*m* (step S509), the judgment unit 360*n* of the mobile phone B 300*n* extracts the unique information from the second model change information, and writes the extracted unique information into the unique information storage unit 310*n* (step S510).

(2) Modification

Here, description is given to a modification of the model change system 600*m* aiming to meet "Requirement B" mentioned above.

In the modification described herein, the unique information stored in a mobile phone is generated from unique information other than the telephone number allotted to that mobile phone. Thus, contents stored in the memory card have been encrypted not with the telephone number but with another type of unique information. In other words, the contents are bound to unique information other than a telephone number, and then stored in a recording medium.

Further, at the time of cancellation of the contract, the telephone number allotted to and stored in the mobile phone to be canceled is deleted so as to disable the telephone number. Yet, the mobile phone still holds the unique information so as to allow playback of the content.

The modified model change system 600*m* has a construction similar to the model change system 600*m*. To be more specific, the modified model change system 600*m* is composed of the mobile phone A 300*m*, the PC 650, and the model change device 500*m*. The PC 650 and the model change device 500*m* are connected to each other via the Internet 10. Here, the mobile phone A 300*m* is the phone that the user is going to cancel its contract.

The unique information storage unit 310*m* of the mobile phone A 300*m* stores information unique to the mobile phone A 300*m*, such as a random number allotted to the mobile phone A 300*m*, as well as the telephone number allotted to the mobile phone A 300*m*.

The user connects the mobile phone A 300*m* to the PC 650, and performs operations for canceling the contract of the mobile phone using the PC 650.

Upon receipt of the user operation for the cancellation, the PC 650 outputs a cancellation instruction to the mobile phone A 300*m*.

In response, the judgment unit 360*m* of the mobile phone A 300*m* receives the cancellation instruction. Upon receipt of the cancellation instruction, the judgment unit 360*m* reads the telephone number from the unique information storage unit 310*m*, and transmits the read telephone number to the model change device 500*m* via the PC 650 and the Internet 10.

In response, the transmission/reception unit 505 of the model change device 500*m* receives the telephone number via the PC 650 and the Internet 10, and performs processing for the cancellation based on the received telephone number.

(3) Modification

Here, description is given to another modification of the model change system 600*m* aiming to meet "Requirement C" mentioned above.

Generally speaking, when the mobile phone carrier is changed to another one, the telephone number is changed as well. For this reason, in the modification described herein, the unique information stored in the mobile phone is generated not from the telephone number but from another type of unique information. Thus, contents stored in the memory card have been encrypted not with the telephone number but with another type of unique information. In other words, the contents are bound to unique information other than the telephone number and then stored in a recording medium. Further, the unique information is held stored within the mobile phone even after the change of carrier.

The modified model change system 600m has a construction similar to the model change system 600m. To be more specific, the modified model change system 600m is composed of the mobile phone A 300m, the PC 650, and the model change device 500m. The PC 650 and the model change device 500m are connected to each other via the Internet 10. Here, the mobile phone A 300m is the phone that the user is going to change its carrier.

Figure 26:
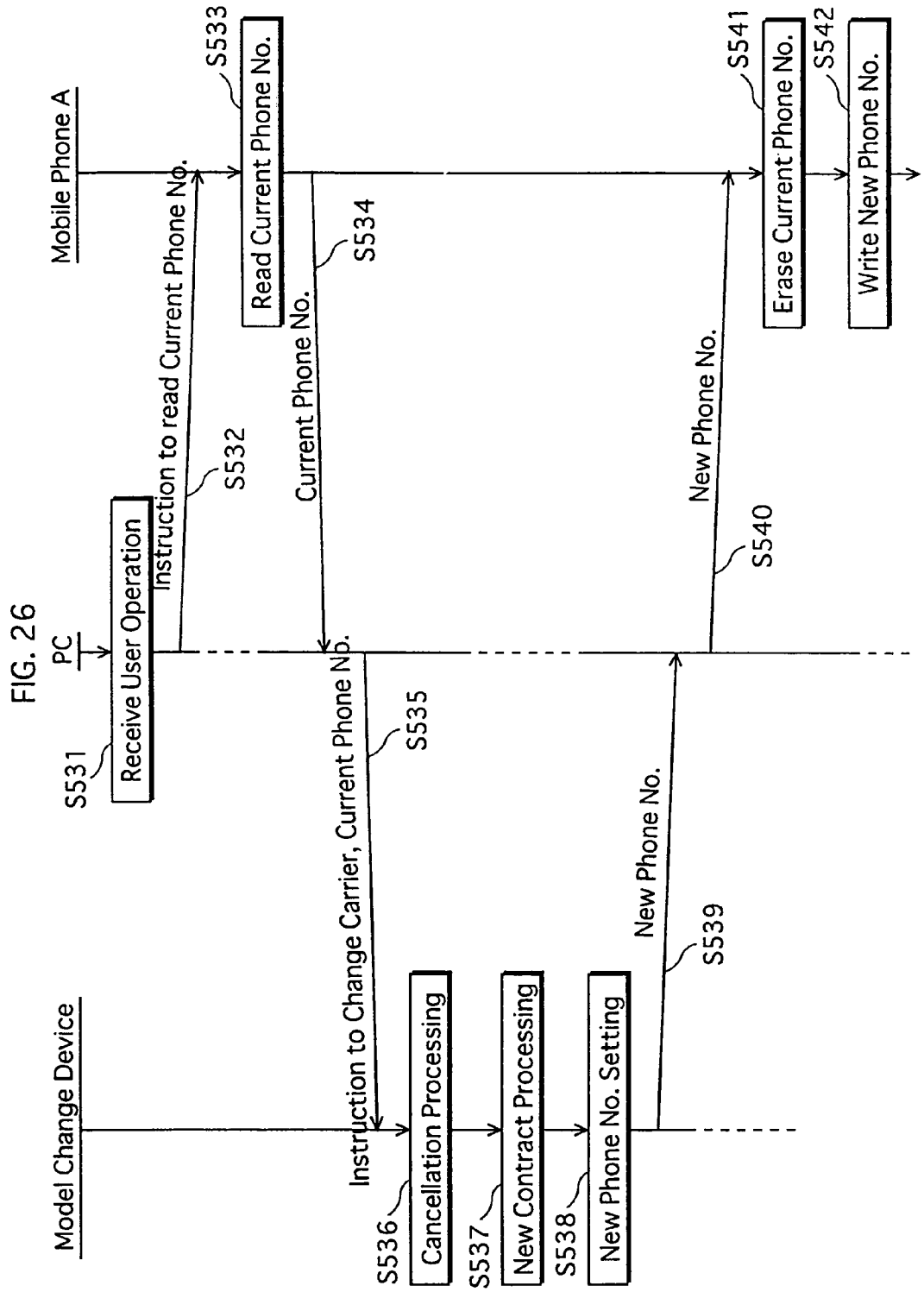
FIG. 26 is a flowchart showing the operations of a modified model change system 600m.

Here, the description is given to the operations of the modified model change system 600m with reference to the flowchart shown in FIG. 26.

The unique information storage unit 310m of the mobile phone A 300m stores information unique to the mobile phone A 300m, such as a random number allotted to the mobile phone A 300m, as well as the telephone number originally allotted to the mobile phone A 300m.

The user connects the mobile phone A 300m to the PC 650, and performs operations for cancellation of the mobile phone using the PC 650.

Upon receipt of the user operation for changing the service provider (step S531), the PC 650 outputs to the mobile phone A 300m a read instruction instructing to read the current telephone number (step S532) In response, the judgment unit 360m included in the mobile phone A 300m reads the current telephone number from the unique information storage unit 310m, and outputs the read current telephone number to the PC 650 (step S534).

In response, the PC 650 receives the current telephone number from the mobile phone A 300m (step S534), generates a carrier change instruction, and transmits the generated carrier change instruction along with the received current telephone number to the model change device 500m via the Internet 10 (step S535).

The transmission/reception unit 505 of the model change device 500m performs processing to cancel the contract of the current telephone number (step S536). Then, transmission/reception unit 505 performs processing to make a new contract with a service provider (step S537), performs an operation for a new telephone number setting (step S538), and transmits the newly set telephone number to the PC 650 via the Internet 10 (step S539).

In response, the PC 650 receives the new telephone number (step S539), and outputs the received new telephone number to the mobile phone A 300m (step S540).

Upon receipt of the new telephone number (step S539), the judgment unit 360m of the telephone number A 300m deletes the current telephone number from the unique information storage unit 310m (step S541), and writes the received new telephone number into the unique information storage unit 310m (step S542).

(4) Other Modification

The above description is given to model change systems each of which meets "Requirement A, B, or C". Each of these model change systems performs model change, cancellation of the contract, or change of the carrier via the Internet.

Yet, the techniques employed in the model change systems meeting "Requirement A, B, or C" may be applied to a model change system that does not involve Internet connection. That is to say, the above model change system 600e which does not involve Internet connection may be constructed to meet the "Requirement A, B, or C". Similarly, the above model change system 600g which does not involve Internet connection may be constructed to meet the "Requirement A, B, or C".

4.4 Other

The mobile phone in the above embodiment 4 may be constructed to have its unique information storage unit within a SIM card. In this case, upon model change, the user detaches the SIM card from the mobile phone A, and attaches the SIM card that is detached from the mobile phone A to the mobile phone B. Alternatively, upon model change, the model change device may perform detachment of the SIM card from the mobile phone A and attachment of that SIM card to the mobile phone B.

As apparent from the above description, the internal storage unit 303 of the mobile phone consistent with the present invention is generally limited in its memory capacity. Conventionally, this limitation results in the following problem. In the case the internal storage unit is full with digital works, the user is required to delete some of the digital works stored in the internal storage unit to secure a free memory space before purchasing another digital work, or he simply has to give up purchasing another digital work.

However, according to the present invention, a user is allowed to store some of the digital works stored in the internal storage area of the main device, i.e., the mobile phone, into a recording medium attached the main device when he decides not to use the digital works any time soon. In this manner, a free memory space is secured in the internal storage area of the main device without losing the rights to play back those digital works he has purchased. As a consequence, the user is allowed to purchase and store some more digital works into the internal storage area.

Further, with the above construction, a content encrypted and stored by a certain main device into a recording medium is not possibly decrypted and played back by any other main device although the recording medium is attached thereto. That is to say, the present invention achieves an effect of meeting copyholders' demand that a content stored by a certain main device into a recording medium device attached thereto be prohibited from being decrypted or played back using any other main device although the recording medium device is attached thereto.

Still further, the present invention achieves the effect that a content provided with a certain usage condition is permitted to be played back only when the usage condition is met.

Still further, the present invention achieves the following effect upon model change from a certain main device to another main device. That is, a new main device that has replaced an originally used main device is permitted to read and playback the contents that have been purchased and stored in a recording medium device by the original main device without applying processing to the contents.

5. Preferred Embodiment 5

Now, description is given to a digital work distribution system 100i (not illustrated) consistent with preferred embodiment 5 of the present invention.

The digital work distribution system 100i has a construction similar to that of the digital work distribution system 100. Thus, description is given mainly to the differences with the digital work distribution system 100.

The digital work distribution system 100i includes a mobile phone 300i and a memory card 400i or a memory card 400p instead of the mobile phone 300 and the memory card 400, respectively.

The user attaches either of the memory cards 400i or 400p to the mobile phone 300i.

5.1 Construction of Memory Card 400i

Figure 27:
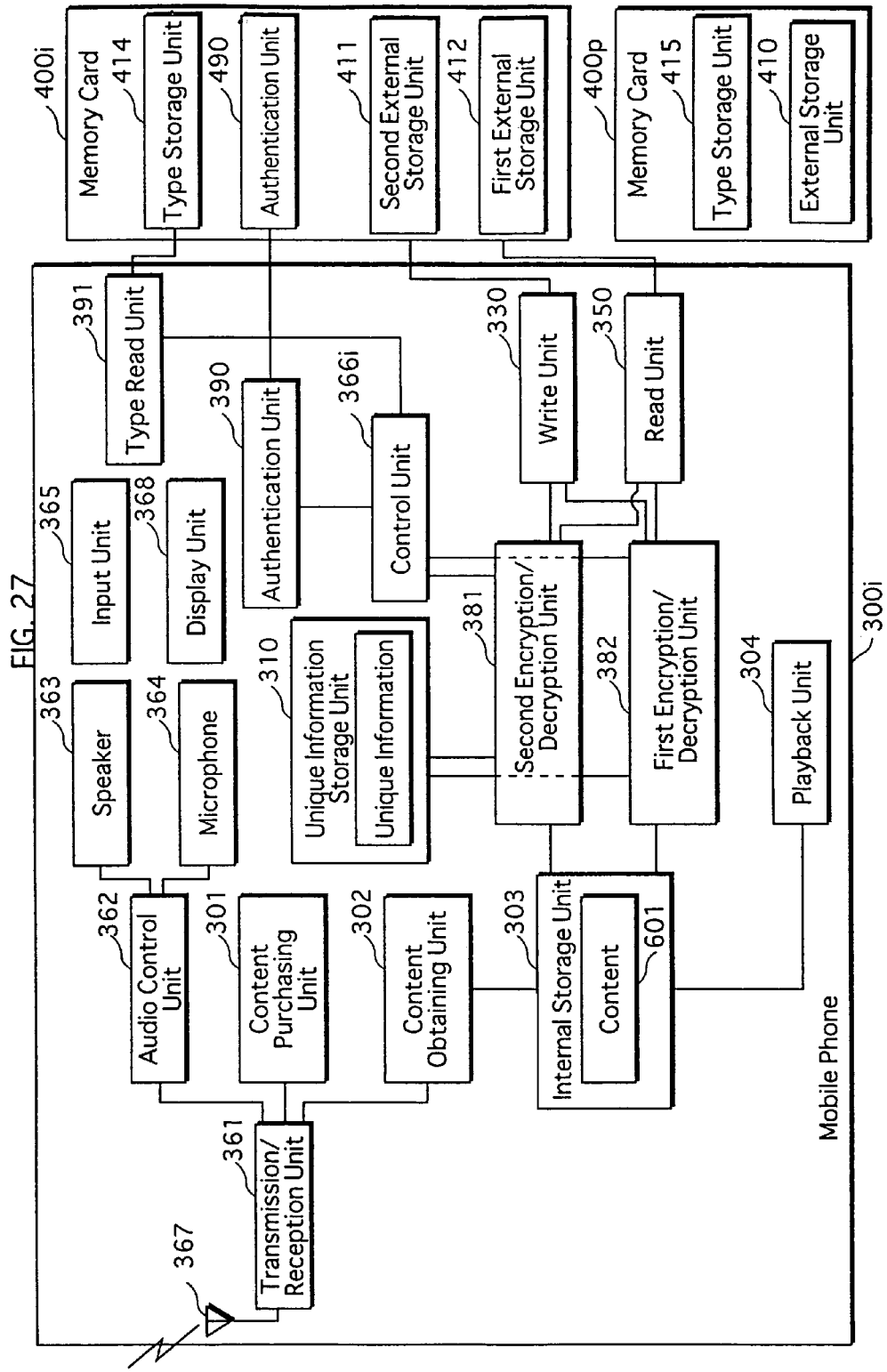
FIG. 27 is a block diagram showing the constructions of a mobile phone 300i and a memory card 400i.

As shown in FIG. FIG. 27, the memory card 400i is composed of a type storage unit 414, an authentication unit 490, a first external storage unit 412, and a second external storage unit 411.

The type storage unit 414 prestores information showing a second type that is the type of the memory card 400i.

The authentication unit 490 performs challenge-response type mutual authentication with the authentication unit 390 included in the mobile phone 300i.

The first external storage unit 412 has a storage area for storing the encrypted content.

The second external storage unit 411 is a memory unit that is permitted to be read and written from another end, i.e., the mobile phone 300i only after authentication by the authentication unit 490 has been successfully performed. The second external storage unit 411 has a storage area for storing encrypted concatenated information, which will be described later.

5.2 Construction of Memory Card 400p

As shown in FIG. 27, the memory card 400p is composed of a type storage unit 415 and an external storage unit 410.

The type storage unit 415 prestores information showing a first type that is the type of the memory card 400p.

The first external storage unit 410 has a storage area for storing the encrypted content.

Here, the memory card 400i and the memory card 400p differ in that the memory card 400i has the authentication unit while the memory card 400p does not.

5.3 Mobile Phone 300i

As shown in FIG. 27, the mobile phone 300i includes a first encryption/decryption unit 382 and a second encryption/decryption unit 381 instead of the encryption/decryption unit 380 that the mobile phone 300 includes. Further, the mobile phone 300i includes a type read unit 391 and the authentication unit 390. In other respects, the mobile phone 300i includes components similar to those of the mobile phone 300.

(1) Type Read Unit 391

When either the memory card 400i or the memory card 400p is attached to the mobile phone 300i, the type read unit 391 reads the second type information from the type storage unit 414 of the memory card 400i if the memory card 400i is attached, or reads the first type information from the type storage unit 415 of the memory card 400p if the memory card 400p is attached.

Successively, the type read unit 391 outputs the first type information or second type information whichever is read to the control unit 366i.

(2) Control Unit 366i

The control unit 366i receives the first type information or the second type information from the type read unit 391.

In the case of receiving the first type information, the control unit 366i instructs the first encryption/decryption unit 382 to perform encryption/decryption processing.

In the case of receiving the second type information, the control unit 366i first instructs the authentication unit 390 to perform mutual authentication with the memory card 400i. Upon receiving information indicative of successful authentication from the authentication unit 390, the control unit 366i instructs the second encryption/decryption unit 381 to perform encryption/decryption processing. Alternatively, upon receiving information indicative of unsuccessful authentication from the authentication unit 390, the control unit 366i terminates the processing.

(3) Authentication Unit 390

Upon receipt of an authentication instruction from the control unit 366i, the authentication unit 390 performs challenge-response type mutual authentication with the authentication unit 490 of the memory card 400i, and then outputs to the control unit 366i information showing whether the authentication has been performed successfully or unsuccessfully.

(4) Second Encryption/Decryption Unit 381

The second encryption/decryption unit 381 has a construction similar to that of the encryption/decryption unit 380b.

That is, the second encryption/decryption unit 381 generates a title key, and encrypts the title key using a unique key to generate an encrypted title key. The second encryption/decryption unit 381 also encrypts a content using the title key to generate an encrypted content.

In addition, the second encryption/decryption unit 381 decrypts the encrypted title key that is read from the memory card 400i to generate the title key, and then decrypts the encrypted content that is read from the memory card 400i using the generated title key to generate the content.

(5) First Encryption/Decryption Unit 382

The first encryption/decryption unit 382 has a construction similar to the encryption/decryption unit 380.

That is, the first encryption/decryption unit 382 encrypts a content using a unique key to generate an encrypted content. Alto, the encryption/decryption unit 382 decrypts the encrypted content that is read from the memory card 400p using the unique key to generate the content.

5.4 Operations of Digital Work Distribution System 100i

Figure 28:
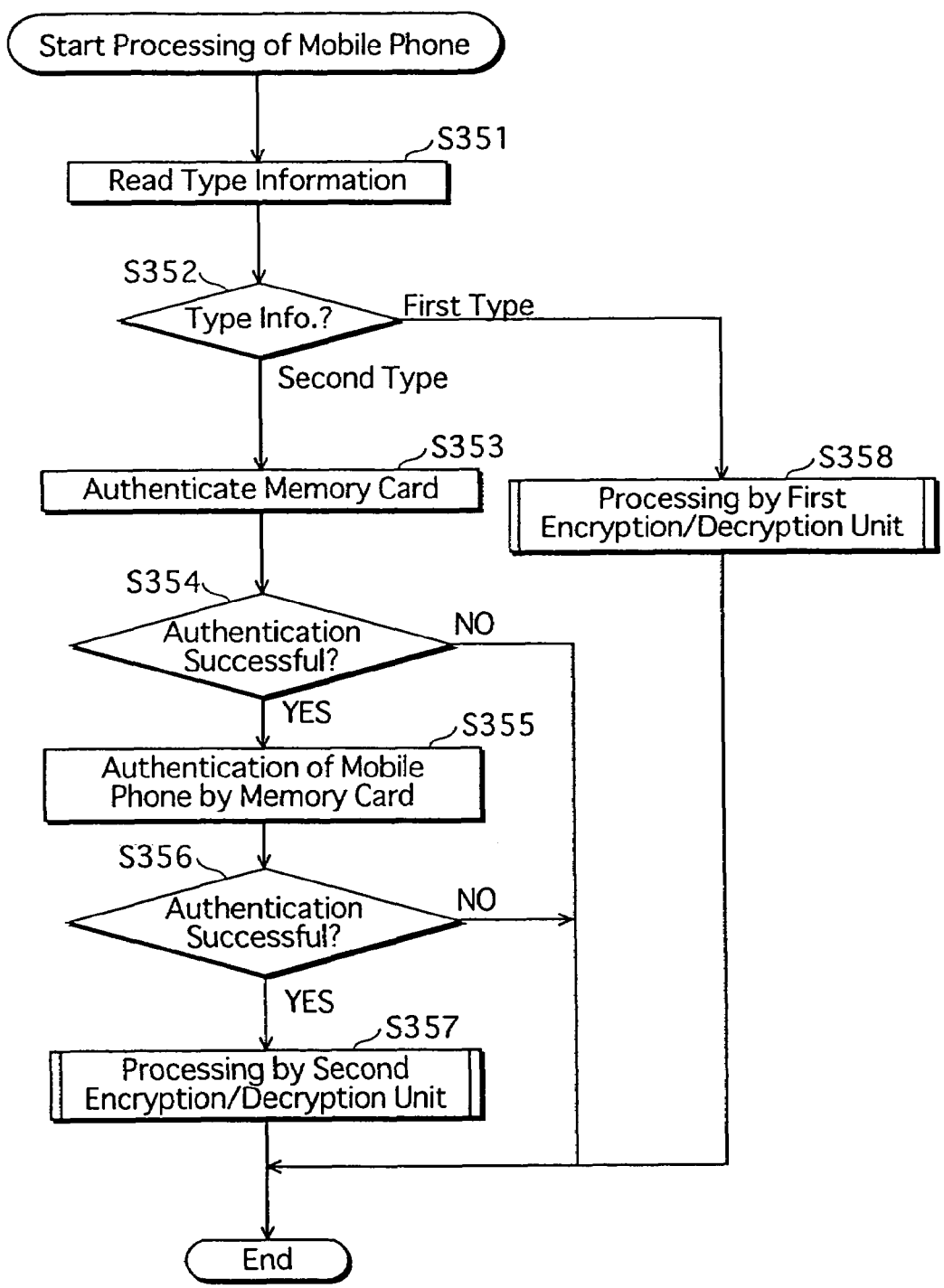
FIG. 28 is a flowchart showing the operations of a digital work distribution system 100i.

Now, description is given to the operations of digital work distribution system 100i with reference to the flowchart shown in FIG. 28.

When either the memory card 400i or the memory card 400p is attached to the mobile phone 300i, the type read unit 391 reads the second type information from the type storage unit 414 of the memory card 400i if the memory card 400i is attached, or reads the first type information from the type storage unit 415 of the memory card 400p if the memory card 400p is attached. The type read unit 391 outputs the read first type information or second type information to the control unit 366i (step S351).

Upon receipt of the first type information (step S352), the control unit 366i instructs the first encryption/decryption unit 382 to perform encryption/decryption processing. In response, the first encryption/decryption unit 382 performs encryption/decryption processing (step S358).

On the other hand, upon receipt of the second type information (step S352), the control unit 366i first instructs the authentication unit 390 to perform mutual authentication. In response, the authentication unit 390 authenticates the authentication unit 490 of the memory card 400i (step S353). When the authentication is successful (step S354, YES), the authentication unit 390 waits for the authentication unit 490 of the memory card 400i to authenticate the authentication unit 390 (step S355). When the authentication by the authentication unit 490 is successful (step S356, YES), the control unit 366i instructs the second encryption/decryption unit 381 to perform encryption/decryption processing. In response, the second encryption/decryption unit 381 performs encryption decryption processing (step S357).

In the case authentication in the step S354 or in the step S356 is unsuccessful, the control unit 366i terminates the processing.

5.5 Overview

As described above, in embodiment 5, the mobile phone judges whether a memory card attached thereto includes an authentication unit based on the memory card type. When judging that the memory card includes an authentication unit, the mobile phone performs encryption/decryption processing with the second encryption/decryption unit. Alternatively, when judging that the memory card does not include an authentication unit, the mobile phone performs encryption/decryption processing with the first encryption/decryption unit.

6. Preferred Embodiment 6

Now, description is given to a digital work distribution system 100j (not illustrated) consistent with preferred embodiment 6 of the present invention.

The digital work distribution system 100j has a construction similar to that of the digital work distribution system 100c. Thus, description is given mainly to the differences with the digital work distribution system 100c.

The digital work distribution system 100j includes a content distribution server device 200j, a mobile phone 300i, and a memory card 400j instead of the content distribution server device 200, the mobile phone 300, and the memory card 400, respectively. The digital work distribution system 100j further includes a payment device (not illustrated). The content distribution server device 200j and the payment device are connected to each other via the Internet 10.

(1) Content Distribution Server Device 200j

Figures 29, 30:
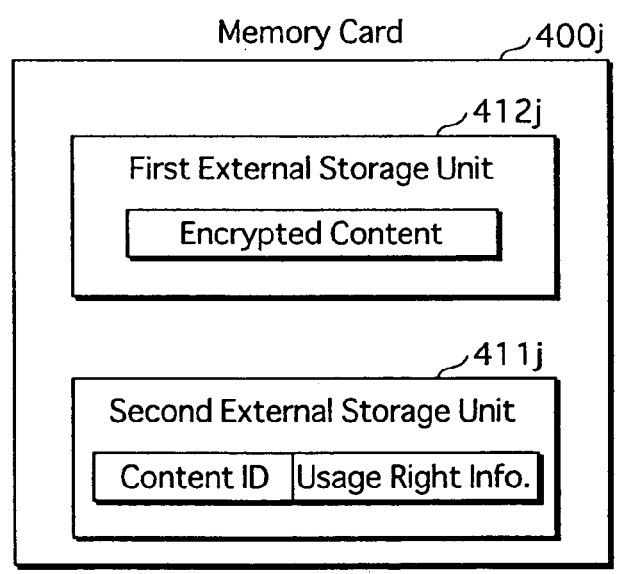
FIG. 29 shows the data construction of a right information table 610 that is stored in a content storage unit 201 of a content distribution server device 200j.
FIG. 30 is a block diagram showing the construction of a memory card 400j.

As shown in FIG. 29 by way of example, the content storage unit 201 of the content distribution server device 200j includes a right information table 610.

The right information table 610 has a plurality of storage areas each for storing usage information composed of a user ID and usage right information. The user ID is an identifier for identifying a user.

The content ID is an identifier for identifying a content.

The usage right information is the right of the user to use the content.

(2) Memory Card 400j

As shown in FIG. 30 by way of example, the memory card 400j includes a first external storage unit 412j and a second external storage unit 411j.

The first external storage unit 412j has a storage area for storing an encrypted content. The second external storage unit 411j has a storage area for storing usage information composed of the content ID and the usage right information.

Note that the second external storage unit 411j is readable and writable only after the mobile phone 300j and the memory card 400j are mutually authenticated.

(3) Mobile Phone 300j

The mobile phone 300j prestores the user identifier for identifying the user of the mobile phone 300j.

(4) Operations of Digital Work Distribution System 100j

Figure 31:
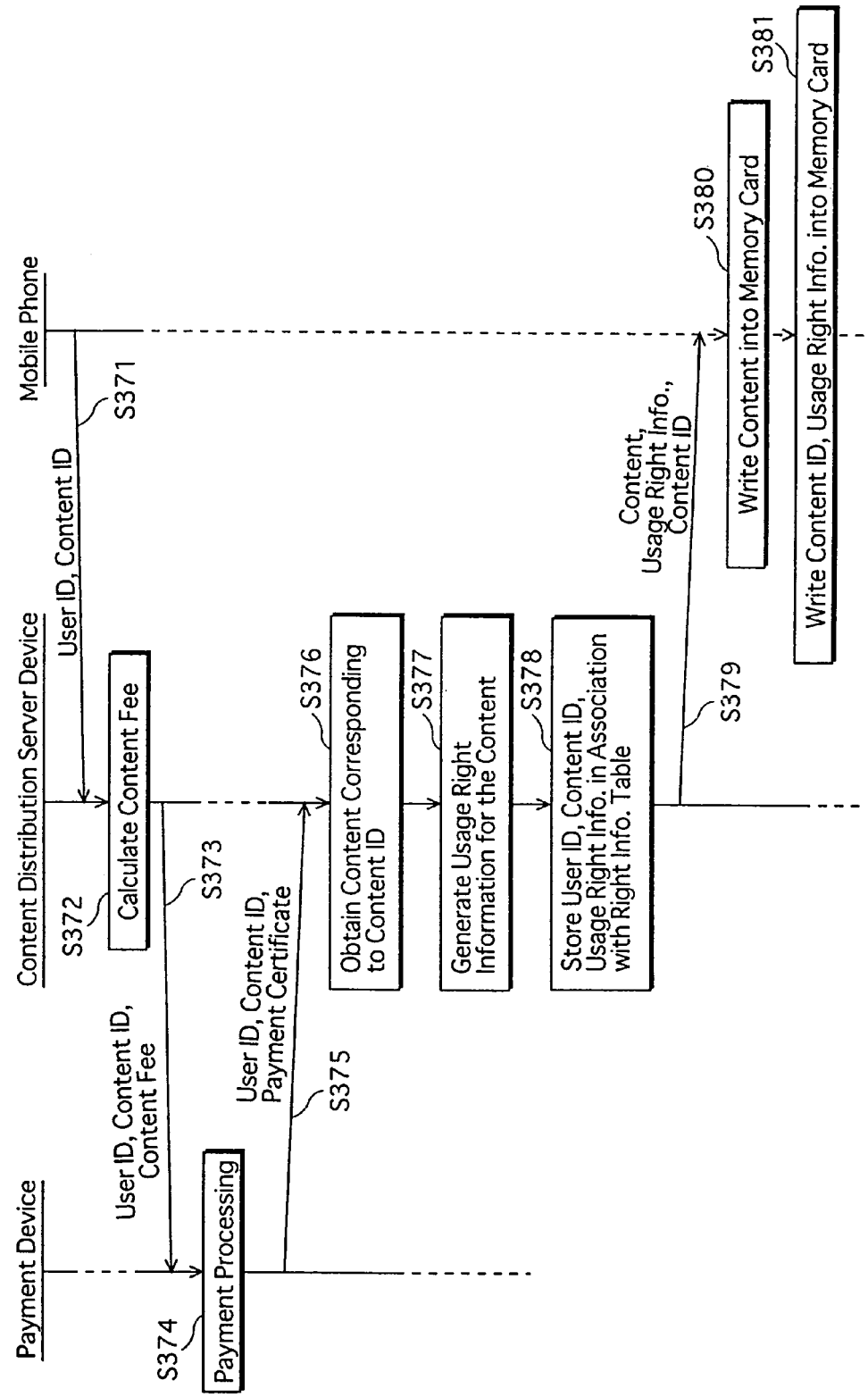
FIG. 31 is a flowchart showing the operations performed to obtain a content from the content distribution server device 200j.
Figure 32:
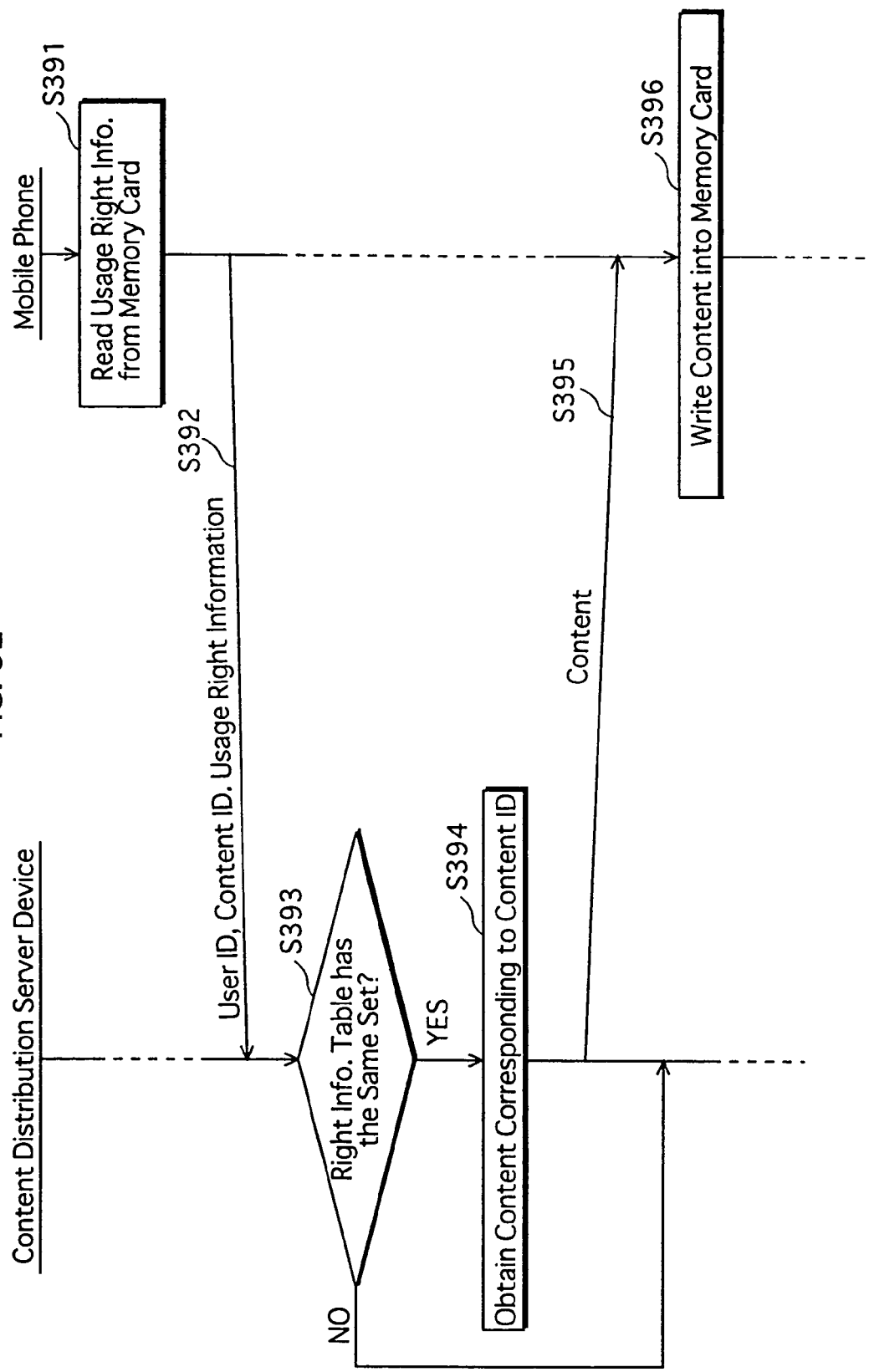
FIG. 32 is a flowchart showing the operations for re-obtaining the once obtained content when a user deletes the encrypted content stored in the memory card 400j by mistake.

With reference to the flowchart shown in FIGS. 31 and 32, description is given to the operations of the digital work distribution system 100j.

First, description is given to the operations performed to obtain a content from the content distribution server device 200j.

Upon receipt of a content ID from the input unit 365, the content purchasing unit 301 of the mobile phone 300j transmits to the content distribution server device 200j the content ID together with the user ID that is stored therein (step S371).

Upon receipt of the user ID and the content ID (step S371), the content distribution server device 200j calculates a content fee using the received content ID (step S372), and transmits to the payment device the user ID, the content, ID and the calculated content fee (step S373).

Upon receipt of the user ID, the content ID, and the content fee (step S373), the payment device performs the payment processing for the user identified by the received user ID to make the payment according to the received content fee, and generates a payment certificate (step S374), and transmits the user ID, the content ID, and the payment certificate to the content distribution server device 200j (step S375).

Upon receipt of the user ID, the content ID, and the payment certificate (step S375), the content distribution server device 200j reads the content that corresponds to the received content ID from the content storage unit 201 (step S376), generates the usage right information for the read content (step S377), and writes the received user ID and contents ID in association with the generated usage right information into the right information table 610 provided in the content storage unit 201 (step S378). Next, the content distribution server device 200j transmits the read content, the generated usage right information, and the received content ID to the mobile phone 300j (step S379).

Upon receipt of the content, the usage right information, and the content ID (step S379), the mobile phone 300j encrypts the received content and stores the encrypted content into the first external storage unit 412j included in the memory card 400j (step S380). Further, the mobile phone 300j writes the received usage right information and content ID in association with each other into the second external storage unit 411j included in the memory card 400j (step S381).

Next, description is given to the operations for re-obtaining the once obtained content in the case where, for example, the user deletes the encrypted content stored in the memory card 400j by mistake.

The mobile phone 300j reads the content ID together with the corresponding usage right information from the second external storage unit 411j included in the memory card 400j (step S391), and transmits to the content distribution sever device 200j the read content ID and usage right information together with the user ID (step S392).

Upon receipt of the user ID, the content ID, and the usage right information (step S392), the content distribution server device 200j judges whether the right information table 610 includes the same set of user ID and content ID as the received set (step S393). When judging that the same set of user ID and content ID are present in the right information table 610 (step S393, YES), the content distribution server device 200j reads from the content storage unit 201 the content corresponding to the received content ID (step S394), and then transmits the read content to the mobile phone 300j (step S395).

In response, the mobile phone 300j receives the content (step S395), and encrypts the received content to write into the memory card 400j (step S396).

Alternatively, when judging that the same set of user ID and content ID as the received set is not present in the right information table 610 (step 393, NO), the content distribution server device 200j discards the received user ID, content ID, and usage right information, and performs no other operations.

7. Preferred Embodiment 7

Now, description is given to a digital work distribution system 100k (not illustrated) consistent with preferred embodiment 7 of the present invention.

The digital work distribution system 100k has a construction similar to the digital work distribution system 100c. Thus, description is given mainly to the differences with the digital work distribution system 100c.

The digital work distribution system 100k includes a content distribution server device 200k, a mobile phone 300k, and a memory card 400k instead of the content distribution server device 200c, the mobile phone 300c, and the memory card 400, respectively.

(1) Content Distribution Server Device 200k

As shown in FIG. 33 as one example, the content storage unit 201 of the content distribution server device 200k includes a content information table 620.

The content information table 620 includes a plurality of sets of content information each composed of a content ID, a corresponding content, and a corresponding type of unique information.

The content ID is an identifier for identifying the content.

The content is a digital work such as a piece of music or a movie.

The type of unique information shows what unique information is to be used to encrypt the content upon being stored into the memory card 400k. A shown in the figure, the type of unique information in this example shows either "medium unique" type or "device unique" type.

(2) Memory Card 400k

Figure 34:
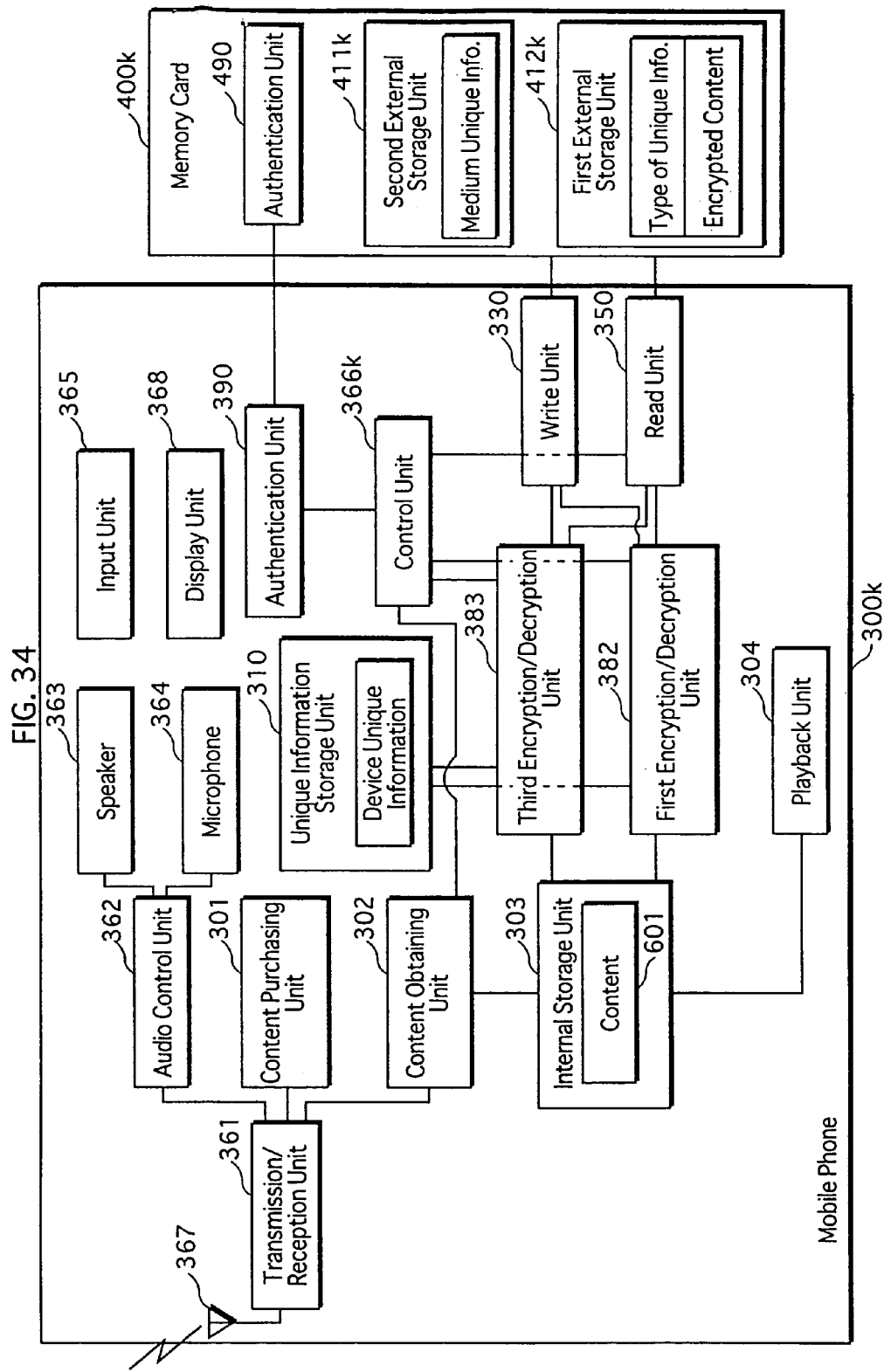
FIG. 34 is a block diagram showing the constructions of a mobile phone 300k and a memory card 400k.

As shown in FIG. 34, the memory card 400k includes the authentication unit 490, a first external storage unit 412k, and a second external storage unit 411k.

The first external storage unit 412k prestores medium unique information which is the information unique to the memory card 400k. Further, the second external storage unit 411k has storage areas for storing the unique information type and the encrypted content in association with each other.

The authentication unit 490 performs challenge-response type mutual authentication with the authentication unit 390 of the mobile phone 300k.

(3) Mobile Phone 300k

As shown in FIG. 34, the mobile phone 300k includes a first encryption/decryption unit 382 and a third encryption/decryption unit 383 instead of the encryption/decryption unit 380 included in the mobile phone 300. The mobile phone 300k further includes the authentication unit 390. With other respect, the mobile phone 300k includes the same components as those included in the mobile phone 300.

(Unique Information Storage Unit 310)

The unique information storage unit 310 prestores device unique information that is generated based on information unique to the mobile phone 300k.

(Authentication Unit 390)

The authentication unit 390 performs challenge-response type mutual authentication with the authentication unit 490 of the memory card 400k, and then outputs to the control unit 366k information showing whether the authentication has been performed successfully or unsuccessfully.

(Control Unit 366k)

The control unit 366k receives from the authentication unit 390 the information indicative of either successful authentication or unsuccessful authentication.

Upon receipt of information indicative of successful authentication, the control unit 366k selectively instructs either the first encryption/decryption unit 382 or the third encryption/decryption unit 383 to perform encryption/decryption processing. The selection of the two encryption/decryption units is made according to the unique information type.

(First Encryption/Decryption Unit 382)

The first encryption/decryption unit 382 has the construction similar to that of the encryption/decryption unit 380.

That is, the first encryption/decryption unit 382 encrypts the content using the device unique information to generate an encrypted content. Further, the first encryption/decryption unit 382 decrypts the encrypted content that has been read from the memory card 400k using the device unique information to generate the content.

(Third Encryption/Decryption Unit 383)

The third encryption/decryption unit 383 reads the medium unique information stored in the second external storage unit 411k included in the memory card 400k.

Upon encryption, the third encryption/decryption unit 383 encrypts the content using the read medium unique information as a key to generate an encrypted content, and stores the encrypted content in association with the unique information type showing "medium unique" type into the first external storage unit 412k of the memory card 400k.

Upon decryption, the third encryption/decryption unit 383 uses the read medium unique information as a key to decrypt the encrypted content that has been read from the first external storage unit 412k, thereby to generate the content.

(4) Operations of Digital Work Distribution System 100k

Figure 35:
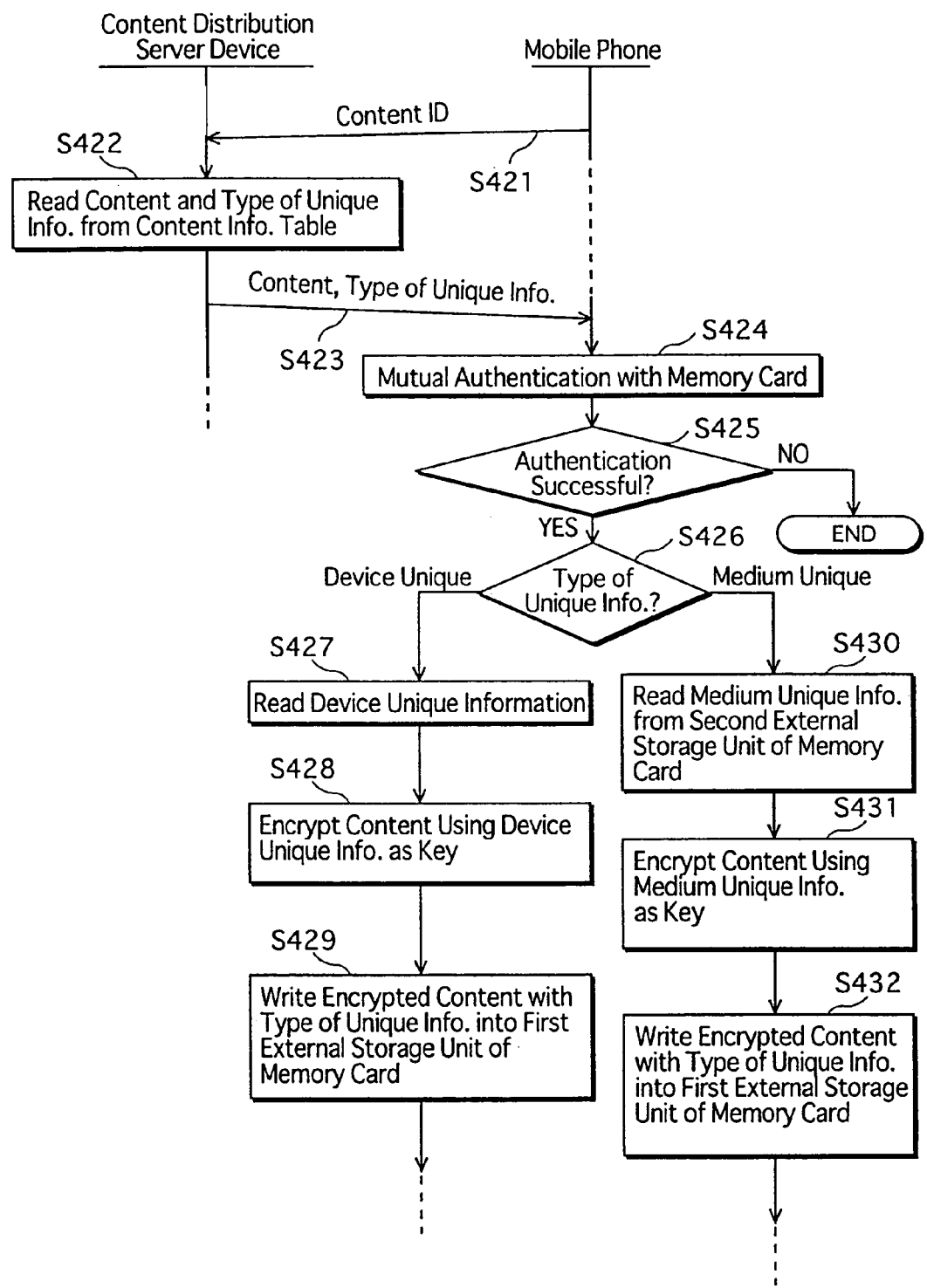
FIG. 35 is a flowchart showing the operations performed by the mobile phone 300k to obtain a content and to write the obtained content into the memory card 400k.
Figure 36:
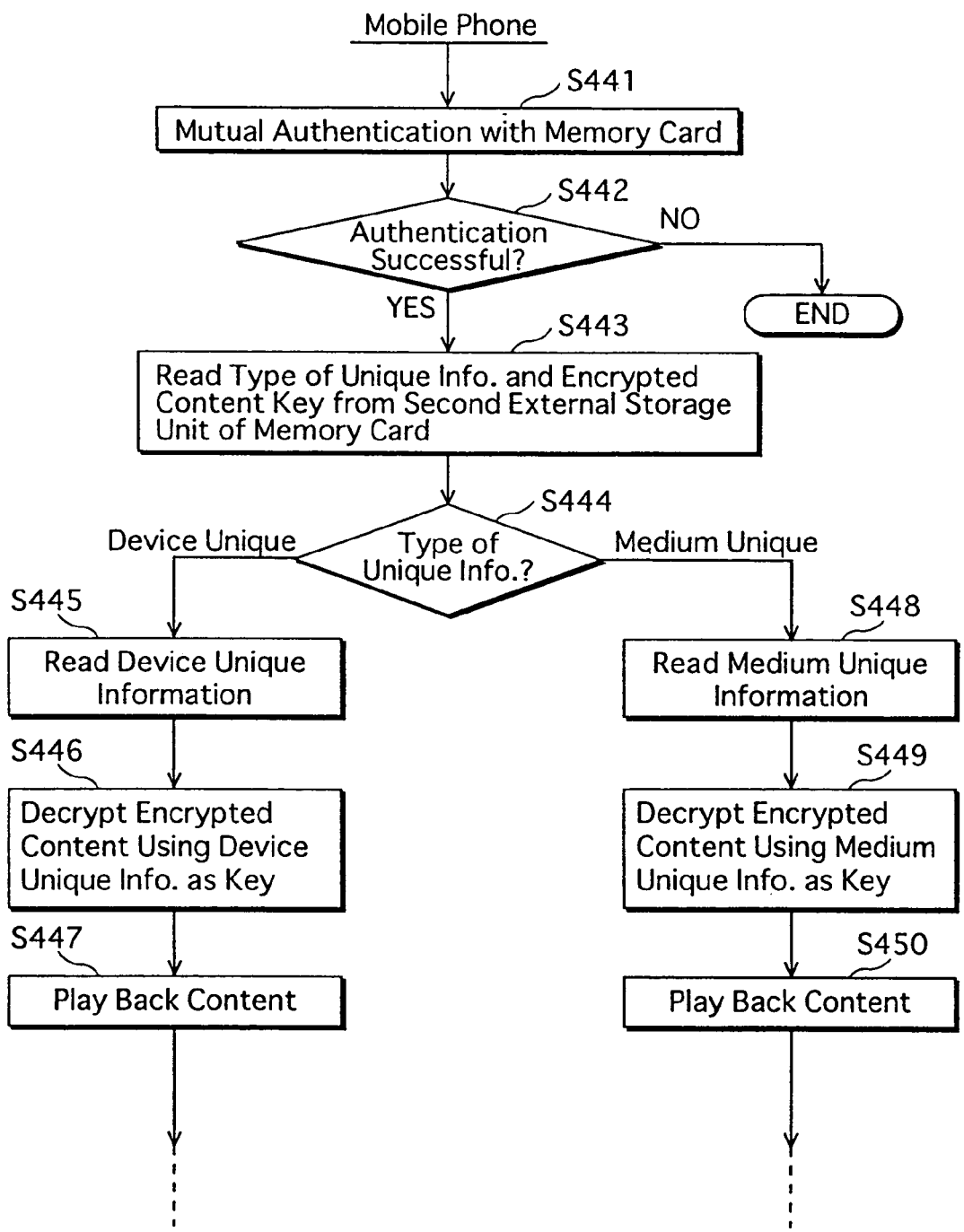
FIG. 36 is a flowchart showing the operations performed by the mobile phone 300k to decrypt an encrypted content stored in the memory card 400k and to play back the decrypted content.

Now, description is given to the operations of the digital work distribution system 100k with reference to the flowcharts shown in FIGS. 35 and 36.

First, description is given to the operations performed when the mobile phone 300k obtains a content and writes the content into the memory card 400k.

The mobile phone 300k transmits to the content distribution server device 200k the content ID identifying the content to be obtained (step S421). The content distribution server device 200k extracts from the content information table 620 the content information having the same content ID as the received content ID (step S422), and transmits the content and the type of unique information that are included in the extracted content information to the mobile phone 300k (step S423).

The authentication unit 390 performs mutual authentication with the memory card 400k (step S424). When the mutual authentication is success fully performed (step S425, YES), the control unit 366k receives the content and the type of unique information. When judging that the type of unique information that has been received shows "device unique" type (step S426), the control unit 366k instructs the first encryption/decryption unit 382 to perform encryption processing. In response, the first encryption/decryption unit 382 reads the device unique information from the unique information storage unit 310 (step S427), and reads the content from the internal storage unit 303. The first encryption/decryption unit 382 then encrypts the read content using the device unique information as a key (step S428), and stores the encrypted content in association with the type of unique information showing the "device unique" type into the first external storage unit 412k of the memory card 400k (step S429).

Alternatively, when judging that the type of unique information shows "medium unique" type (step S426), the control unit 366k instructs the third encryption/decryption unit 383 to perform encryption processing. In response, the third encryption/decryption unit 383 reads the medium unique information from the second external storage unit 411k included in the memory card 400k (step S430), and reads the content from the internal storage unit 303. The third encryption/decryption unit 383 then encrypts the read content using the read medium unique information as a key (step S431), and stores the encrypted content in association with the type of unique information showing the "medium unique" type into the first external storage unit 412k included in the memory card 400k (step S432).

In the case where the mutual authentication between the memory card and the authentication unit 390 has failed (step S425, NO), the processing is terminated at this stage.

Next, description is given to the processing performed when the mobile phone 300k decrypts to play back the encrypted content stored in the memory card 400k.

The authentication unit 390 of the mobile phone 300k performs mutual authentication with the memory card 400k (step S441). When the mutual authentication is successfully performed (step S442, YES), the read unit reads the encrypted content together with the type of unique information from the first external storage unit 412k included in the memory card 400k, and outputs the type of unique information to the control unit 366k (steps 443). Upon receipt of the type of unique information, the control unit 366k judges whether the received type information shows the "device unique" type or the "medium unique" type (step S444). When judging the type of unique information is "device unique", the control unit 366k instructs the first encryption/decryption unit 382 to perform decryption processing (step S445). In response, the first encryption/decryption unit 382 reads the device unique information from the unique information storage unit 310 (step S445), and receives the encrypted content from the read unit 350. The first encryption/decryption unit 382 then decrypts the encrypted content using the read device unique information as a key (step S446), and writes the decrypted content into the internal storage unit 303. Then, the playback unit 304 plays back the content (step S447).

Alternatively, when judging in the step S444 that the type of unique information is "medium unique", the control unit 366k instructs the third encryption/decryption unit 383 to perform decryption processing. In response, the third encryption/decryption unit 383 reads via the read unit 350, the medium unique information from the second external storage unit 411k included in the memory card 400k (step S448), and receives the encrypted content from the read unit 350. The third encryption/decryption unit 383 then decrypts the encrypted content using the read medium unique information (step S449), and writes the decrypted content into the internal storage unit 303. Then, the playback unit 304 plays back the content (step S450).

8. Recapitulation

As described above, the present invention is directed to a digital work protection system that is for recording and playing back contents, i.e., digital works, and that is composed of a main device and a recording medium device attachable to and detachable from the main device. The main device includes: an internal storage area for storing a content; a unique information storage area for storing unique information that is unique to the main device; an encryption unit that encrypts the content stored in the internal storage area using the unique information stored in the internal storage area; a write unit that writes the content encrypted by the encryption unit into the recording medium device; a read unit for reading the encrypted content from the recording medium device; a decryption unit that decrypts the encrypted content having read by the read unit; and a playback unit that plays back the content. The recording medium device has an external storage area for storing the encrypted content that is written by the write unit of the main device or read by the read unit of the main device.

Here, the encryption unit of the main device encrypts the title key that is unique to the content using the unique information, and encrypts the content using the title key. The write unit writes the encrypted content and the encrypted title key both encrypted by the encryption unit into the recording medium device. The read unit reads the encrypted content and the encrypted title key from the recording medium device. The decryption unit decrypts the encrypted title key using the unique information, and decrypts the encrypted content using the decrypted title key. The recording medium device stores the encrypted content and the encrypted title key that are written by the write unit of the main device or read by the read unit of the main device.

Here, the main device further includes: a usage condition storage area and a usage condition judgment unit. The usage condition storage area stores usage condition data for the content, and the usage condition judgment unit judges, according to the usage condition data, whether to play back the content.

Here, the main device further includes an authentication unit. The recording medium device includes an authentication unit. The external storage area includes a first external storage area and a second external storage area. Prior to the main device writing the encrypted title key into the recording medium device or the main device reading the encrypted title key from the recording medium device, the authentication unit of the main device authenticates the recording medium device and the authentication unit of the recording medium device authenticates the main device. When both the authentication operations are performed successfully, the writing or the reading of the encrypted title key is performed. The recording medium device stores the encrypted content and the encrypted title key into the first external storage area and the second external storage area, respectively.

Here, the main device further includes a usage condition judgment unit. Prior to the main device writing usage condition data for the content into the recording medium device or the main device reading the usage condition data from the recording medium device, the authentication unit of the main device authenticates the recording medium device and the authentication unit of the recording medium device authenticates the main device. When both the authentication operations are successful, the writing or the reading of the usage condition data is performed. The usage condition judgment unit judges whether to play back the content according to the usage condition data. The recording medium device stores the usage condition data into the second external storage area.

Here, the usage condition data includes information for limiting the number of times permitted to play back the content, information for limiting the time period permitted to play back the content, or information for limiting the total time permitted to play back the content.

Here, the main device further includes a content purchasing unit and a content receiving unit. The content purchasing unit purchases a content from an external source. The content receiving unit receives the content that has been purchased to store the received content into the internal storage area.

Here, the main device further includes a content judgment unit. The content judgment unit judges whether the content stored in the internal storage unit is permitted to be encrypted by the encryption unit using the unique information and to be written by the write unit into the recording medium device.

Here, the main device further includes a recording medium device-judgment unit. The recording medium device-judgment unit judges whether a recording medium device attached to the main device is the recording medium device that is permitted to encrypt the content stored in the internal storage area with the encryption unit using the unique information and to write the encrypted content with the write unit into the recording medium device.

Here, the unique information storage area and the usage condition storage area are write-protected and read-protected against any external devices other than a model change device that is specifically permitted to read or write the unique information and the usage condition data.

In another aspect, the present invention is directed to a main device which a recording medium device is attachable to or detachable from. The main device includes: an internal storage area that stores a content; a unique information storage area that stores unique information being unique to the main device; an encryption unit that encrypts a title key being unique to the content using the unique information and encrypts the content using the title key; a write unit that writes the encrypted content and the encrypted title key both encrypted by the encryption unit; a read unit that reads the encrypted content and the encrypted title key from the recording medium device; a decryption unit that decrypts the encrypted title key using the unique information and decrypts the encrypted content using the decrypted title key; and a playback unit that plays back the content.

Here, the main device further includes an authentication unit. Prior to the main device writing the encrypted title key into the recording medium device or reading the encrypted title key from the recording medium device, the authentication unit of the main device performs mutual authentication with the recording medium device. The writing or the reading of the encrypted title key is performed only when the mutual authentication is successful.

In another aspect, the present invention is directed to a recording medium device that is attachable to or detachable from a main device. The recording medium device has an external storage area for storing an encrypted content and an encrypted title key that are written or read by a write unit of the main device or a read unit of the main device.

Here, the recording medium device further includes an authentication unit. Prior to the main device writing the encrypted title key into the recording medium device or reading the encrypted title key from the recording medium device, the authentication unit of recording medium device performs mutual authentication with the main device. The encrypted title key is written into the second external storage area only when the mutual authentication is successful.

In another aspect, the present invention includes a unique information read/write unit that is specifically permitted to read unique information from the unique information storage area of a first main device, and write the read unique information into the unique information storage unit of a second main device.

Here, the model change device further includes a usage condition read/write unit that is specifically permitted to read usage condition data from the usage condition storage area of the first main device to write the read usage condition data into the usage condition storage area of the second main device provided that each of the first main device and the second main device separately has the usage condition storage area.

Here, the model change device is connected to the main device via a network on a regular basis or when necessary. The main device further includes a model change information-judgment unit that judges the authenticity of the model change information. The model change device transmits the model change information to the main device according to contract condition data of the main device. The model change information-judgment unit of the main device judges the authenticity of the received model change information. The model change device further includes a unique information read/write unit. When the authenticity of the received model change information is established by the model change information-judgment unit, the unique information read/write unit writes the unique information that is included in the model change information and that is unique to the main device into the unique information storage unit of the main device, or deletes the unique information.

Here, a second recording medium device is attached to the main device. The second recording medium device includes: a unique information storage area for storing the unique information of the main device; and a unit used to attach the second recording medium device having been attached to the first main device to the second main device.

In a digital work protection system, a main device, a recording medium device, and a model change device that are consistent with the present invention, the internal storage area of the main device inmost cases is limited in its memory capacity. Thus, this limitation conventionally results in the following problem. That is, when the internal storage area is full of digital works, the user is required to delete some of the digital works stored in the internal storage area to secure a free memory space before purchasing another digital work, or the user is required to simply give up purchasing another digital work. According to the present invention, however, the user is allowed to store some of the digital works stored in the internal storage unit into a recording medium device attached to the main device when he decides not to use the digital works anytime soon. In this way, a free memory space is secured in the internal storage area of the main device without losing the rights to play back the purchased digital works. Consequently, another digital work may be purchased.

Further, with the above construction, when an encrypted content is stored into a recording medium device by a certain main device, the encrypted content is not possibly decrypted or played back by any other main device although the recording medium device is attached thereto. That is, the present invention achieves an effect of meeting copy holders' demand that a content stored into a recording medium device using a main device be prohibited from being decrypted or played back using any other main device although the recording medium device is attached thereto.

Still further, the present invention achieves an effect that a content provided with a certain usage condition is permitted to be played back only when the usage condition is met.

Still further, the present invention achieves the following effect upon model change from a certain main device to another main device. That is, a new main device that replaces a current main device is permitted to read and play back the contents that have been purchased and stored in a recording medium device by the current main device without applying processing to the contents.

Up to this point, description has been given to the digital work distribution systems consistent with the present invention. Yet, it goes without saying that the present invention is in no way limited to those specific embodiments described above. For example, the following constructions may be applicable.

(1) In the embodiments above, description is given to the digital work distribution system employing a mobile phone, yet the present invention is not limited thereto. For example, what is applicable instead of a mobile phone includes an L-mode-ready tabletop type telephone, a portable information terminal, a personal computer, or a household appliance, such a television set, that is capable of Internet connection.

Further, it is described that the content distribution server device 200 and the mobile phone 300 are connected via the Internet 10, the mobile phone network 20, and the radio base station 30. Yet, the connection may be made in another manner. For example, the content distribution server and the portable information terminal may be connected via the Internet. Alternatively, the content distribution server device may be connected to a broadcasting device, so that various types of information including contents are broadcasted in form of broadcast waves. Here, a household appliance, such as a television set, receives the broadcast waves, and extracts various types of information from the received broadcast waves.

(2) Although DES encryption algorithm is employed in the embodiments described above, the applicable encryption algorithm is not limited thereto. Further, although the unique information used in the embodiments described above is a 56-bit unique key, the bit length is not limited thereto.

(3) Although the content is stored into the memory card in the above embodiments, the present invention is not limited thereto. For example, the content may be stored into a recording medium such as an optical disk.

(4) Although the entire content is encrypted in the above embodiments, it is applicable to encrypt a part of the content.

(5) In the above embodiments, the encrypted content stored in the memory card is decrypted by the main device (i.e., the mobile phone in the above embodiments), and stored into the internal storage area of the main device. Yet, it is applicable to decrypt the encrypted content stored in the memory card by the main device and to play back the decrypted content in real time. Similarly, the content stored in the memory card and provided with the usage condition may be decrypted by the main device. When the usage condition judgment unit permits the content to be used, the decrypted content may be played back by the playback unit in real time.

(6) In the above embodiments, the telephone number is used as the information stored in the unique information storage area. Yet, the present invention is not limited thereto. For example, a serial number of a mobile phone may be used as long as the information is unique to the mobile phone.

(7) In the above embodiments, the usage condition is provided on a content by content basis. Yet, the present invention is not limited thereto. For example, it is applicable that usage condition permits to purchase up to 100 pieces of karaoke data per month. In this case, when the month-by-month basis contract is cancelled, for example, the usage condition unit prohibits reproduction of the contents stored in the memory card or the internal storage area of the main device starting from the next month.

(8) In the above embodiments, the content or the title key is always encrypted using the unique information and stored in the memory card. Yet, the present invention is not limited thereto. It is also applicable to provide the mobile phone with a content judgment unit, so that it is selectable depending on the content whether to encrypt the content itself or the title key using the unique information.

(9) In the above embodiments, the model change device moves the unique information stored in the unique information storage area of the mobile phone A to that of the mobile phone B. Yet, the present invention is not limited thereto. For example, the model change device may be constructed so as to move the purchased content stored in the internal storage area of the main device.

(10) The mobile phone may obtain, in addition to the content, the content judgment information from the content distribution server device to store into the internal storage area. Here, the content judgment information shows whether the content is permitted in advance to be encrypted using the unique information and written into the memory card.

The mobile phone may further include the content judgment unit. The content judgment unit judges whether the content internally stored is permitted in advance to be encrypted by the encryption unit using the unique information and written by the write unit into the memory card. When the content is judged by the content judgment unit to be permitted, the encryption unit performs the encryption. When the content is judged by the content judgment unit to be permitted, the write unit performs the writing.

(11) The memory card may further prestore type information showing the type of the memory card. To be more specific, the type of memory card used herein shows a type according to the outer shape of the memory card, a type according to the topology employed for connection with the mobile phone, a type according to the manufacturer, a type according to the memory capacity, a type according to the storage method of information, or a type according to the access method. Further, the type information shows whether the memory card is permitted to encrypt the content stored in the mobile phone using the unique information with the encryption unit and to write the encrypted content with the write unit into the memory card.

The mobile phone further includes the recording medium device-judgment unit. The recording medium device-judgment unit judges, according to the type information stored in the memory card, whether a memory card attached to the mobile phone is the memory card that is permitted in advance to encrypt the content stored in the mobile phone using the unique information with the encryption unit and to write the encrypted content with the write unit into the memory card.

When judging that the content is permitted by the recording medium device-judgment unit, the encryption unit encrypts the content. When judging that the content is permitted by the recording medium device-judgment unit, the write unit writs the content into the memory card.

(12) The present invention may be embodied as a method described above, or a computer program implementing the above method by a computer, or even as digital signals representing the above computer program.

Further, the present invention may be embodied as a computer-readable medium storing the computer program or the digital signals. Here, the computer readable medium is, for example, a floppy disc, a hard disc, CD-ROM, MO, DVD, DVD-ROM, DVD-RAM, BD (Blu-ray Disc), or semiconductor memory. Alternatively, the present invention may be the computer program or the digital signals that are stored on such recording medium as above.

Further, the present invention may be embodied as the computer program or the digital signals transmitted via a telecommunications network, a wired or wireless communications line, a network exemplified by the Internet, or the like.

Still further, the present invention may be embodied as a computer system provided with a microprocessor and memory that stores the above computer program, so that the microprocessor operates in accordance with the program.

Still further, the computer program or the digital signals may be recorded on any of the above recording medium and transported to another location. Alternatively, the computer program or the digital signals may be transmitted via any of the above networks. Thereafter, the computer program or the digital signals may be executed by another, independent computer system.

(13) Further, the present invention may be embodied as combinations of the above modifications.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A model change device for replacing a first record/playback device with a second record/playback device due to change in a contract between a user and a service provider, the first record/playback device being usable under the contract, wherein
   the first record/playback device includes:
   a first internal storage unit operable to store a content that is a digital work;
   a first unique information storage unit operable to pre-store device unique information that is unique to the first record/playback device;
   a first encryption unit operable to encrypt the content stored in the first internal storage unit based on the device unique information stored in the first unique information storage unit to generate encrypted information;
   a first write unit operable to write the generated encrypted information into a storage area of a recording medium device;
   a first read unit operable to read the encrypted information from the storage area of the recording medium device;
   a first decryption unit operable to decrypt the read encrypted information based on the device unique information stored in the first unique information storage unit to generate a decrypted content; and
   a first playback unit operable to play back the generated decrypted content, and the second record/playback device includes:
   a second internal storage unit including an internal storage area for storing a content that is a digital work;
   a second unique information storage unit including an internal storage area for storing device unique information;
   a second encryption unit operable to encrypt the content stored in the second internal storage unit based on the device unique information stored in the second unique information storage unit to generate encrypted information;
   a second write unit operable to write the generated encrypted information into the storage area of the recording medium device;
   a second read unit operable to read the encrypted information from the storage area of the recording medium device;
   a second decryption unit operable to decrypt the read encrypted information based on the device unique information stored in the second unique information storage unit to generate a decrypted content; and
   a second playback unit operable to play back the generated decrypted content, the model change device comprising:
   a third read unit operable to read the device unique information stored in the first unique information storage unit, and delete the device unique information from the first unique information storage unit; and
   a third write unit operable to write the read device unique information into the second unique information storage unit.

2. The model change device of claim 1, wherein
   the first record/playback device further includes:
   a first condition storage unit operable to store usage condition information showing a permissive condition for use of the content; and
   a first condition judgment unit operable to judge whether use of the content is permitted according to the usage condition information stored in the first condition storage unit, and
   the second record/playback device further includes:
   a second condition storage unit having an internal storage area for storing usage condition information showing a permissive condition for use of the content; and
   a second condition judgment unit operable to judge whether use of the content is permitted according to the usage condition information stored in the second condition storage unit,
   the third read unit is further operable to read the usage condition information stored in the first condition storage unit, and delete the usage condition information from the first condition storage unit, and
   the third write unit is further operable to write the read usage condition information to the second condition storage unit.

3. The model change device of claim 1, wherein
   the first record/playback device and the second record/playback device are separately connected to the model change device via a network,
   the third read unit is operable to perform the reading and the deletion of the device unique information stored in the first unique information storage unit via the network, and
   the third write unit is operable to perform the writing of the read device unique information into the second unique information storage unit via the network.

4. A model change device for canceling a record/playback device that has been usable under a contract between a user and a service provider, wherein
   the record/playback device includes:
   an internal storage unit operable to store a content that is a digital work;
   a unique information storage unit operable to prestore (i) device unique information that is unique to the record/playback device and (ii) contract information regarding the contract, the device unique information being independent of the contract information;
   an encryption unit operable to encrypt the content stored in the internal storage unit based on the device unique information stored in the unique information storage unit to generate encrypted information;
   a write unit operable to write the generated encrypted information into a storage area of a recording medium device;

a read unit operable to read the encrypted information from the storage area of the recording medium device;

a decryption unit operable to decrypt the read encrypted information based on the device unique information stored in the unique information storage unit to generate a decrypted content; and a playback unit operable to play back the generated decrypted content, the model change device comprising:

a read unit operable to read the contract information from the unique information storage unit; and a cancellation unit operable to perform processing to cancel the contract with reference to the read contract information.

5. A model change device for changing a first contract under which a record/playback device is usable to a second contract, the first contract being between a user and a first service provider and the second contract being between the user and a second service provider, wherein the record/playback device includes:

an internal storage unit operable to store a content that is a digital work;

a unique information storage unit operable to store (i) device unique information that is unique to the record/playback device and (ii) first contract information regarding the first contract, the device unique information being independent of the first contract information;

an encryption unit operable to encrypt the content stored in the internal storage unit based on the device unique information stored in the unique information storage unit to generate encrypted information;

a write unit operable to write the generated encrypted information into a storage area of a recording medium device;

a read unit operable to read the encrypted information from the storage area of the recording medium device;

a decryption unit operable to decrypt the read encrypted information based on the device unique information stored in the unique information storage unit to generate a decrypted content; and a playback unit operable to play back the generated decrypted content, the model change device comprising:

a read unit operable to read the first contract information from the unique information storage unit;

a contract cancellation and change unit operable to perform processing to cancel the first contract with reference to the read first contract information, and perform processing to make the second contract and to generate second contract information regarding the second contract; and a write unit operable to write the generated second contract information into the unique information storage unit, and delete the first contract information from the unique information storage unit.

6. A model change device for replacing a first record/playback device with a second record/playback device due to change in a contract between a user and a service provider, the first record/playback device being usable under the contract, wherein the first record/playback device includes:

a first internal storage unit operable to store a content that is a digital work;

a first unique information storage unit operable to pre-store device unique information that is unique to the user, the first unique information storage unit being detachable from the first record/playback device;

a first encryption unit operable to encrypt the content stored in the first internal storage unit based on the prestored device unique information stored in the first unique information storage unit to generate encrypted information;

a first write unit operable to write the generated encrypted information into a storage area of a recording medium device;

a first read unit operable to read the encrypted information from the storage area of the recording medium device;

a first decryption unit operable to decrypt the read encrypted information based on the prestored device unique information stored in the first unique information storage unit to generate a decrypted content; and a first playback unit operable to play back the generated decrypted content, and the second record/playback device includes:

a second internal storage unit including an internal storage area for storing a content that is a digital work;

a second encryption unit operable to encrypt the content stored in the second internal storage unit based on the prestored device unique information stored in the first unique information storage unit to generate encrypted information;

a second write unit operable to write the generated encrypted information into the storage area of the recording medium device;

a second read unit operable to read the encrypted information from the storage area of the recording medium device;

a second decryption unit operable to decrypt the read encrypted information based on the prestored device unique information stored in the first unique information storage unit to generate a decrypted content; and a second playback unit operable to play back the generated decrypted content, the model change device comprising an attachment and detachment unit operable to detach the first unique information storage unit from the first record/playback device and attach the detached first unique information storage unit to the second record/playback device.

* * * * *